United States Patent [19]
Miyabe et al.

[11] Patent Number: 5,859,819
[45] Date of Patent: Jan. 12, 1999

[54] TRACKING AND FOCUS CONTROL SYSTEM FOR OPTICAL DISK APPARATUS

[75] Inventors: Kyoko Miyabe; Koichi Tezuka; Shingo Hamaguchi, all of Kawasaki, Japan

[73] Assignee: Fujitsu, Limited, Kawasaki, Japan

[21] Appl. No.: 637,936

[22] Filed: Apr. 23, 1996

[30] Foreign Application Priority Data

Jul. 17, 1995 [JP] Japan ................................. 7-180427

[51] Int. Cl.⁶ .................................................. G11B 7/09
[52] U.S. Cl. ................................. 369/44.41; 369/44.23; 369/44.26
[58] Field of Search .................. 369/44.23, 44.12, 369/44.14, 44.37, 44.38, 44.41, 44.42, 103, 112

[56] References Cited

U.S. PATENT DOCUMENTS

| | | | |
|---|---|---|---|
| 5,161,139 | 11/1992 | Inoue et al. | 369/44.23 |
| 5,491,675 | 2/1996 | Kay | 369/44.23 |
| 5,559,767 | 9/1996 | Matsui | 369/44.23 |
| 5,619,482 | 4/1997 | Tezuka et al. | 369/44.23 |
| 5,623,462 | 4/1997 | Tezuka et al. | 369/44.23 |
| 5,671,199 | 9/1997 | Nishikawa | 369/44.26 |

FOREIGN PATENT DOCUMENTS

| | | | |
|---|---|---|---|
| 57-37745 | 3/1982 | Japan . | |
| 0275044 | 11/1988 | Japan | 364/44.23 |
| 0031336 | 2/1990 | Japan | 369/44.38 |
| 485760 | 3/1992 | Japan . | |
| 5159409 | 6/1993 | Japan . | |

*Primary Examiner*—Thang V. Tran
*Attorney, Agent, or Firm*—Greer, Burns & Crain, Ltd.

[57] ABSTRACT

An optical disk apparatus comprising an optical element for dividing the reflected light into a plurality of light beams for generating a tracking error signal and a focus error signal, and deflecting these light beams into different directions from each other, a first calculating means for calculating the focus error signal on the basis of outputs from said photo-detecting means, and a second calculating means for calculating the tracking error signal on the basis of the outputs from said photodetecting means in accordance with a structure of a track. The second calculating means outputs a tracking error signal by a push-pull method when a track has a successive groove. The second calculating means outputs a tracking error signal by a heterodyne method when a track has only a row of pits.

26 Claims, 47 Drawing Sheets near just focus far

FIG. 5A
−1/4 Track
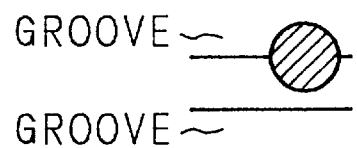
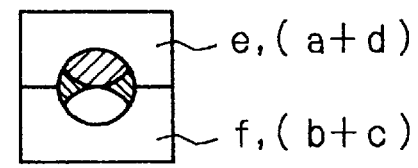
FIG. 5B
On Track
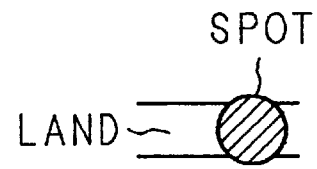
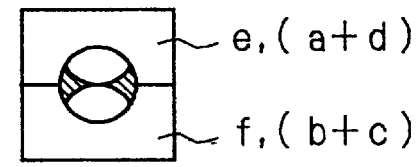
FIG. 5C
1/4 Track
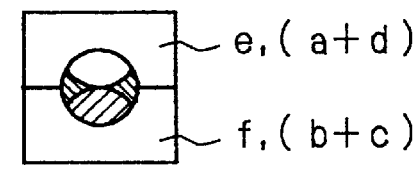

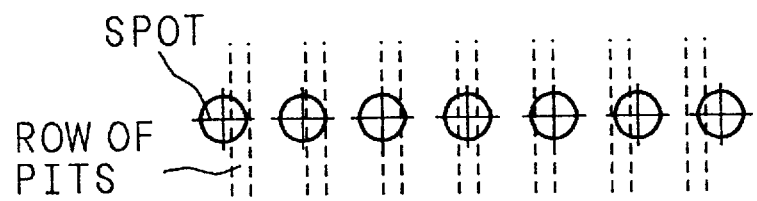
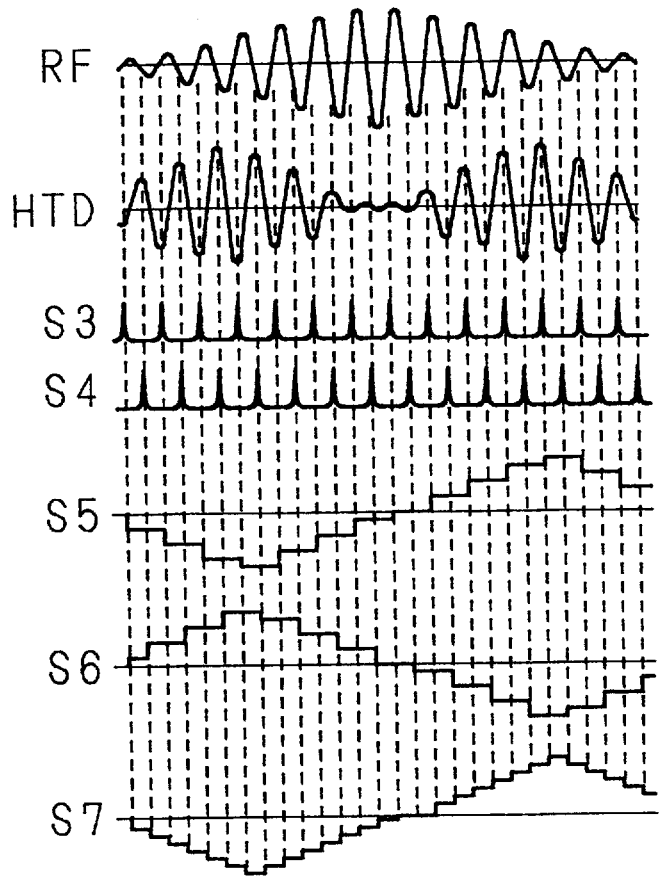

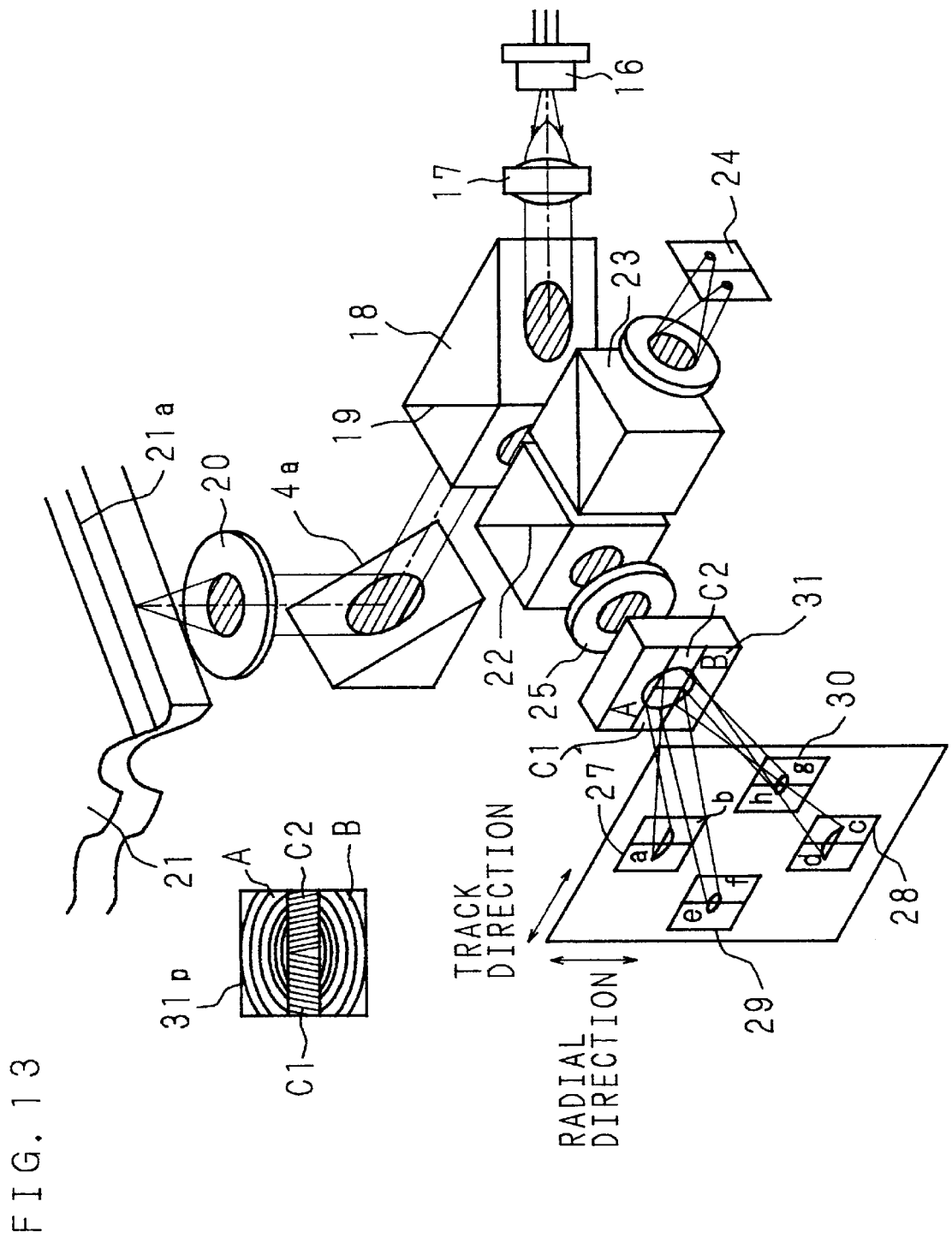

near　　　　just　　　　far

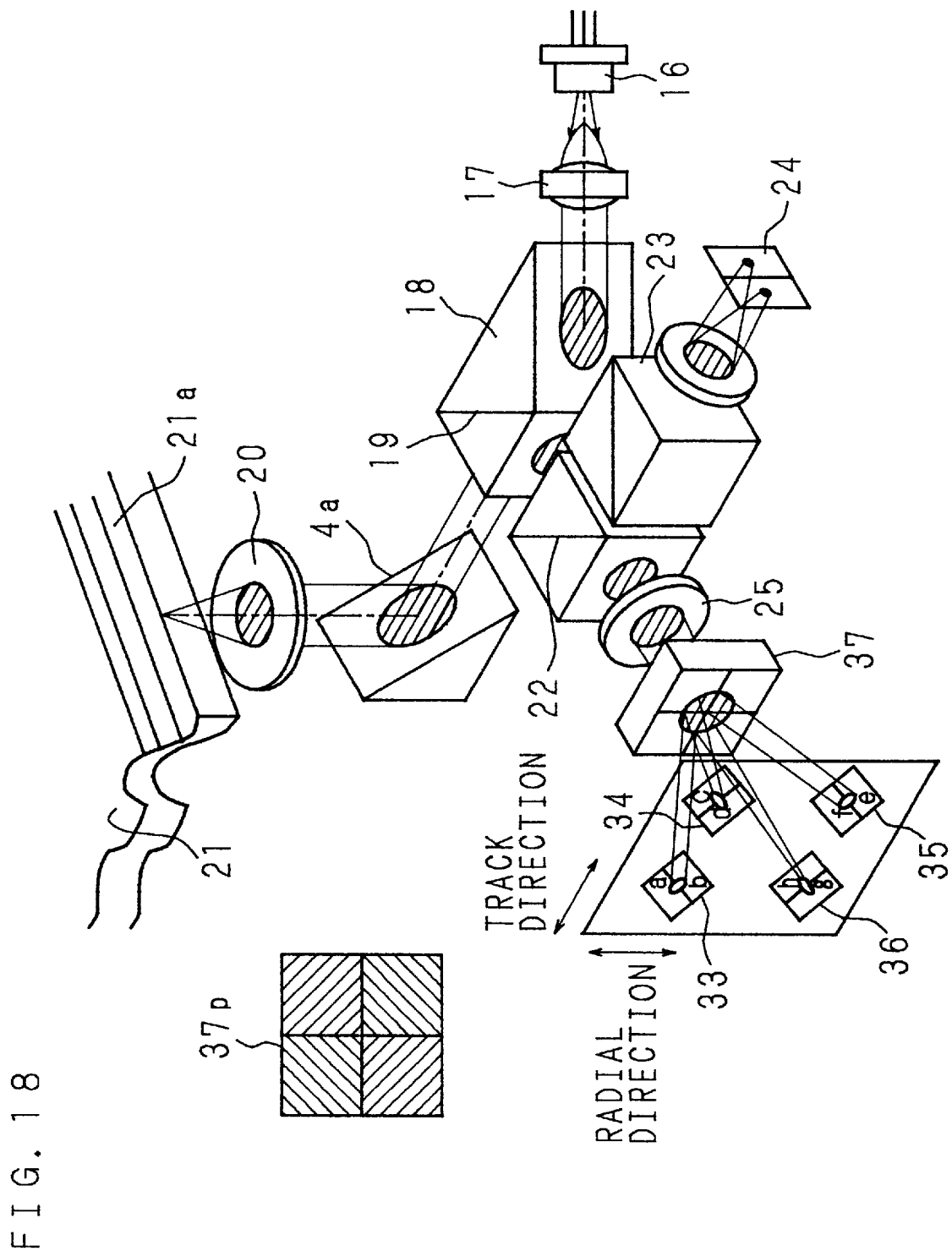

TRACKING AND FOCUS CONTROL SYSTEM FOR OPTICAL DISK APPARATUS

BACKGROUND OF THE INVENTION

1. Field of the Invention

The present invention relates to an optical disk apparatus, and more particularly, to an improved optical disk apparatus for optically recording an information signal in an optical disk and/or optically reproducing the information which is stored on the optical disk.

2. Description of Related Art

As computers become advanced, the quantity of programs and data to be used has increased, which has made it necessary to provide for a file apparatus of a large capacity to store programs and data. While development of a large capacity file apparatus of a small size progresses, due to compatibility of a medium, further development of an optical disk apparatus, which has a large capacity, is expected in the future.

There are various types of optical disks. Of the variety of optical disks, a CD-ROM is an optical disk exclusively for reading and is becoming popular as means for distributing software. Because of this, a recent tendency is that a CD-ROM driving apparatus is incorporated in a personal computer as standard equipment.

Meanwhile, a magneto optical disk (MO) and a phase-variable optical disk, which are erasable/writable optical disks, are rapidly becoming popular as a large capacity file for storing data created by a user and for the purpose of back-up.

A CD-ROM, a magneto optical disk and a phase-variable optical disk cannot be driven unless each driven by a special driving apparatus therefor at present. However, if it is possible to drive both mediums with only one driving apparatus, that will be a great improvement in terms of costs and ease of use.

Japanese Patent Application Laid-Open No. 4-85760 (1992) and Japanese Patent Application Laid-Open No. 5-159409 (1993) propose disk apparatuses which can drive a CD-ROM, a magneto optical disk and a phase-variable optical disk with only one driving apparatus. Japanese Patent Application Laid-Open No. 4-85760 (1992) mainly uses an operation processing circuit to realize this, while Japanese Patent Application Laid-Open No. 5-159409 (1993) uses a three beam method and a push-pull method for detection of a tracking error signal and a Foucault method for detection of a focus error signal.

Further, with respect to optical disk apparatuses in general, while it is necessary to reduce the size of an optical system, namely, the most important part of the apparatus, to reduce costs and the size, use of a hologram optical element is becoming popular for the purpose of deflection and separation of a light beam. Use of a hologram optical element requires a caution since when a light beam is deflected in a predetermined direction, another light beam is always created in an unnecessary direction. If a light beams is created in an unnecessary direction, the efficiency of utilizing light is deteriorated to reduce an output current from a photodetector. As a result, the reliability of the apparatus is deteriorated.

Conventional Example 1

FIG. 1 is a perspective view showing an example of a structure of an optical system of a conventional optical disk apparatus. This optical disk apparatus uses the three beam method for detection of a tracking error signal and an astigmatism method for detection of a focus error signal. In the optical system of the optical disk apparatus, a light beam which is emitted in a horizontal direction from an LD (semiconductor laser) 1 which is disposed on an optical axis of the optical system impinges upon a diffraction grating 2 which is disposed on the optical axis in such a manner that its optical surface is perpendicular to the optical axis, to thereby be emitted as separate a 0-order light beam and two 1-order light beams. The 0-order light beam and the two 1-order light beams pass through a beam splitter 3 which is disposed on the optical axis and are then deflected upward by 90 degrees by an upward mirror 4a. An objective lens 4 which is disposed on the optical axis in such a manner that its optical surface is perpendicular to the optical axis, focuses the 90-degree deflected 0-order light beam and the 1-order light beams on a track 5a of a disk 5 which is rotated in the horizontal direction above the objective lens 4.

A main spot for reading an information signal and two side spots for detecting a tracking error signal are formed in a surface of the disk 5. The main spot and the two side spots are away from each other by a ¼ track in the direction of the radius of the disk 5.

Light beams from the main spot and the two side spots reflected by the disk 5 pass through the objective lens 4 in a reverse direction to that of when focused. The light beams are then deflected to side by 90 degrees by the upward mirror 4a, and return to the beam splitter 3. Each light beam is reflected within the beam splitter 3 to be deflected to side by 90 degrees and enter the signal detecting system.

In the signal detecting system, a servo lens 6 and a cylindrical lens (half column) 7 are disposed in this order on an optical axis of the signal detecting system so that optical surfaces of the servo lens 6 and the cylindrical lens 7 are perpendicular to the optical axis. The photodetecting system 8 is disposed in the vicinity of focal points of light beams from these two lenses. In the photodetecting system 8, a quarter dividing photodetector 8b is disposed to detect the focus error signal by the astigmatism method in the vicinity of a focal point of a main spot beam, while photodetectors 8a and 8c for detecting the tracking error signal by the three beam method are disposed in the vicinity of focal points of side spot beams.

The objective lens 4 is supported by support mechanisms which are movable independently of each other along two axes, i.e., the direction in which the disk 5 wobbles in a plane direction and the direction of the radius of the disk 5. Magnetic circuits for creating force in the directions of the two axis are attached to these support mechanisms. When a control current based on the focus error signal and the tracking error signal which are available from the photodetecting system 8 is supplied to coils of these magnetic circuits, focus servo and track servo are performed.

Now, an operation of the optical system of the optical disk apparatus having such a structure as above will be described in the following.

A light beam emitted from the LD 1 impinges upon the diffraction grating 2 to be separated into 0-order light beam and two 1-order light beams. The 0-order light beam and the 1-order light beams pass through the beam splitter 3 and are then deflected upward by 90 degrees by the upward mirror 4a. The objective lens 4 focuses the 90-degree deflected 0-order light beam and the 1-order light beams on the track 5a of the disk 5.

In other words, the main spot for reading the information signal and the two side spots for detecting the tracking error signal are formed in the surface of the disk 5 to be separated from each other by a ¼ track in the direction of the radius of the disk 5.

Light beams from the main spot and the two side spots reflected by the disk 5 pass through the objective lens 4 in a reverse direction to that of when focused. The light beams are then deflected to side by 90 degrees by the upward mirror 4a, and return to the beam splitter 3. Each light beam is reflected within the beam splitter 3 to be deflected to side by 90 degrees and enter the signal detecting system.

In the signal detecting system, the servo lens 6 and the cylindrical lens 7 converge each light beam. The main spot beam impinges upon the quarter dividing photodetector 8b so that the focus error signal is detected by the astigmatism method. The side spot beams impinge upon the photodetectors 8a and 8c so that the tracking error signal is detected by the three beam method. The information signal is generated by the sum of outputs from the quarter dividing photodetector 8b. According to the three beam method, the tracking error signal is defined as a difference in the quantity of reflected light from the two side spots which face each other on the both sides of a track due to displacements of the two side spots with respect to the track.

The astigmatism method will be described in the following.

When the cylindrical lens 7 gives reflected light beams from the disk 5 such astigmatism which causes light to be focused as segments which are perpendicular to each other at two positions, an astigmatic light beam is focused as an oval spot in an intermediate region between the image forming points at the two positions. In a condition where a light spot is accurately focused on the disk 5, if the quarter dividing photodetector is disposed at such a position at which a longer axis and a shorter axis of the oval spot of the astigmatic light beam replace with each other (i.e., the oval shape becomes round) within the intermediate region between the image forming points at the two positions, a difference between the sums of diagonal angles of the quarter detecting portions expresses the distance between the disk 5 and the objective lens 4, which can be used as the focus error signal. That is, the difference between the sums of diagonal angles of the quarter detecting portions is 0 in a condition where a light spot is accurately focused on the disk 5.

Conventional Example 2

FIG. 2 is a perspective view showing an example of a structure of an optical system of a conventional optical disk apparatus, as it is disclosed by Japanese Patent Application Laid-Open No. 57-37745 (1982). This optical disk apparatus uses the push-pull method for detection of a tracking error signal and a critical angle method for detection of a focus error signal.

In the optical system of the optical disk apparatus, a light beam which is emitted in a horizontal direction from an LD (semiconductor laser) 1 which is disposed on an optical axis of the optical system impinges upon a collimating lens 9, which is disposed on the optical axis so that its optical surface is perpendicular to the optical axis, to be emitted as parallel light. The parallel light is reshaped into a round shape by a shaping prism 10 which is disposed on the optical axis, and passes through the beam splitter 3 which is disposed on the optical axis in contact with the shaping prism 10. After passing through the beam splitter 3, the light beam is deflected upward by 90 degrees by the upward mirror 4a. The objective lens 4 which is disposed on the optical axis in such a manner that an optical surface is perpendicular to the optical axis, focuses and reflects the 90-degree deflected light beam on the track 5a of the disk 5 which is rotated in the horizontal direction above the objective lens 4.

The reflected light beams from the disk 5 passes through the objective lens 4 in a reverse direction to that of when focused. The light beams are then deflected to side by 90 degrees by the upward mirror 4a, and return to the beam splitter 3. Each light beam is reflected within the beam splitter 3 to be deflected to side by 90 degrees and enter the signal detecting system.

In the signal detecting system, the incident light beams are partially reflected by another beam splitter 11 which is disposed on an optical axis of the signal detecting system, to be deflected to side by 90 degrees. The rest of the incident light passes through the beam splitter 11, impinges upon an MO signal detecting system, and is then separated by a Wollaston prism 14, which is disposed on an optical axis of the MO signal detecting system, by polarization into two linearly polarized light beams. The two linearly polarized light beams each enter a halving photodetector 15.

The light beam which is deflected by 90 degrees by the beams splitter 11 impinges upon a servo error signal detecting system, and is reflected by a critical angle prism 12 which is disposed on an optical axis of the servo error signal detecting system, to be thereby incident upon a quarter dividing photodetector 13. The other structure is similar to the structure of the optical disk apparatus of Conventional Example 1 described above, and therefore, will not be described.

Now, an operation of the optical system of the optical disk apparatus having such a structure as above will be described in the following.

A light beam emitted from the LD 1 impinges upon the collimating lens 9 to be emitted as parallel light. The parallel light is reshaped into a round shape by the shaping prism 10 and passes through the beam splitter 3. After passing through the beam splitter 3, the light beam is deflected upward by 90 degrees by the upward mirror 4a. The objective lens 4 focuses and reflects the 90-degree deflected light beam on the track 5a of the disk 5.

The reflected light beams from the disk 5 passes through the objective lens 4 in a reverse direction to that of when focused. The light beams are then deflected to side by 90 degrees by the upward mirror 4a, and return to the beam splitter 3. Each light beam is reflected within the beam splitter 3 to be deflected to side by 90 degrees and enter the signal detecting system.

In the signal detecting system, the incident light beams are partially reflected by the beam splitter 11, to be deflected to side by 90 degrees. The rest of the incident light passes through the beam splitter 11, impinges upon the MO signal detecting system, and is then separated by the Wollaston prism 14 by polarization into two linearly polarized light beams. The two linearly polarized light beams are each detected by the halving photodetector 15, and the information signal is obtained from a difference between the same.

The light beam which is deflected by 90 degrees by the beams splitter 11 impinges upon the servo error signal detecting system, and is reflected by the critical angle prism 12 which is disposed on the optical axis of the servo error signal detecting system, to be thereby incident upon the quarter dividing photodetector 13. If a light spot is accurately focused on the disk 5 here, the light beam is totally reflected by a reflection surface of the critical angle prism 12 and allowed into the photodetector 13.

If the disk 5 is farther than the focal point of the objective lens 4, the light beam impinging upon the reflection surface of the critical angle prism 12 is separated into a light beam whose incident angle is larger than a critical angle with respect to the optical axis and a light beam whose incident angle is smaller than the critical angle with respect to the optical axis. While the light beam whose incident angle is smaller than the critical angle is totally reflected, the light beam whose incident angle is larger than the critical angle is partially transmitted. If the disk 5 is closer than the focal point of the objective lens 4, the light beam whose incident angle is larger than the critical angle is totally reflected, whereas the light beam whose incident angle is smaller than the critical angle is partially transmitted. As a result, a light beam on the photodetector 13 becomes bright or dark depending on whether the disk 5 is farther than or closer than the focal point of the objective lens 4. Hence, a focus error signal is obtained by finding a difference between the sum of outputs from two detecting portions on the right side and the sum of outputs from two detecting portions on the left side of the quarter dividing photodetector 13 (critical angle method).

As the position of a light spot on the disk 5 is displaced from the position of a track, a light spot on the photodetector 13 is displaced in a vertical direction as shown in FIGS. 5A and 5C. On the other hand, if the position of a light spot on the disk 5 is on the position of a track, a light spot on the photodetector 13 is not displaced in any direction as shown in FIG. 5B. Hence, a tracking error signal is obtained by finding a difference between the sum of outputs from upper two detecting portions and the sum of outputs from lower two detecting portions of the quarter dividing photodetector 13 (push-pull method).

Conventional Example 3

FIG. 3 is a perspective view showing an example of a structure of an optical system of a conventional optical disk apparatus. This optical disk apparatus uses push-pull method for detection of a tracking error signal and the Foucault method for detection of a focus error signal.

In the optical system of the optical disk apparatus, a light beam which is incident upon a signal detecting system is partially reflected by a beam splitter 11 which is disposed on an optical axis of the signal detecting system, to be deflected to side by 90 degrees. The rest of the incident light passes through the beam splitter 11. The 90-degree deflected light beam impinges upon an MO signal detecting system, and is then separated by the Wollaston prism 14, which is disposed on an optical axis of the MO signal detecting system, by polarization into two linearly polarized light beams. The two linearly polarized light beams each enter the halving photodetector 15.

The light beam which passed through the beam splitter 11 enters a servo error signal detecting system, and is converged by a servo lens 6. The converged light beam is partially deflected to side by 90 degrees by a half mirror 4b which is disposed on the optical axis. The rest of the light beam propagates straight. The 90-degree deflected light beam impinges upon a halving photodetector 13a for detecting a tracking error signal. The light beam propagating straight is separated into the right and the left by a wedge prism 14a, which is disposed the optical axis so that its optical surface is perpendicular to the optical axis, to thereby enter a quarter dividing photodetector 13b for detecting a focus error signal each in a near field condition. The other structure is similar to the structure of the optical disk apparatus of Conventional Example 2 described above, and therefore, will not be described.

Now, an operation of the optical system of the optical disk apparatus having such a structure as above will be described in the following.

A reflected light beam impinging upon the signal detecting system is partially deflected to side by 90 degrees by the beam splitter 11. The rest of the light passes through the beam splitter 11, to be deflected to side by 90 degrees. The 90-degree deflected light beam impinges upon the MO signal detecting system, and is then separated by the Wollaston prism 14 by polarization into two linearly polarized light beams. The two linearly polarized light beams are each detected by the halving photodetector 15, and the information signal is obtained from a difference between the same.

The light beam passing through the beams splitter 11 impinges upon the servo error signal detecting system, and is converged by the servo lens 6. The converged light beam is partially deflected to side by 90 degrees by the half mirror 4b which is disposed on the optical axis. The rest of the light beam propagates straight. The 90-degree deflected light beam impinges upon the halving photodetector 13a. The halving photodetector 13a yields a tracking error signal by the push-pull method which was described in relation to the optical disk apparatus according to Conventional Example 2.

The light beam propagating straight through the half mirror 4b is separated into the right and the left by the wedge prism 14a, to each impinge upon a dividing line of upper two detecting portions and a dividing line of lower two detecting portions of the quarter dividing photodetector 13b. If a light spot is accurately focused on the disk 5 here, the light beam separated into the right and the left form spots of the near field condition on the dividing line of the upper two detecting portions and the dividing line of the lower two detecting portions on the photodetector 13b, as shown in FIG. 4B.

If the disk 5 is closer than the focal point of the objective lens 4, of the respective detecting portions a to d of the photodetector 13b which correspond to positions which are located by dividing a spot on the track 5a into four, the light beams separated into the right and the left form far field spots on the detection parts a and c of the outer side (at the front and the end) (FIG. 4A). If the disk 5 is farther than the focal point of the objective lens 4, the light beams separated into the right and the left form far field spots on the detection parts b and d of the inner side (at the center) (FIG. 4C). Hence, a light beam on the photodetector 13b becomes bright or dark depending on whether the disk 5 is farther than or closer than the focal point of the objective lens 4. Hence, a focus error signal is obtained by finding a difference between the sums of outputs from the detecting portions of diagonal angles (Foucault method). The other operations are similar to those of the optical disk apparatus of Conventional Example 2 described above, and therefore, will not be described.

Conventional Example 4

FIG. 6 is a perspective view showing an example of a structure of an optical system of a conventional optical disk apparatus. This is an example which is shown in FIG. 3 of Optical Data Storage Topical Meeting 1992, Technical Digest 32/MC2 to MC2/35. In this optical system, a light beam which is emitted in a horizontal direction from an LD (semiconductor laser) 51 is deflected upward by 90 degrees by a mirror 52 which is disposed on an optical axis. The 90-degree deflected light beam impinges upon a hologram optical element 53, which is disposed on the optical axis so that its optical surface is perpendicular to the optical axis, to be separated by diffraction into 0-order light, ±1-order light and other higher-order light. Of such light, a 0-order light beam is focused by an objective lens system on a disk which is rotated in the horizontal direction above the objective lens. The structure is designed so that the light beams other than the 0-order light beam are totally reflected by the objective lens system.

The light beam which is reflected by the disk passes through the objective lens in a reverse direction to that of when focused, to be incident upon the hologram optical element 53 in a reverse direction to that described above. The light beam impinging upon the hologram optical element 53 is diffracted and divided by regions 531 to 534, i.e., four divided regions of the hologram optical element 53, to each impinge upon each one of the photodetectors including photodetectors 54a to 54d of a photodetecting system 54. In this case, light beams impinging upon the respective photodetectors of the photodetecting system 54 are both ±1-order (diffracted) light and −1-order (diffracted) light.

The respective regions 531 to 534 of the hologram optical element 53 are designed so that light beams for generating a tracking error signal are outputted from the regions 531 and 532 and light beams for generating a focus error signal are outputted from the regions 533 and 534. In this optical system, a focus error signal and a tracking error signal are generated from the +1-order light and the −1-order light which are detected by the respective photodetectors of the photodetecting system 54.

A CD-ROM, a magneto optical disk and a phase-variable optical disk cannot be driven unless each driven by a special driving apparatus.

As in Conventional Example 1, if the three beam method is used to detect a tracking error signal, the diffraction grating 2 which generates three beams is necessary, which increases the number of necessary parts. Since a light beam is divided into a main spot and side spots, less light is left available for reading of information. As the quantity of light decreases, it is impossible to adequately perform recording and erasing in a re-writable disk.

Meanwhile, in the astigmatism method for detecting a focus error signal, since a difference between the sums of outputs from diagonal angles of the quarter dividing photodetector 8b is found, a focus offset is created when an intensity distribution of light are different between the two opposing angle directions. An optical disk uses many plastic substrates which are influenced by double refraction, and therefore, reflected light from the disk often has different intensity distributions between the two opposing angle directions.

In the case of a CD-ROM in which information is written as a row of pits, since an information signal is detected based on a difference between reflection which is created when there are pits and reflection which is created when there are not pits, the difference between the quantities of reflection is preferably large. However, a condition for increasing the difference between the quantities of reflection contradicts a condition for increasing the amplitude of a signal in the push-pull method used for detection of a tracking error signal in Conventional Examples 2 and 3. That is, when the depth of a pit is $\lambda/4$ to increase the difference between the quantities of reflection, it is impossible to obtain a push-pull signal.

The optical disk apparatuses of Conventional Examples 2 and 3 can drive only a ROM disk with the depth of a pit other than $\lambda/4$ or a disk in which a successive groove is created in advance so that a push-pull signal can be obtained.

The critical angle method which is used to detect a focus error signal in Conventional Example 2 requires a high accuracy in disposing the critical angle prism, and is influenced by a distribution of light quantity in the direction in which the reflection surface of the prism is inclined. Further, since a spot of a light beam is large in the photodetector 13, a light receiving area of the photodetector 13 becomes large so that a cost for the photodetector 13 becomes high. In addition, if the light receiving area of the photodetector 13 is large, a junction capacitance is large, which inconveniently increases a noise component.

Meanwhile, during generating of a servo signal and a reproduction signal (information signal) by the same quarter dividing photodetector 8b as in Conventional Example 1, a component of the reproduction signal is prevented from getting included in the servo signal. Hence, it is necessary to add a circuit or a filter which utilizes a difference in frequency between the servo signal and the reproduction signal to thereby separate a component of the reproduction signal.

As in Conventional Example 4, when the hologram optical element 53 is divided into four and the respective two regions are used to generate a tracking error signal and the focus error signal, the quantity of a light beam emitted from each one of the regions becomes ¼ of that of original reflection light. Further, while +1-order light emitted from the region 533 impinges upon the photodetector 54e, for example, −1-order light is always emitted in a symmetrical direction with respect to the +1-order light to the photodetector 54e and the diffraction grating.

Hence, the quantity of light received by the photodetector 54e becomes ½ of the quantity of light which is emitted from the region 533. In reality, there is light of ±2- or higher-order light, the quantity of light which reaches the photodetector 54e becomes ½. Hence, the quantity of light which reaches the photodetector 54e becomes (¼)×(½)=⅛ or less of the total quantity of light entering the hologram optical element 53, which allows an influence of a noise, stray light and the like more influential.

The foregoing is summarized as follows.

A CD-ROM, a magneto optical disk and a phase-variable optical disk cannot be driven unless each driven by a special driving apparatus.

When the three beam method is used to detect a tracking error signal, the number of parts becomes large so that the quantity of light which is used for reading of information becomes small, which makes it impossible to adequately perform recording and erasing in a re-writable disk.

When the astigmatism method for detecting a focus error signal, a focus offset is created in a disk which uses a plastic substrate.

For the purpose of detecting a tracking error signal, the push-pull signal can be used only on a disk in which a successive groove is created in advance.

It is not desirable to use the critical angle method to detect a focus error signal.

When both servo signals and a reproduction signal (information signal) are generated by the same photodetector, it is necessary to add a circuit or a filter which separate a component of the reproduction signal.

When a hologram optical element is divided into four, an influence of a noise, stray light and the like become more influential.

SUMMARY OF THE INVENTION

The present invention has been made considering the above, and aims to provide for an optical disk apparatus which can drive a CD-ROM, a magneto optical disk and a phase-variable optical disk without using the three beam method, the astigmatism method nor the critical angle method.

In an optical disk apparatus according to the present invention, an optical element divides a light reflected by an optical disk into a plurality of light beams for generating a tracking error signal and a focus error signal, and these light beams are deflected into different directions from each other. Optical detecting means detects each one of these light beams. A first calculating means calculates and outputs a focus error signal based on outputs from the photodetecting means, a second calculating means calculates and outputs a tracking error signal based on the outputs from the photodetecting means in accordance with the structure of a track. Hence, it is possible to drive a CD-ROM, a magneto optical disk and a phase-variable optical disk.

For instance, a focus error signal is obtained by the Foucault method, regardless of the structure of a track. When a track of an optical disk includes only a row of pits as in the case of a CD-ROM, a tracking error signal is obtained by a heterodyne method. Further, when a track of an optical disk includes a successive groove as in the case of a magneto optical disk, a tracking error signal is obtained by the push-pull method. Selection of a tracking error signal can be performed on the basis of an output signal from a judging means. When the judging means reads information recorded in an optical disk to judge, the judging means can automatically distinguish a CD-ROM, a magneto optical disk and a phase-variable optical disk and can drive them separately. The judging means may be structured so as to be able to judge on the basis of an inputting operation by an operator.

The optical element for dividing the reflected light, the means for detecting divided light beams, and the means for calculating detected signals, which realize this optical disk apparatus, may be structured as follows.

(1) At a cross section of the reflected light, the optical element divides the reflected light into two first divided light beams located at the sides of a track line corresponding to a central line of the track and two second divided light beams for generating the focus error signal, and deflects the divided light beams into different directions from each other. In this case, the photodetecting means includes two first halving photodetectors respectively disposed at far fields of the two first divided light beams and two second halving photodetectors respectively disposed at focal points of the two second divided light beams. The first calculating means calculates a difference between sums of signals from the detecting portions for detecting the second divided light beam at diagonal angles of the positions on the cross section of the reflected light, of the second halving photodetectors, and calculates (by the Foucault method) and outputs a focus signal. When the track of an optical disk includes a successive groove, the second calculating means calculates a difference between sums of signals from the detecting portions of each of the first halving photodetector, to thereby calculate (by the push-pull method) and output a tracking error signal. When the track of an optical disk includes only a row of pits, the second calculating means calculates a tracking error signal (by the heterodyne method) and output the same, on the basis of a phase difference between a signal which is obtained by calculating a difference between sums of signals from the detecting portions for detecting the first divided light beams at diagonal angles of the positions on the cross section of the reflected light of the first halving photodetector, and a signal which is obtained by calculating a sum of all signals from the first and second halving photodetectors.

When the optical element causes a focal distance of the second divided light beams to be different from a focal distance of the first divided light beams, it is allowable to arrange the photodetecting means for detecting the respective light beams on the same plane.

(2) The optical element divides the reflected light into four light beams and to deflect the divided light beams into different directions from each other. The photodetecting means includes the halving photodetector which are disposed at the focal points of the four light beams. The first calculating means calculates a sum of two or four differences in signals from the detecting portions of the respective halving photodetectors, to thereby calculate a focus error signal (by the Foucault method). When the track includes a successive groove, the second calculating means calculates a difference between sums of signals from the halving photodetectors for the light beams which are located on the same side of the track line to thereby calculate a tracking error signal (by the push-pull method) and output the same. When the track includes only a row of pits, the second calculating means calculates a tracking error signal (by the heterodyne method) and output the same, on the basis of a phase difference between a signal which is obtained by calculating a difference between sums of signals out of the detecting portions for detecting the divided light beams at the diagonal light beam positions on the cross section of the reflected light, of the halving photodetectors, and a signal which is obtained by calculating a sum of all outputs from the halving photodetector.

When the halving photodetectors have the dividing lines of the same direction, the photodetecting means is easily adjusted in the position thereof.

(3) The optical element divides the reflected light into three in the track line direction and into two in the perpendicular direction to the track line direction, and to deflect the six divided light beams into different directions from each other. The photodetecting means includes pp-photodetectors which are located at the focal points of two light beams at the center of the track line direction, and halving photodetectors which are located at the focal points of the rest four light beams. The first calculating means calculates a sum of two or four differences in signals from the detecting portions of the respective halving photodetectors, to thereby calculate a focus error signal (by the Foucault method). When the track includes a successive groove, the second calculating means calculates a difference between signals from the pp-photodetectors or calculates a difference between sums of outputs from the pp-photodetectors and the halving photodetectors for light beams which are located on the same side of the track line, to thereby calculate a tracking error signal (by the push-pull method) and output the same. When the track includes only a row of pits, the second calculating means calculates a tracking error signal (by the heterodyne method) and outputs the same, on the basis of a phase difference between a signal which is obtained by calculating a difference between sums of signals from the detecting portions for the diagonal light beam positions on the cross section of the reflected light of the halving photodetectors, and a signal which is obtained by calculating a sum of all signals from the pp-photodetectors and the halving photodetectors.

In the structure as described above, it is possible to reduce the number of branching of the optical system when the optical element is disposed at such a position which transmits a light beam for irradiating the optical disk into a reverse direction to that of reflected light from the optical disk as 0-order light, which in turn reduces the size of the optical system. Further, when the optical element is disposed in the same path as the abovementioned detectors for servo so as to divide the reflected light in accordance with the polarized state so that the divided light is received by an information signal photodetector, it is possible to further reduce the number of branching of the optical system, which in turn reduces the size of the optical system.

Further, the present invention aims to provide for an optical disk apparatus in which a servo signal and a reproduction signal (information signal) are not generated by the same photodetector.

(4) The optical element partially transmits reflected light from an optical disk as 0-order light, and the information signal photodetector receives the transmitted light beam transmitted as 0-order light. The first calculating means calculates a difference between sums of signals from the detecting portions of the halving photodetectors for the light beams in diagonal positions on the cross section of the reflected light, which are located at the focal points of the two second divided light beams for generating a focus error signal in the structure (1), to thereby calculate a focus error signal (by the Foucault method) and output the same. When the track includes a successive groove, the second calculating means calculates a difference between sums of signals from the detecting portions of the respective first halving photodetectors, to thereby calculate a tracking error signal (by the push-pull method) and output the same. When the track includes only a row of pits, the second calculating means calculates a phase difference between a signal which is obtained by calculating a difference between sums of signals from the detecting portions for the light beams in diagonal positions on the cross section of the reflected light of the first halving photodetectors, and an output signal from an information signal photodetector for reproducing an information signal, to thereby calculate a tracking error signal (by the push-pull method) and output the same.

(5) The optical element partially transmits reflected light from an optical disk as 0-order light, and the information signal photodetector receives the transmitted light beam transmitted as 0-order light. The first calculating means calculates a sum of two or four differences in signals from the detecting portions of the respective halving photodetectors in the structure (2), to thereby calculate a focus error signal (by the Foucault method). When the track includes a successive groove, the second calculating means calculates a difference between sums of signals from the detecting portions for the light beams which are located on the same side of the track line, of halving photodetectors to thereby calculate a tracking error signal (by the push-pull method) and output the same. When the track includes only a row of pits, the second calculating means calculates a tracking error signal (by the heterodyne method) and outputs the same, based on a phase difference between a signal which is obtained by calculating a difference between sums of signals from the detecting portions for the light beams in diagonal positions on the cross section of the reflected light, of the respective halving photodetectors, and an output signal from the information signal photodetector for reproducing an information signal.

(6) The optical element partially transmits reflected light from an optical disk as 0-order light, and the information signal photodetector receives the transmitted light beam transmitted as 0-order light. The first calculating means calculates a sum of two or four differences in signals from the detecting portions of the respective four halving photodetectors in the structure (3), to thereby calculate a focus error signal (by the Foucault method). When the track includes a successive groove, the second calculating means calculates a difference between signals from the photodetectors which are located at the focal points of inner two light beams, or calculates a difference between sums of signals from the photodetector and the halving photodetectors for light beams which are located on the same side of the track line to thereby calculate a tracking error signal (by the push-pull method) and output the same. When the track includes only a row of pits, the second calculating means calculates a tracking error signal (by the heterodyne method) and outputs the same, on the basis of a phase difference between a signal which is obtained by calculating a difference between sums of signals from the detecting portions for the light beams in diagonal positions on the cross section of the reflected light of the halving photodetectors, and an output signal from the information signal photodetector for reproducing an information signal. In the structures (4) to (6), a servo signal and an information signal are not generated by the same photodetector, so that it is not necessary to dispose a circuit or a filter which separates a component of the information signal.

Still further, the present invention aims to provide for an optical disk apparatus which is not easily influenced by a noise, stray light and the like even when a hologram optical element is used.

(7) The diffraction optical element includes a plurality of regions upon which reflected light from an optical disk impinges, and of these regions, +1-order light beams and −1-order light beams are outputted from the respective two regions. In the photodetecting means, third halving photodetectors which are disposed at far fields of two light beams, ones of the +1-order light beams or the −1-order light beams, and fourth halving photodetectors which are disposed at the focal points of the other two light beams each detect each light beam. The first calculating means calculates a difference between a sum of signals at the outer two detecting portions and a sum of signals at the inner two detecting portions, of the fourth halving photodetectors, in the light beams position on the cross section of the reflected light, to thereby calculate a focus error signal (by the Foucault method). When the track includes a successive groove, the second calculating means calculates a difference between sums of signals from the detector portions which are on the same side in the direction which is perpendicular to the track line direction, of the third halving photodetectors, to thereby calculate a tracking error signal (by the push-pull method) and output the same. When the track includes only a row of pits, the second calculating means calculates a tracking error signal (by the heterodyne method) and outputs the same, on the basis of a phase difference between a signal which is obtained by calculating a difference between sums of signals from the detecting portions for the light beams in diagonal positions on the cross section of the reflected light, of the third halving photodetectors, and a signal which is obtained by calculating a sum of signals from all halving photodetectors. In this case, it is possible to realize an optical disk apparatus which is not easily influenced by a noise, stray light and the like even when a hologram optical element is used.

When the optical element includes two regions which are divided by a dividing line which is perpendicular to the track line, the two fourth halving photodetectors can divide reflected light from the optical disk into four in the track line direction, and therefore, it is possible to obtain a focus error signal which is not influenced by a tracking error signal.

(8) The diffraction optical element includes three regions which are divided by two dividing lines which are perpendicular to the track line direction, and of these regions, +1-order optical beams and −1-order light beams are outputted from the respective outer two regions while another light beam is outputted from the central region. In the photodetecting means, third halving photodetectors which are disposed at far fields of two light beams, the +1-order light beams or the −1-order light beams, fourth halving photodetectors which are disposed at the focal points of the other two light beams, and an information signal photodetector which receives the light beam from the central region and reproduces the information signal each detect each light beam. The first calculating means calculates a focus error signal (by the Foucault method), on the basis of a difference between a sum of signals at the outer two detecting portions and a sum of signals at the inner two detecting portions, of the fourth half dividing photodetector, in the light beams position on the cross section of the reflected light. When the track includes a successive groove, the second calculating means calculates a difference between sums of signals from the detector portions which are on the same side in the direction which is perpendicular to the track line, of the third halving photodetectors, to thereby calculate a tracking error signal (by the push-pull method) and output the same. When the track includes only a row of pits, the second calculating means calculates a tracking error signal (by the heterodyne method) and outputs the same, on the basis of a phase difference between a signal which is obtained by calculating a difference between sums of signals from the detecting portions of the third halving photodetectors for the light beams in diagonal positions on the cross section of the reflected light, and an output signal from the information signal photodetector which receives the light beam from the central region or a signal which is obtained by calculating a sum of signals from the photodetector and the four halving photodetectors. In the prior case, a servo signal and an information signal are not generated by the same photodetector, so that it is not necessary to dispose a circuit or a filter which separates a component of the information signal.

In the structures (7) and (8), when the optical dement is disposed at such a position which transmits a light beam for irradiating the optical disk into a reverse direction to that of reflected light from the optical disk as 0-order light, it is possible to reduce the number of branching of the optical system, and hence, the size of the optical system.

In the structures (7) and (8), when the dividing lines of the third halving photodetectors are parallel to the track line, it is possible to calculate a tracking error signal. Further, when the dividing lines of the fourth halving photodetectors are each perpendicular to the track line, it is possible to calculate a focus error signal. When one of the third halving photodetectors is disposed at a far field prior to converging and the other one of the third halving photodetectors is disposed at a far field after converging, the freedom of locating the photodetecting means is increased.

Now, a description will be given on the positions of the optical element, the photodetecting means and the calculating means.

In the optical disk apparatus according to the present invention, the photodetectors which are included in the photodetecting means (and the information signal photodetector) are disposed on the same plane or the same substrate. In this case, it is possible to reduce the size of the apparatus, and attaching and adjustment are easy. Further, it is possible to reduce the number of parts, which in turn reduces a manufacturing cost.

When the optical element is disposed at such a position which transmits a light beam for irradiating an optical disk in a reverse direction to that of reflected light as 0-order light, it is allowable to arrange the photodetectors and a light source which generates a light beam on the same substrate. This further reduces the size of the apparatus.

Further, the optical disk apparatus comprises a support member which is disposed for supporting the light source on the substrate and discharging heat which is generated by the light source. This enhances the effect of discharging heat, which prevents destruction of the light source itself due to heat and avoids an adverse effect over the parts such as the photodetectors due to heat.

Still further, in the optical disk apparatus according to the present invention, the respective photodetectors are disposed on the same substrate, and a mirror is disposed on the same substrate to deflect a light beam from the light source into the direction of the optical element. In this case, since the light source is not disposed on the same substrate, this protects the substrate from heat which is generated by the light source.

Still further, in the optical disk apparatus according to the present invention, a housing is disposed on the same substrate to house the photodetectors and the light source for generating light beams, and the optical element is fixed on a surface of the housing. This makes it easy to set a positional relationship between the photodetecting means, the light source and the optical element relative to each other, and attaching and adjustment of these components are easy. Further, these components are formed as one unit, so that it is possible to treat the same as an optical device in which such relative positional relationship is already set.

Still further, in the optical disk apparatus according to the present invention, of the third and the fourth halving photodetectors, those which receive a light beam from the same region of the diffraction optical element are disposed on the afore-mentioned substrate at symmetrical positions with respect to a cross section of the light beam for reproducing the information signal. Hence, it is easy to adjust a positional relationship between these halving photodetectors relative to each other.

Still further, in the optical disk apparatus according to the present invention, since the first and the second calculating means are disposed on the same substrate, it is possible to reduce the size of the apparatus, and assembling is easy. In addition, it is possible to reduce the number of the parts, which in turn reduces a manufacturing cost.

Still further, in the optical disk apparatus according to the present invention, each photodetector is formed directly on the substrate. Hence, it is easy to reduce the size of the apparatus, adjustment of positional relationships between the photodetectors is not necessary, and assembling is easy. In addition, it is possible to reduce the number of the parts, which in turn reduces a manufacturing cost.

Still further, in the optical disk apparatus according to the present invention, a hologram optical element is used as the optical element. This reduces the weight and the size of the apparatus, and hence, a manufacturing cost.

The above and further objects and features of the invention will more fully be apparent from the following detailed description with accompanying drawings.

BRIEF DESCRIPTION OF THE DRAWINGS

FIG. 5A is an explanatory diagram for describing the push-pull method;

FIG. 5B is an explanatory diagram for describing the push-pull method;

FIG. 5C is an explanatory diagram for describing the push-pull method;

FIG. 12A is a view showing the positions of a pit and a spot relative to each other;

FIG. 12B is a view showing the RF signal;

FIG. 12C is a view showing the HID signal;

FIG. 12D is a view showing a sampling pulse;

FIG. 12E is a view showing a sampling pulse;

FIG. 12F is a view showing a holding signal;

FIG. 12G is a view showing a holding signal;

FIG. 12H is a view showing a tracking error signal;

FIG. 13 is a perspective view showing an example of a structure of an optical system of an optical disk apparatus according to a second embodiment of the present invention;

FIG. 18 is a perspective view showing an example of a structure of an optical system and a photodetecting system of an optical disk apparatus according to a fourth embodiment of the present invention;

DESCRIPTION OF THE PREFERRED EMBODIMENTS

In the following, the present invention will be described with reference to the drawings showing embodiments thereof.

First Embodiment

Figure 7:
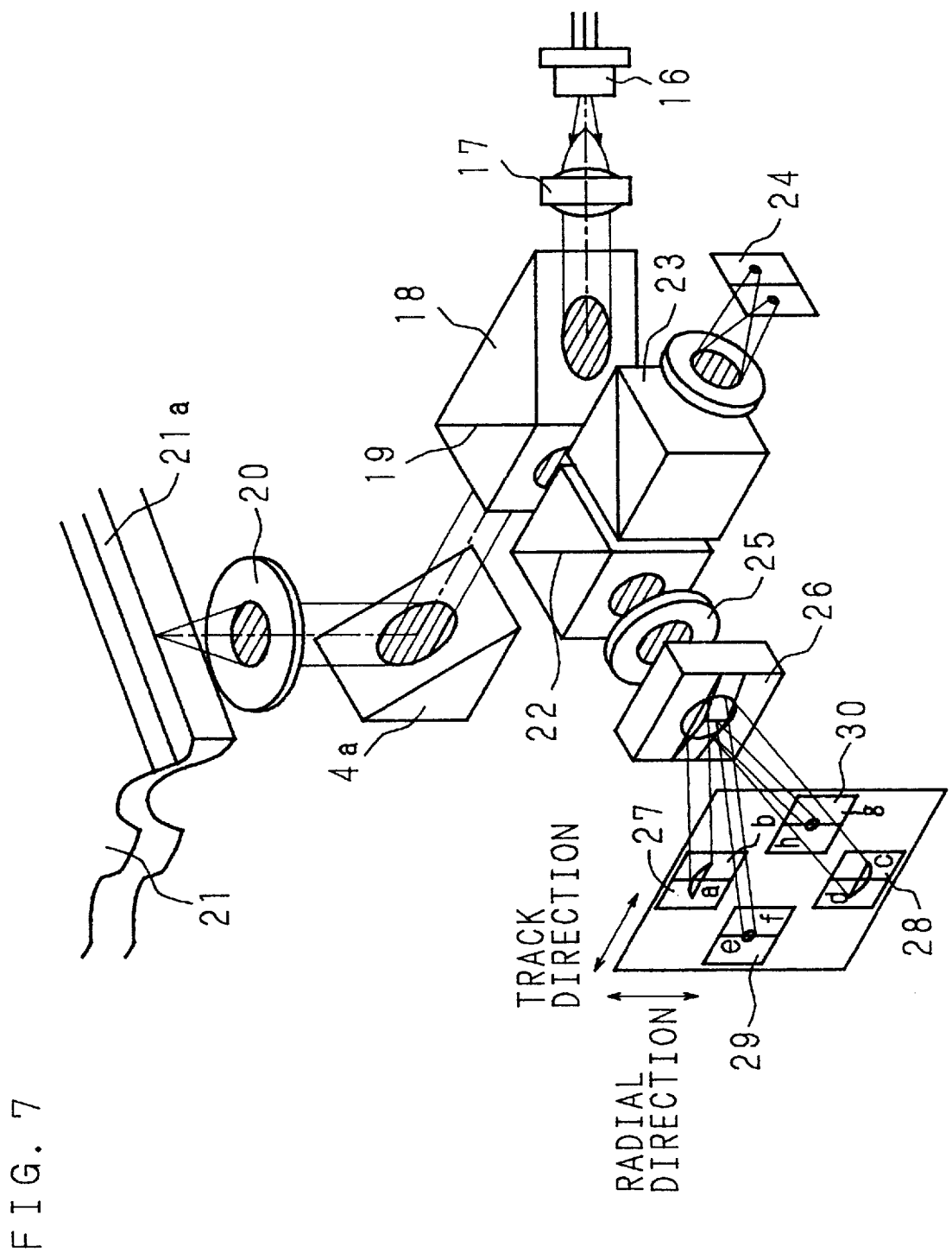
FIG. 7 is a perspective view showing an example of a structure of an optical system of an optical disk apparatus according to a first embodiment of the present invention.

FIG. 7 is a perspective view showing an example of a structure of an optical system of an optical disk apparatus according to a first embodiment of the present invention. In this optical disk apparatus, a light beam which is emitted in a horizontal direction from an LD (semiconductor laser) 16 which is disposed on an optical axis of this optical system impinges upon a collimating lens 17, which is disposed on the optical axis so that its optical surface is perpendicular to the optical axis, to be converted into parallel light.

The light beam converted into parallel light from the collimating lens 17 impinges upon a shaping prism 18 which is disposed on the optical axis, so as to be shaped into a round shape. The light beam then passes through a beam splitter 19, and is then deflected upward 90 degrees by an upward mirror 4a. The 90-degree deflected light beam is converged by an objective lens 20, which is disposed on the optical axis so that its optical surface is perpendicular to the optical axis, on a track 21a of a disk 21 which is rotated in a horizontal direction above the objective lens 20.

Reflected light reflected by the disk 21 passes through the objective lens 20 in a reverse direction to that of when focused. The light beams are then deflected to side by 90 degrees by the upward mirror 4a, and return to the beam splitter 19. The reflected light is reflected within the beam splitter 19 to be deflected to side by 90 degrees and to enter the signal detecting system. In the signal detecting system, a beam splitter 22, a servo lens 25 and a prism 26 are disposed in this order on an optical axis of the signal detecting system so that optical surfaces of the servo lens 25 and the prism 26 are perpendicular to the optical axis. The reflected light entering the signal detecting system is partially reflected within the beam splitter 22 to enter an MO signal detecting system. The portion of the reflected light entering the MO signal detecting system is divided by polarization by a Wollaston prism 23 which is disposed on an optical axis of the MO signal detecting system into two linearly polarized light beams. The two linearly polarized light beams impinge upon detecting portions of a halving photodetector 24, respectively.

Figure 9A:
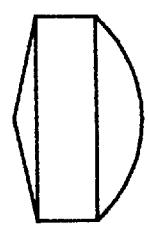
FIG. 9A is a top view of a prism which is used in the first embodiment.
Figure 9B:
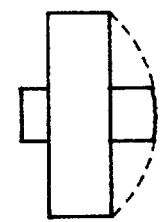
FIG. 9B is a side view of a prism which is used in the first embodiment.

A portion of the reflected light which entered the signal detecting system and is transmitted by the beam splitter 22 impinges upon the prism 26 through the servo lens 25. As shown in the top view in FIG. 9A and the side view in FIG. 9B, the prism 26 is structured by dividing an optical surface of a flat rectangular solid at dividing lines, which extend in a track direction (track line direction) on the cross section of the beams, which corresponds to the direction of the track 21a, into three parts, i.e., a top part, a middle part and a bottom part, and the middle part of an outgoing side is shaped like a roof so that an edge line thereat extends upright (i.e., perpendicular to the track direction; in the direction corresponding to the radius of the disk 21). An incident side of the roof-shaped portion is a lens, and a focal distance of a light beam (i.e., light beam for generating a focus error signal) passing through the roof-shaped portion as it is measured from the prism 26 is different from a focal distance of a light beam (i.e., light beam for generating a tracking error signal) passing through the other portions as it is measured from the prism 26.

Of the reflected light entering the prism 26, a portion passing through an upper portion of the prism 26 is deflected upward, a portion passing through the right-hand side of the roof-shaped portion toward the front of a traveling direction is deflected toward the left-hand side, a portion passing through the left-hand side of the roof-shaped portion toward the front of a traveling direction is deflected toward the right-hand side, and a portion passing through a lower portion of the prism 26 is deflected downward. The deflected light beams each enter halving photodetectors 27 to 30 of the photodetecting system which are disposed on the same plane which is perpendicular to the optical axis of the signal detecting system.

In other words, the light beam passing through the upper portion of the prism 26 impinges upon the upright dividing line of the halving photodetector 27 whose right-hand side toward the front of a traveling direction is a detecting portion a while the left-hand side toward the front of a traveling direction is a detecting portion b, in a far field condition.

The light beam passing through the right-hand side portion of the roof-shaped portion of the prism 26 toward the front of a traveling direction impinges upon the upright dividing line of the halving photodetector 30 whose right-hand side toward the front of a traveling direction is a detecting portion h while the left-hand side is a detecting portion g, in the near field condition.

The light beam passing through the left-hand side portion the roof-shaped portion of the prism 26 toward the front of a traveling direction impinges upon the upright dividing line of the halving photodetector 29 whose right-hand side toward the front of a traveling direction is a detecting portion e while the left-hand side is a detecting portion f, in the near field condition.

The light beam passing through the lower portion of the prism 26 impinges upon the upright dividing line of the halving photodetector 28 whose right-hand side toward the front of a traveling direction is the detecting portion d while the left-hand side is the detecting portion c, in the far field condition.

The objective lens 20 is supported by support mechanisms which are movable independently of each other along two axes, i.e., the direction in which the disk 21 wobbles in a plane direction and the direction of the radius of the disk 21. Magnetic circuits for creating force in the directions of the two axis are attached to these support mechanisms. When a control current based on the focus error signal and the tracking error signal which are available from the photodetecting system is supplied to coils of these magnetic circuits, focus servo and track servo are performed.

Figure 8:
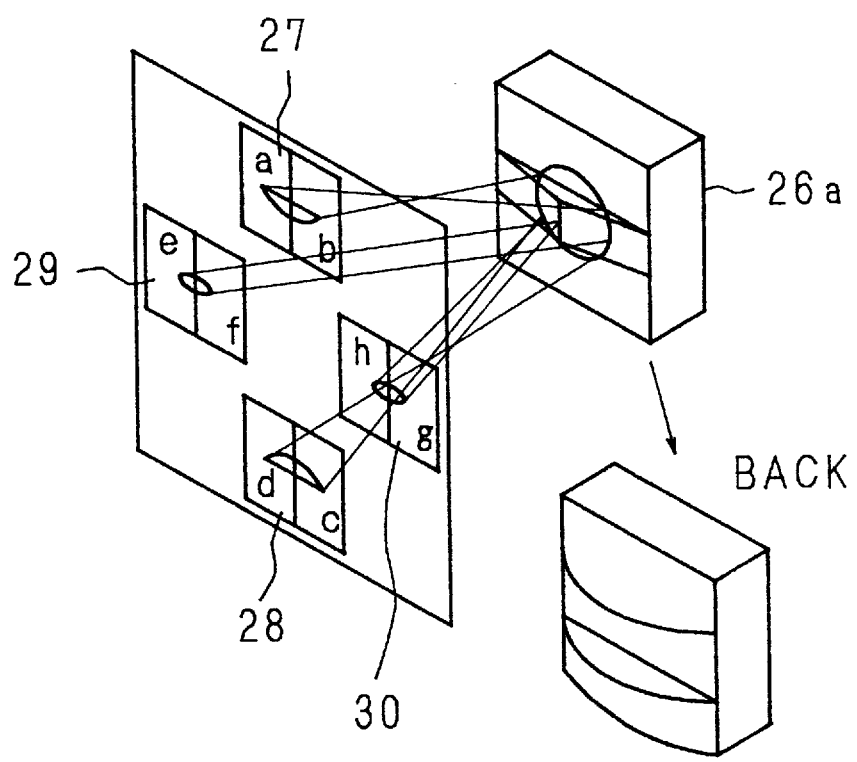
FIG. 8 is a perspective view showing an example of a structure of a main portion of an optical system of an optical disk apparatus according to the first embodiment of the present invention.
Figure 9C:
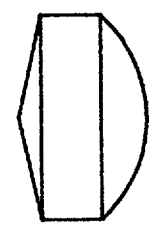
FIG. 9C is a top view of another prism.
Figure 9D:
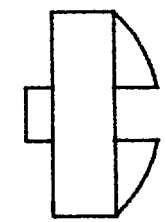
FIG. 9D is a side view of another prism.

The prism 26 may be a prism whose incident side of the roof-shaped portion is not a lens, and may be a prism 26a as that shown in FIG. 8 (perspective view), FIG. 9C (top view) and FIG. 9D (side view) in which an upper and a lower portions of the divided three portions on the incident side are lenses. In this case, however, light beams entering the halving photodetectors 27 and 28 as they are in the far field condition after converged, and therefore, images which are formed on the dividing lines are inverted images.

Now, operation of the optical system of the optical disk apparatus having such a structure as above will be described in the following.

A light beam emitted in the horizontal direction from the LD 16 impinges upon the collimating lens 17 to be converted into parallel light. The light beam converted into parallel light is reshaped into a round shape by the shaping prism 18 and passes through the beam splitter 19. After passing through the beam splitter 19, the light beam is deflected upward by 90 degrees by the upward mirror 4a. The objective lens 20 focuses the 90-degree deflected light beam on the track 21a of the disk 21.

The reflected light from the disk 21 passes through the objective lens 20 in a reverse direction to that of when focused. The light is then deflected to side by 90 degrees by the upward mirror 4a, and returns to the beam splitter 19. The reflected light is reflected within the beam splitter 19 to be deflected to side by 90 degrees and to impinge upon the signal detecting system. The reflected light impinging upon the signal detecting system is partially reflected within the beam splitter 22 to enter the MO signal detecting system. The portion of the reflected light entering the MO signal detecting system is divided by polarization by the Wollaston prism 23 into two linearly polarized light beams. The halving photodetector 24 detects each of the two linearly polarized light beams. The information signal is obtained based on a difference between the two linearly polarized light beams.

The portion of the reflected light which entered the signal detecting system and passed through the beam splitter 22 impinges upon the prism 26 through the servo lens 25. Of the reflected light entering the prism 26, a portion passing through the upper portion of the prism 26 is deflected upward, a portion passing through the right-hand side of the roof-shaped portion toward the front of a traveling direction of the roof-shaped portion is deflected toward the left-hand side, a portion passing through the left-hand side of the roof-shaped portion toward the front of a traveling direction is deflected toward the right-hand side, and a portion passing through the lower portion of the prism 26 is deflected downward.

The light beam passing through the upper portion of the prism 26 impinges upon the dividing line of the halving photodetector 27, in the far field condition.

The light beam passing through the right-hand side portion of the roof-shaped portion of the prism 26 toward the front of a traveling direction impinges upon the dividing line of the halving photodetector 30, in the near field condition.

The light beam passing through the left-hand side portion the roof-shaped portion of the prism 26 toward the front of a traveling direction impinges upon the dividing line of the halving photodetector 29, in the near field condition.

The light beam passing through the lower portion of the prism 26 impinges upon the dividing line of the halving photodetector 28, in the far field condition.

Figure 10:
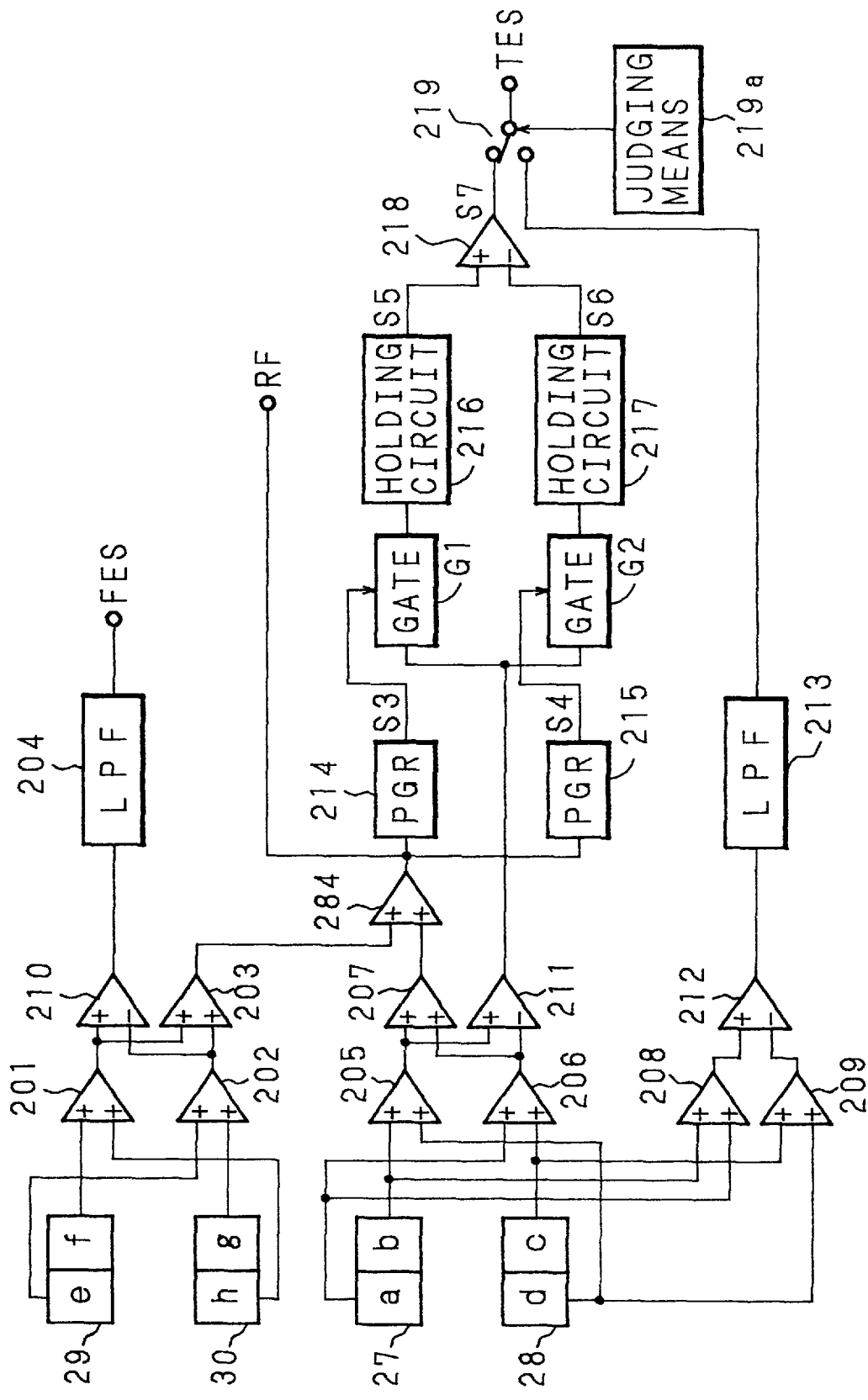
FIG. 10 is a block diagram showing a structure of a calculating unit according to the first embodiment of the present invention.

FIG. 10 is a block diagram showing a structure of a calculating unit (first and second calculating means) of the optical disk apparatus according to the first embodiment of the present invention. In the calculating unit, an adder 201 adds an output from the detecting portion f and an output from the detecting portion h, while an adder 202 adds an output from the detecting portion e and an output from the detecting portion g. A subtracter 210 calculates a difference between an output from the adder 201 and an output from the adder 202. After a high frequency component is removed from an output from the subtracter 210 by a low-pass filter (LPF) 204, from the low-pass filter 204 is outputted as a focus error signal FES=(e+g)−(f+h).

An adder 208 adds an output from the detecting portion a and an output from the detecting portion b, while an adder 209 adds an output from the detecting portion c and an output from the detecting portion d. A subtracter 212 calculates a difference between an output from the adder 208 and an output from the adder 209. After a high frequency component is removed from an output from the subtracter 212 by a low-pass filter 213, from the low-pass filter 213 to one input terminal of a switch circuit 219 is outputted a tracking error signal TES=(a+b)−(c+d).

An adder 206 adds an output from the detecting portion a and an output from the detecting portion c, while an adder 205 adds an output from the detecting portion b and an output from the detecting portion d. An adder 207 adds an output from the adder 205 and an output from the adder 206, while an adder 203 adds an output from the adder 201 and an output from the adder 202. An adder 284 adds an output from the adder 203 and an output from the adder 207, and an output from the adder 284 is outputted as the RF signal and at the same time supplied to pulse generators (PGR) 214 and 215. A subtracter 211 calculates a difference between an output from the adder 205 and an output from the adder 206, and an output from the subtracter 211 is supplied to gates G1 and G2, as an HTD signal.

When the RF signal transits from a negative level to a positive level, the pulse generator 214 generates a sampling pulse S3 and supplies the same to the gate G1. In response, the gate G1 is opened, whereby the value of the HTD signal at this stage is sampled and held by a holding circuit 216. On the other hand, the pulse generator 215 generates a sampling pulse S4 when the RF signal transits from a positive level to a negative level, and supplies the same to the gate G2. In response, the gate G2 is opened, whereby the value of the HTD signal at this stage is sampled and held by a holding circuit 217.

A subtracter 218 calculates a difference between a holding signal S5 in the holding circuit 216 and a holding signal S6 in the holding circuit 217, to thereby detect a phase difference between the RF signal and the HTD signal. The difference S7 between the holding signal S5 and the holding signal S6 is outputted to the other input terminal of the switch circuit 219, as a tracking error signal. When judging means 219a judges that the track 21a of the disk 21 includes a successive groove, the switch circuit 219 outputs a tracking error signal which is obtained by the push-pull method. When the judging means 219a judges that the track 21a of the disk 21 includes only a row of pits, the switch circuit 219 outputs a tracking error signal which is obtained by the heterodyne method.

Now, calculation at the calculating unit will be described in detail.

By the Foucault method, the calculating unit calculates and outputs a focus error signal FES=(e+g)−(f+h) based on outputs (e to h) from the respective detecting portions e to h of the halving photodetectors 29 and 30.

The Foucault method will be described in the following. A light beam which is reflected by an optical disk (disk) is divided into two, and the two beams are each guided onto dividing lines extending in the same direction of the detecting portions of a quarter dividing photodetector (or two halving photodetectors; the halving photodetectors 29 and 30 in this embodiment). Here, if a light spot is accurately focused on the optical disk, each one of the two divided light beams forms a spot of the near field condition on the dividing line on the quarter dividing photodetector, as shown in FIG. 4B.

Figure 4A:
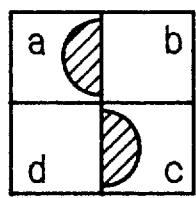
FIG. 4A is an explanatory diagram for describing the Foucault method.
Figure 4B:
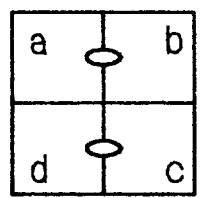
FIG. 4B is an explanatory diagram for describing the Foucault method.
Figure 4C:
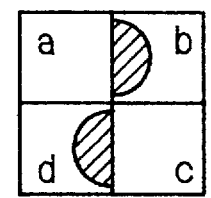
FIG. 4C is an explanatory diagram for describing the Foucault method.
Figure 6:
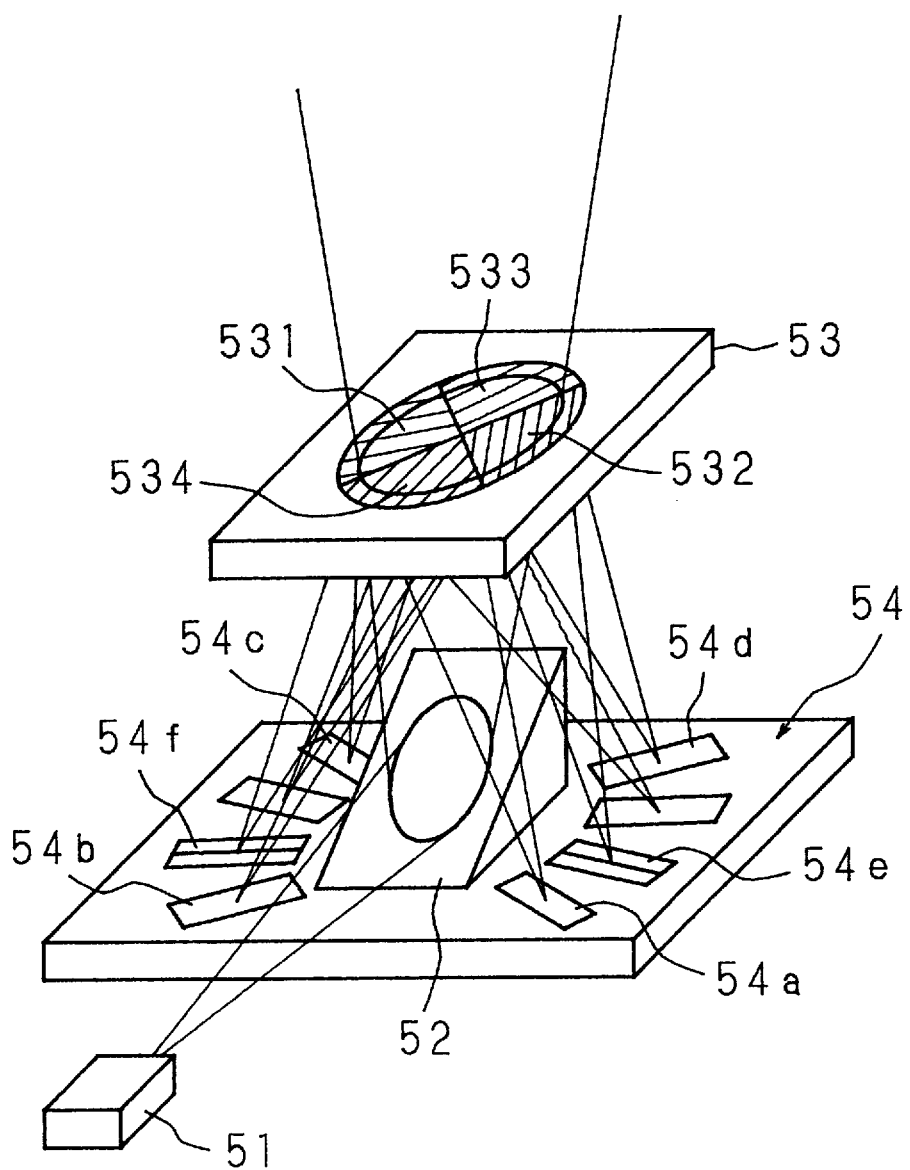
FIG. 6 is a perspective view showing an example of a structure of an optical system of a conventional optical disk apparatus.

If the optical disk is closer than the focal point of an objective lens, the two divided light beams form far field spots on the outer two of the four detecting portions which correspond to positions of the quarter dividing photodetector, which are identified by dividing a spot on a track into four in the same direction (FIG. 4A). If the optical disk is farther than the focal point of the objective lens, the two divided light beams form far field spots on the inner two of the four detecting portions (FIG. 4C). Hence, a light beam on the quartering photodetector becomes bright or dark depending on whether the optical disk is farther than or closer than the focal point of the objective lens.

Therefore, the adders 201 and 202 each calculate the sum of outputs from the diagonally-opposed two detecting portions of the quartering photodetector (the outer two detecting portions and the inner two detecting portions; the detecting portions e, g and the detecting portions f, h in this embodiment), and the subtracter 210 calculates a difference between the calculated results. Through the low-pass filter 204, the focus error signal FES is obtained.

When the track 21a of the disk 21 includes a successive groove (i.e., when the disk 21 is a re-writable disk, etc.,), the calculating unit outputs the tracking error signal TES=(a+b)−(c+d) which is obtained from outputs (a to d) from the respective detecting portions a to d of the halving photodetectors 27 and 28, by the push-pull method.

The push-pull method will be described in the following. As the position of a light spot on a disk is displaced from the position of a track, a light spot on a photodetector is displaced in a direction which is perpendicular to the direction corresponding to the track as shown in FIGS. 5A and 5C. On the other hand, if the position of a light spot on the disk is at the position of the track, a light spot on the photodetector is not displaced in any direction as shown in FIG. 5B. Hence, a dividing line of a halving photodetector (two detecting portions of each of the halving photodetectors 27 and 28 are regarded as one detection portion of a halving photodetector in this embodiment) is positioned to correspond to the central line of the track.

The adders 208 and 209 each calculate the sum of outputs from the respective two detecting portions (a+b, c+d in this embodiment), and a subtracter 212 calculates a difference between the sums. Through the low-pass filter 213, the tracking error signal TES is obtained. The tracking error signal TES is supplied to the one input terminal of the switch circuit 219.

When the track 21a of the disk 21 is a track of a ROM disk and so on which includes only a row of pits, the calculating unit outputs the tracking error signal TES which is obtained from outputs from the respective detecting portions a to h of the halving photodetectors 27 to 30, by the heterodyne method. The tracking error signal TES at this stage is a phase difference between a heterodyne signal HTD=(a+c)−(b+d) (hereinafter "HTD signal") and the information signal RF=a+b+c+d+e+f+g+h (hereinafter "RF signal").

Figure 1:
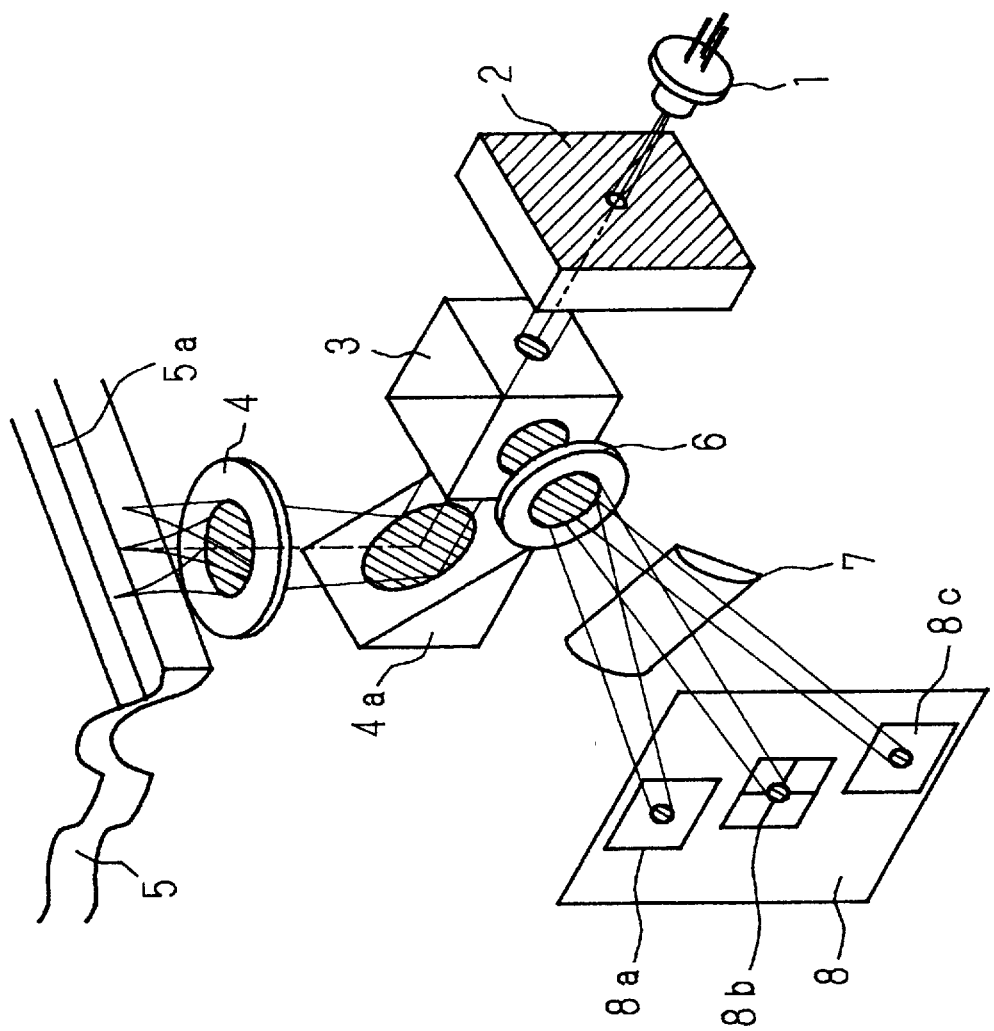
FIG. 1 is a perspective view showing an example of a structure of an optical system of a conventional optical disk apparatus.
Figure 2:
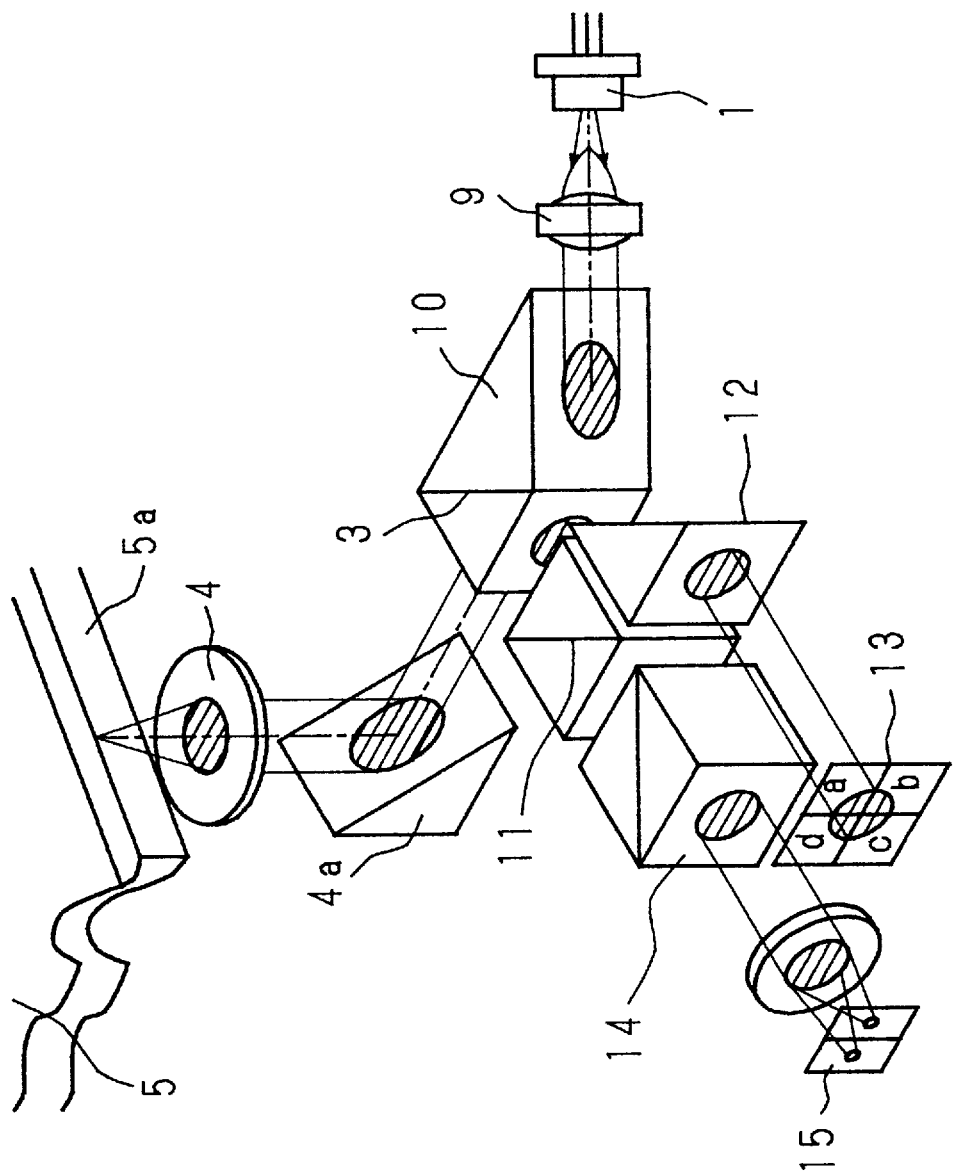
FIG. 2 is a perspective view showing an example of a structure of an optical system of a conventional optical disk apparatus.
Figure 3:
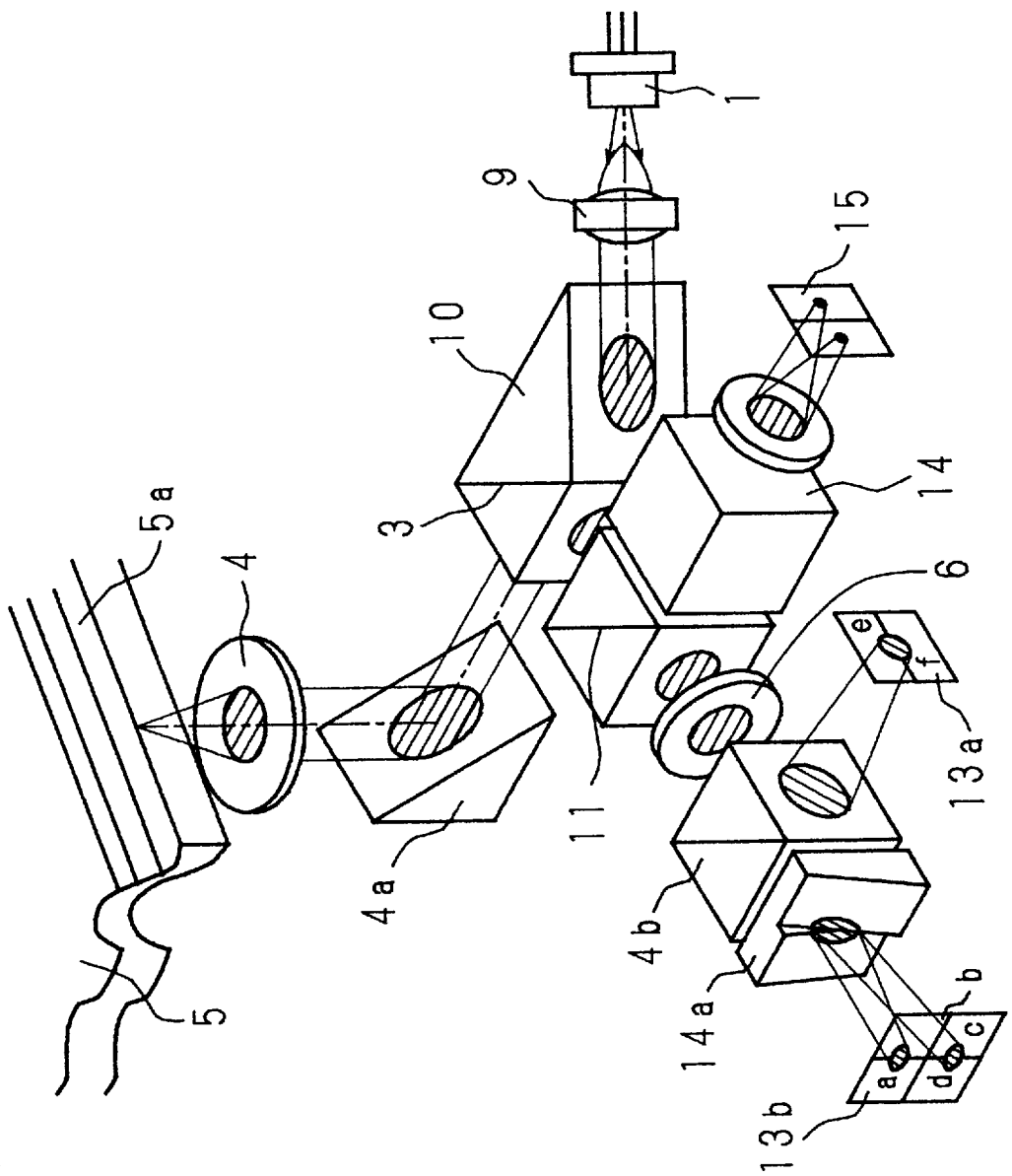
FIG. 3 is a perspective view showing an example of a structure of an optical system of a conventional optical disk apparatus.
Figure 11A:
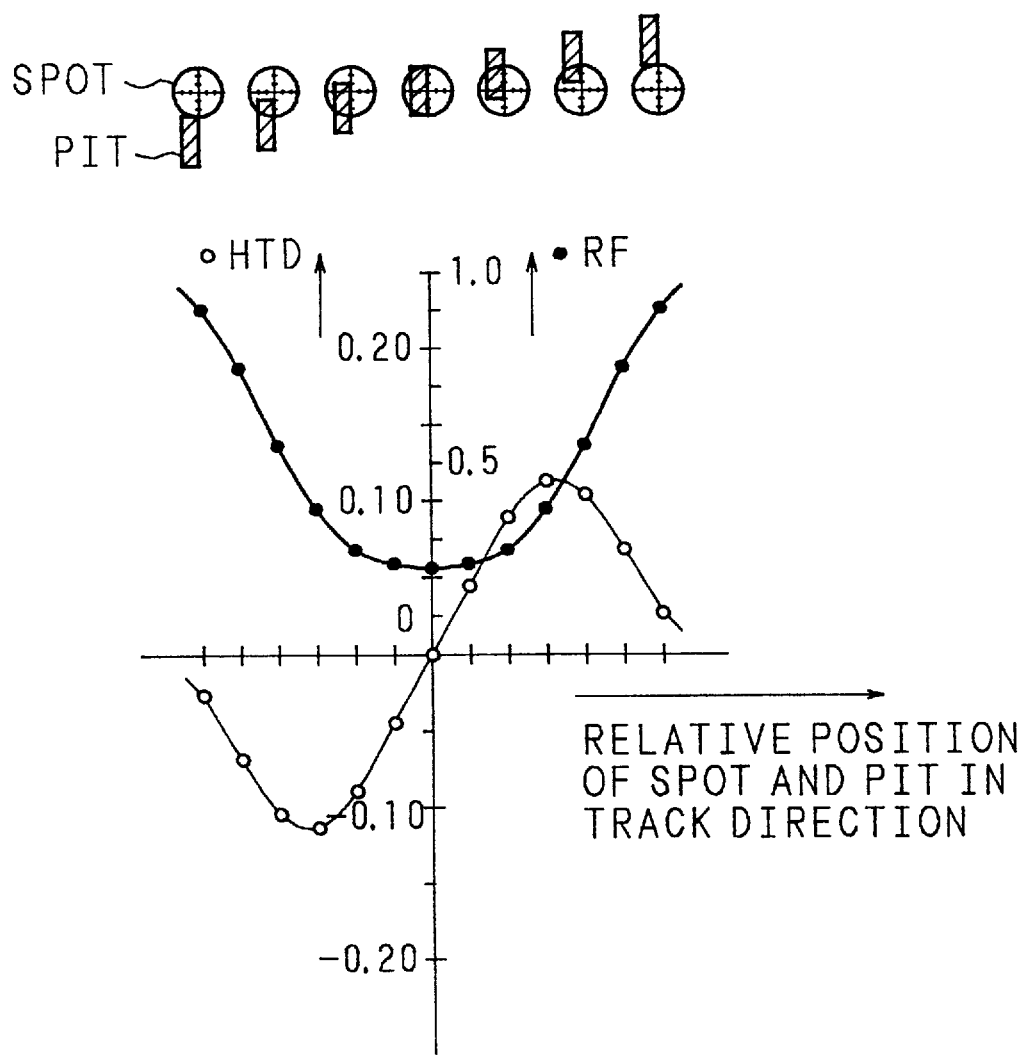
FIG. 11A is a view showing an RF signal and an HTD signal in a case where a spot is shifted to the right.
Figure 11B:
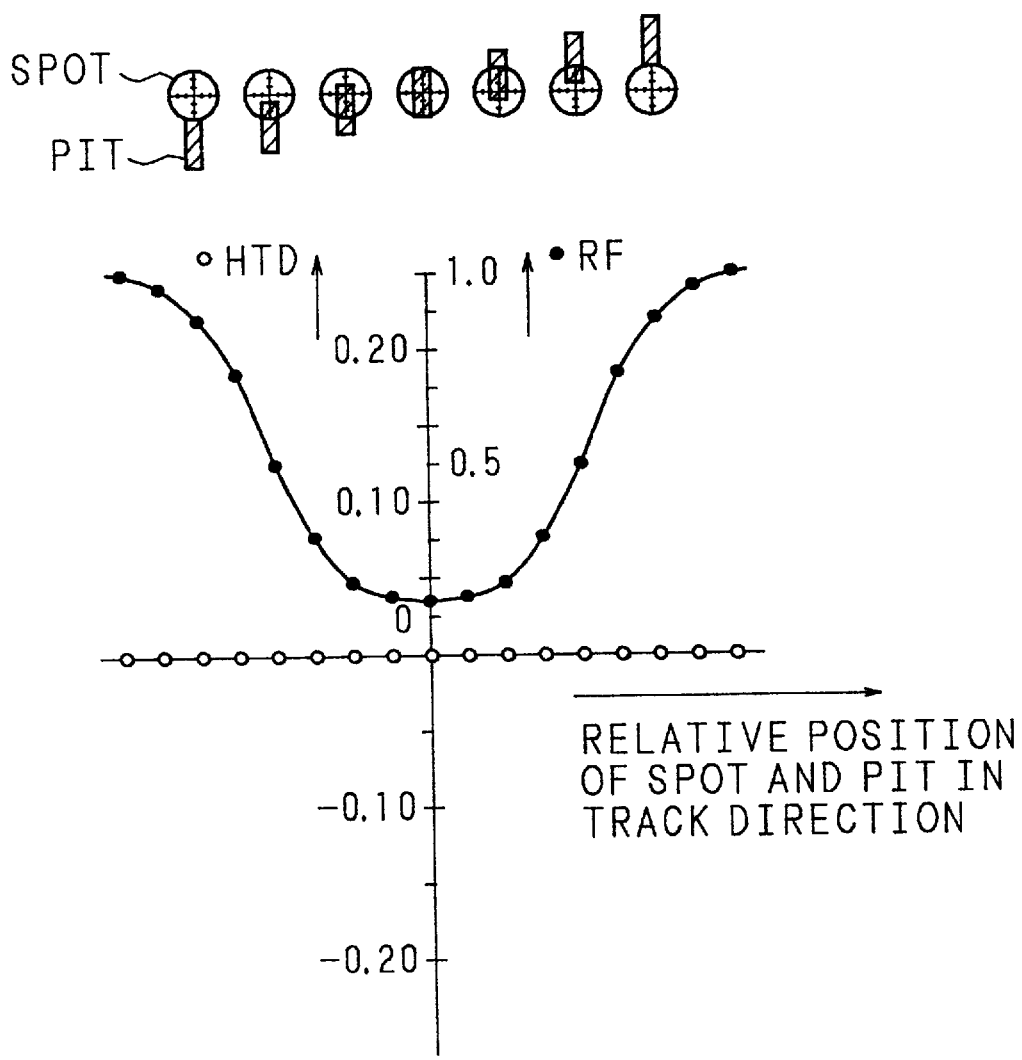
FIG. 11B is a view showing an RF signal and an HTD signal in a case where a spot is on a track.
Figure 11C:
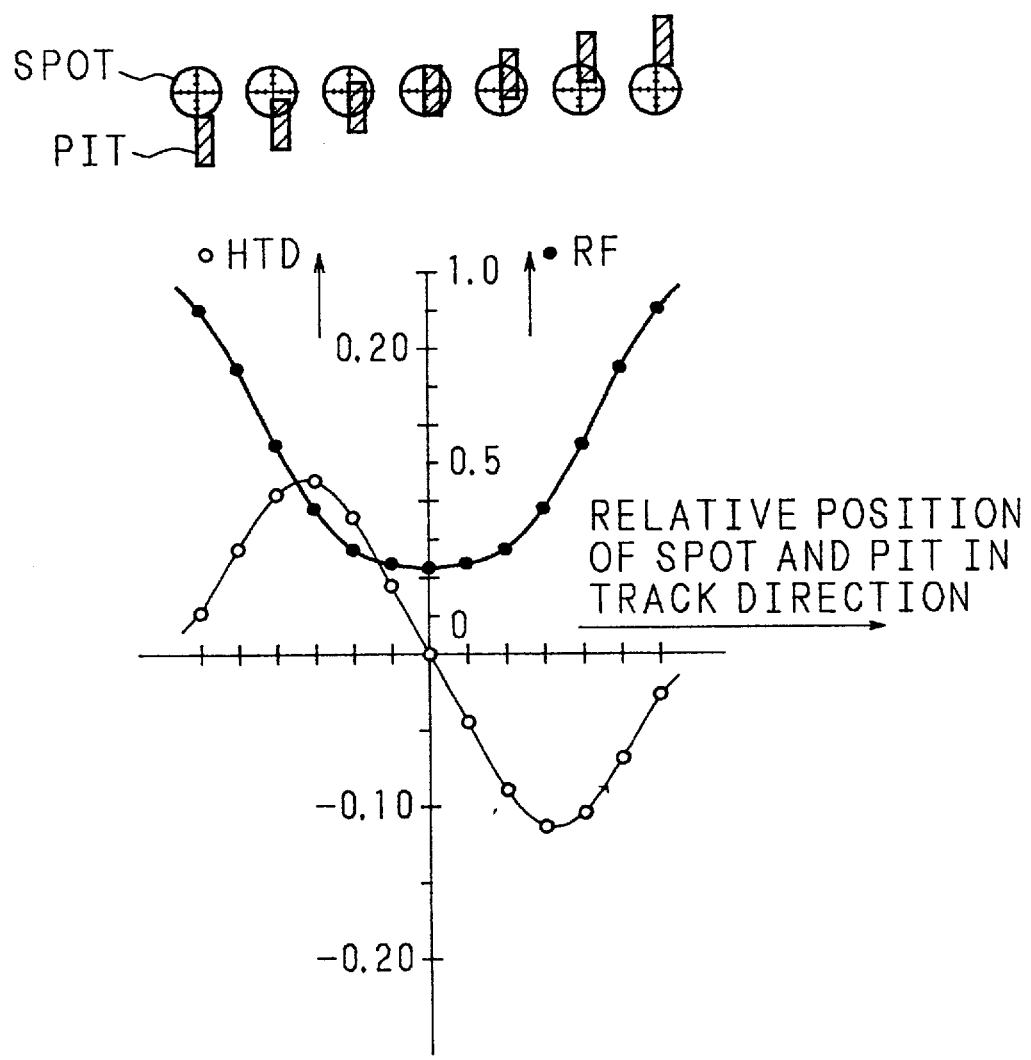
FIG. 11C is a view showing the RF signal and the HTD signal in a case where a spot is shifted to the left.

The heterodyne method will be described in the following. When a light beam which is reflected by a disk is detected as it is in the far field condition by a quartering photodetector (the halving photodetectors 27 and 28 in this embodiment), the RF signal which is the sum of outputs from the four detecting portions (a+b+c+d+e+f+g+h in this embodiment) and the HTD signal which is a difference between the two diagonal sums ((a+c)−(b+d) in this embodiment) are as shown in FIGS. 11A, 11B and 1C. When a light spot is at a track, the HTD signal is 0 (FIG. 11B). When a light spot is off a track, the HTD signal leads or lags by the RF signal by a phase angle of 90 degrees in the direction in which the light spot is displaced (FIGS. 11A and 11C). Such a phase difference is detected by heterodyne detection, whereby the tracking error signal TES is obtained.

Heterodyne detection is performed in the following manner. That is, when the RF signal from the adder 284, which is obtained on the basis of a positional relationship between the light spot and the track (i.e., arrangement of pits) (See FIG. 12A) transits from a negative level to a positive level, the pulse generator 214 generates a pulse (sampling pulse S3: FIG. 12D). On the other hand, when the RF signal transits from a positive level to a negative level, the pulse generator 215 generates a pulse (sampling pulse S4: FIG. 12E). Using the sampling pulses S3 and S4, the holding circuits 216 and 217 sample the HTD signal which is supplied from the subtracter 211 (FIG. 12C) through the gates G1 and G2, respectively (holding signal S5: FIG. 12F; holding signal S6: FIG. 12G). The subtracter 218 calculates a difference between the holding signals S5 and S6 to detect a phase difference between the RF signal and the HTD signal, and supplies the same to the other input terminal of the switch circuit 219, as the tracking error signal S7 (FIG. 12H) which is obtained by the heterodyne method.

Distinction between a disk which includes a successive groove and a ROM disk is recorded as information in regions other than user regions in the disks, so that the judging means 219a reads this information and distinguishes. Alternatively, a hole for distinction may be formed in a cartridge of a disk or a reflection label may be pasted, so that the judging means 219a distinguishes by means of a light emitting element, such as an LED, and a photodetector. A result of distinguishing is supplied to the switch circuit 219, so that the switch circuit 219 switches the tracking error signals. Instead of using the judging means 219a, an operator may perform such switching based his own judgment.

The support mechanisms for the objective lens 20 perform focus servo and track servo, in accordance with the focus error signal FES and the tracking error signal TES.

Unlike in a normal heterodyne method, this embodiment requires to detect the HTD signal without using a central portion of reflected light from a disk. However, since it is possible to obtain the HTD signal by means of a pattern change which appears in a pattern in a diagonal direction when the light passes a row of pits, even when the heterodyne method is executed without using a central portion of the reflected light, there is no problem. The heterodyne method is optimum when the depth of a pit is λ/4, and this does not contradict to the depth of a pit which makes the RF signal largest.

While the structure of the optical system makes recording and reproducing on a magneto optical disk possible in the present embodiment, when a phase-variable optical disk is mounted as a disk which includes a successive groove, the RF signal is the information signal as in the case of a ROM disk.

Second Embodiment

FIG. 13 is a perspective view showing an example of a structure of an optical system of an optical disk apparatus according to a second embodiment of the present invention.

In this optical disk apparatus, the prism 26 of the first embodiment is replaced with a hologram optical element 31. The hologram optical element 31 is a flat rectangular solid, and a pattern (hologram pattern) 31p thereof is formed by dividing an optical surface into three parts, i.e., a top region, a middle region and a bottom region, by dividing lines which extend in the track direction and by further dividing the middle region into two, i.e., a region C1 on the right-hand side and a region C2 on the left-hand side toward the front of a traveling direction of a light beam, by an upright line (which is perpendicular to the track; in the radial direction), as shown in FIG. 13.

The upper region A and the lower region B of the hologram optical element 31 each have a lens effect, that is, focal distances of light beams passing through the upper and the lower regions A and B (i.e., light beam for generating a tracking error signal) as they are measured from the hologram optical element 31 are different from focal distances of light beams passing through the regions C1 and C2 (i.e., light beam for generating a focus error signal) as they are measured from the hologram optical element 31. Of reflected light impinging upon the hologram optical element 31 from the disk 21, a portion passing through the upper region A is deflected upward, a portion passing through the region C1 is deflected toward the right-hand side toward the front of a traveling direction of a light beam, a portion passing through the region C2 is deflected toward the left-hand side toward the front of a traveling direction of a light beam, and a portion passing through the lower region B is deflected downward.

The deflected light beams enter the halving photodetectors 27 to 30, respectively, of the photodetecting system which are disposed on the same plane which is perpendicular to the optical axis of the signal detecting system. In other words, the light beam passing through the upper portion A impinges upon the upright dividing line of the halving photodetector 27 whose right-hand side toward the front of a traveling direction is the detecting portion a while the left-hand side toward the front of a traveling direction is the detecting portion b, in the far field condition as it is after converged. The light beam passing through the region C1 impinges upon the upright dividing line of the halving photodetector 29 whose right-hand side toward the front of a traveling direction is the detecting portion e while the left-hand side is the detecting portion f, in the near field condition.

The light beam passing through the region C2 impinges upon the upright dividing line of the halving photodetector 30 whose right-hand side toward the front of a traveling direction is a detecting portion h while the left-hand side is a detecting portion g, in the near field condition. The light beam passing through the lower region B impinges upon the upright dividing line of the halving photodetector 28 whose right-hand side toward the front of the traveling direction is a detecting portion d while the left-hand side is a detecting portion c, in the far field condition as it is after converged.

Light beams of +1-order and −1-order light passing through the regions C1 and C2 are converged on the halving photodetectors 29 and 30, only because of the converging effect of the servo lens 25. The lens effect at the regions A and B may be either convex lens effect or concave lens effect.

The other structure and operations are similar to those of the optical disk apparatus of the first embodiment, and therefore, will not be described.

Third Embodiment

Figure 14:
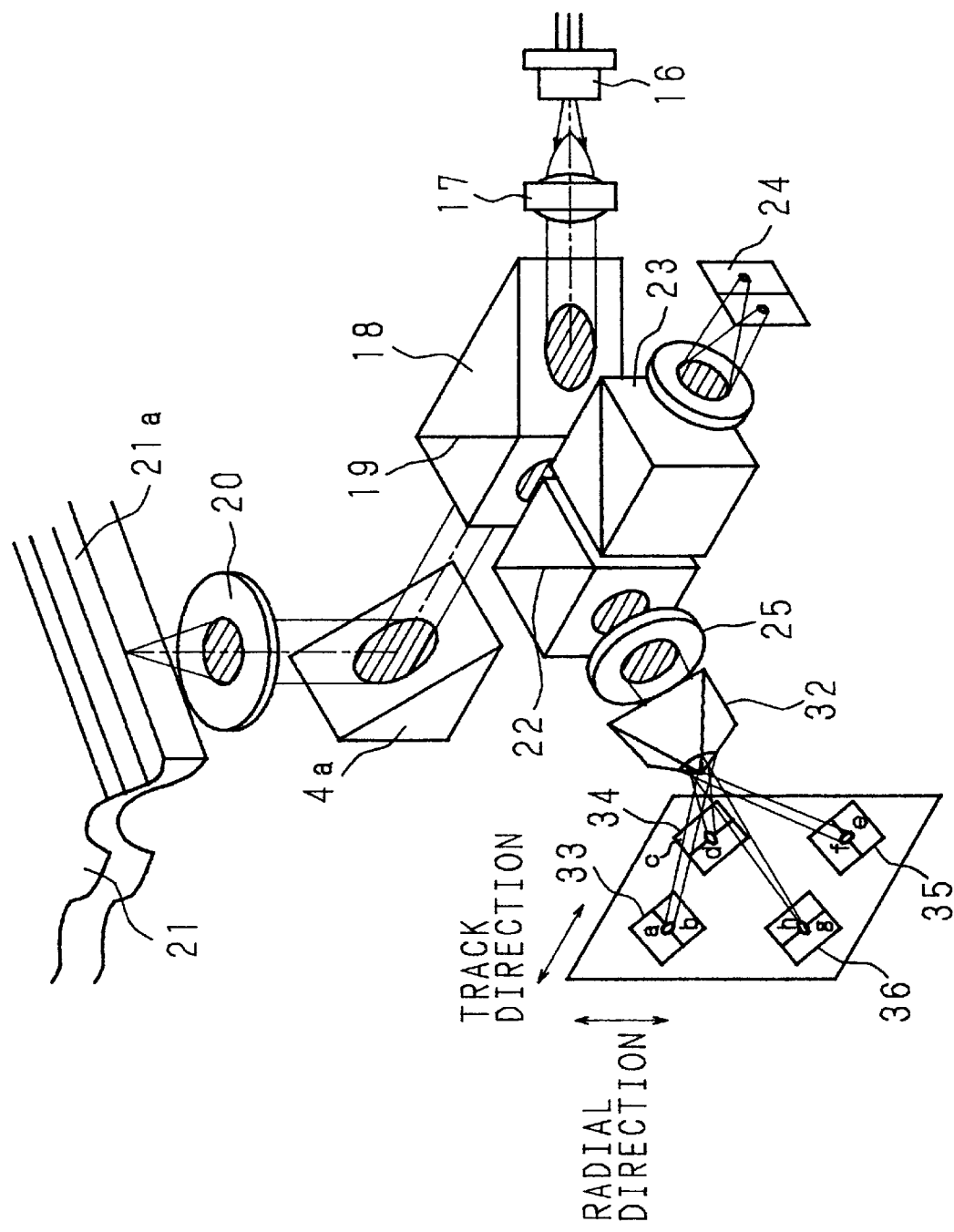
FIG. 14 is a perspective view showing an example of a structure of an optical system of an optical disk apparatus according to a third embodiment of the present invention.

FIG. 14 is a perspective view showing an example of a structure of an optical system of an optical disk apparatus according to a third embodiment of the present invention. In this optical disk apparatus, the prism 26 of the first embodiment is replaced with a square cone prism 32. The square cone prism 32 is disposed in a far field of reflected light emitted from the servo lens 25 so that a bottom line of the square cone prism 32 is at an angle of 45 degrees with respect to the track direction. Of the reflected light from the disk 21 impinging upon the square cone prism 32, a portion passing through an upper prism surface of the right-hand side toward the front of the traveling direction of the reflected light is deflected downward of the left-hand side, a portion passing through an upper prism surface of the left-hand side toward the front of the traveling direction of the reflected light is deflected downward of the right-hand side, a portion passing through a lower prism surface of the right-hand side toward the front of the traveling direction of the reflected light is deflected upward of the left-hand side, a portion passing through a lower prism surface of the left-hand side toward the front of the traveling direction of the reflected light is deflected upward of the right-hand side.

The deflected light beams enter halving photodetectors 33 to 36, respectively, of the photodetecting system which are disposed on the same plane which is perpendicular to the optical axis of the signal detecting system. In other words, the light beam passing through the upper prism surface of the right-hand side impinges upon the dividing line of the halving photodetector 35 whose upper right-hand side toward the front of the traveling direction is a detecting portion f, the lower left-hand side is a detecting portion e and whose dividing line is parallel to the bottom line of the prism surface of the upper right-hand side, in the near field condition. The light beam passing through the upper prism surface of the left-hand side impinges upon the dividing line of the halving photodetector 36 whose upper left-hand side is a detecting portion h, whose lower right-hand side toward the front of the traveling direction is a detecting portion g, and whose dividing line is parallel to the bottom line of the prism surface of the upper left-hand side, in the near field condition.

The light beam passing through the lower prism surface of the right-hand side impinges upon the dividing line of the halving photodetector 34 whose upper left-hand side is the detecting portion c, whose lower right-hand side is the detecting portion d and whose dividing line is parallel to the bottom line of the prism surface of the lower right-hand side, in the near field condition. The light beam passing through the lower prism surface of the left-hand side impinges upon the dividing line of the halving photodetector 33 whose upper right-hand side toward the front of the traveling direction is the detecting portion a, the lower left-hand side is the detecting portion b and whose dividing line is parallel to the bottom line of the prism surface of the lower left-hand side, in the near field condition.

Figure 15A:
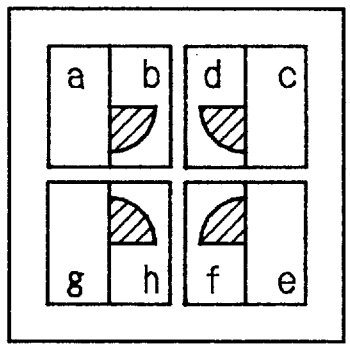
FIG. 15A is a view showing spots on halving photodetectors in a case where a disk is closer than the focal point of a light beam in the third embodiment.
Figure 15B:
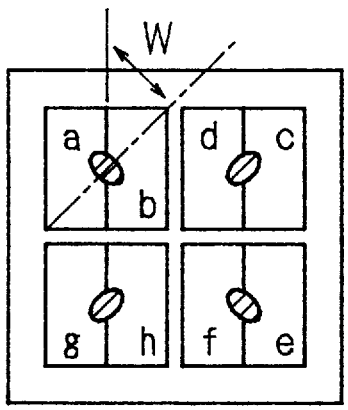
FIG. 15B is a view showing spots on halving photodetectors in a case where a disk is on the focal point of a light beam in the third embodiment.
Figure 15C:
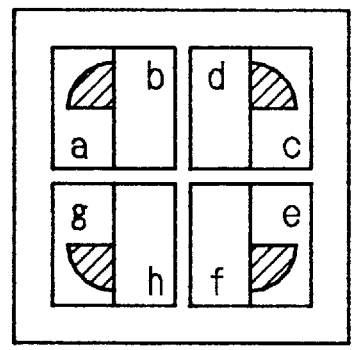
FIG. 15C is a view showing spots on halving photodetectors in a case where a disk is farther than the focal point of a light beam in the third embodiment.

The directions of the dividing lines of the halving photodetectors 33 to 36 are within a range from the direction which approximately coincides with the bottom line of the square cone prism 32 and to the direction which approximately coincides with the radial direction, as denoted at W in FIG. 15B. As shown in FIGS. 15A, 15B and 15C, in particular, assembling and adjustment are easy when the dividing lines extend in the same direction.

In this embodiment, when a light spot is accurately focused on the disk, the divided four light beams form near fields spots on the dividing lines at the halving photodetectors, as shown in FIG. 15B. If the disk is farther than the focal point of the objective lens, the divided four light beams form far fields spots at the detecting portions a, c, e and g for detecting the central side of the light beams, among the respective detecting portions the halving photodetectors which correspond to positions which are identified by dividing a spot on a track into four (FIG. 15C). If the disk is closer than the focal point of the objective lens, the divided four light beams form far fields spots at the detecting portions b, d, f and h for detecting the peripheral side of the light beams (FIG. 15A).

Figure 17:
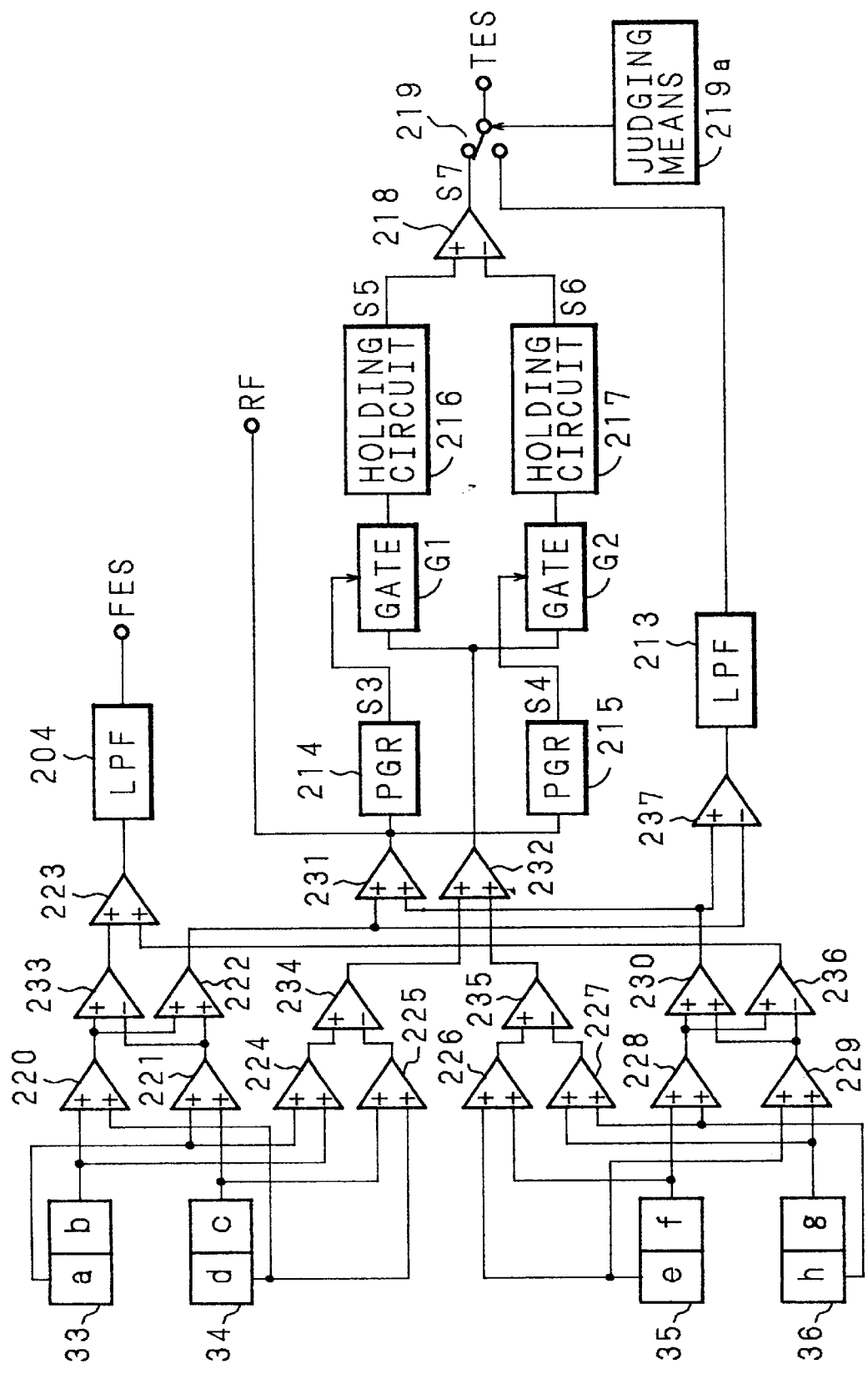
FIG. 17 is a block diagram showing a structure of a calculating unit in the third embodiment.

FIG. 17 is a block diagram showing a structure of a calculating unit of the optical disk apparatus according to the third embodiment. In this calculating unit, an adder 220 adds an output from the detecting portion b and an output from the detecting portion d, while an adder 221 adds an output from the detecting portion a and an output from the detecting portion c. An adder 224 adds an output from the detecting portion a and an output from the detecting portion b, while an adder 225 an output from the detecting portion c and an output from the detecting portion d. An adder 226 adds an output from the detecting portion e and an output from the detecting portion f, while an adder 227 an output from the detecting portion g and an output from the detecting portion h. An adder 228 adds an output from the detecting portion f and an output from the detecting portion h, while an adder 229 an output from the detecting portion e and an output from the detecting portion g.

A subtracter 233 calculates a difference between an output from the adder 220 and an output from the adder 221, while an adder 222 adds the output from the adder 220 and the output from the adder 221. A subtracter 234 calculates a difference between an output from the adder 224 and an output from the adder 225, while a subtracter 235 calculates a difference between an output from the adder 226 and an output from the adder 227. An adder 230 adds an output from the adder 228 and an output from the adder 229, a subtracter 236 calculates a difference between the output from the adder 228 and the output from the adder 229.

An adder 223 adds an output from the adder 233 and an output from the subtracter 236. After a high frequency component is removed from an output from the adder 223 by the low-pass filter 204, from the low-pass filter 204 is outputted a focus error signal FES=(a−b)+(c−d)+(e−f)+(g−h). A subtracter 237 calculates a difference between an output from the adder 230 and an output from the adder 222. After a high frequency component is removed from an output from the subtracter 237 by a low-pass filter 213, from the low-pass filter 213 to the one input terminal of the switch circuit 219 is outputted a tracking error signal TES=(a+b+c+d)−(e+f+g+h).

An adder 231 calculates the sum of the output from the adder 222 and the output from the adder 230, and an output from the adder 231 is outputted as the RF signal and at the same time supplied to pulse generators 214 and 215. An adder 232 calculates the sum of the output from the subtracter 234 and the subtracter 235, and an output from the adder 232 is supplied to gates G1 and G2, as the HTD signal.

When the RF signal transits from a negative level to a positive level, the pulse generator 214 generates a sampling pulse S3 and supplies the same to the gate G1. In response, the gate G1 is opened, whereby the value of the HTD signal at this stage is sampled and held by a holding circuit 216. On the other hand, the pulse generator 215 generates a sampling pulse S4 when the RF signal transits from a positive level to a negative level, and supplies the same to the gate G2. In response, the gate G2 is opened, whereby the value of the HTD signal at this stage is sampled and held by a holding circuit 217.

The subtracter 218 calculates a difference between a holding signal S5 in the holding circuit 216 and a holding signal S6 in the holding circuit 217, to thereby detect a phase difference between the RF signal and the HTD signal. A difference S7 between the holding signal S5 and the holding signal S6 is outputted to the other input terminal of the switch circuit 219, as a tracking error signal. When judging means 219a judges that the track 21a of the disk 21 includes a successive groove, the switch circuit 219 outputs a tracking error signal which is obtained by the push-pull method. When the judging means 219a judges that the track 21a of the disk 21 includes only a row of pits, the switch circuit 219 outputs a tracking error signal which is obtained by the heterodyne method.

By the Foucault method, the calculating unit calculates and outputs a focus error signal FES=(a−b)+(c−d)+(e−f)+(g−h) based on outputs (a to h) from the respective detecting portions a to h of the halving photodetectors 33 to 36.

When the track 21a of the disk 21 includes a successive groove (i.e., when the disk 21 is a re-writable disk, etc.,), the calculating unit outputs the tracking error signal TES=(a+b+c+d)−(e+f+g+h) which is obtained from outputs (a to h) from the respective detecting portions a to h of the halving photodetectors 33 to 36 by the push-pull method.

When the track 21a of the disk 21 is a track of a ROM disk which includes only a row of pits, by the heterodyne method, the calculating unit calculates a phase difference between the heterodyne signal HTD=(a+b+e+f)−(c+d+g+h) which is a difference between the two diagonal sums from the halving photodetectors 33 to 36 and the information signal RF=a+b+c+d+e+f+g+h, to thereby obtain a tracking error signal.

The other structure and operations are similar to those of the optical disk apparatus of the first embodiment, and therefore, will not be described.

Figure 16:
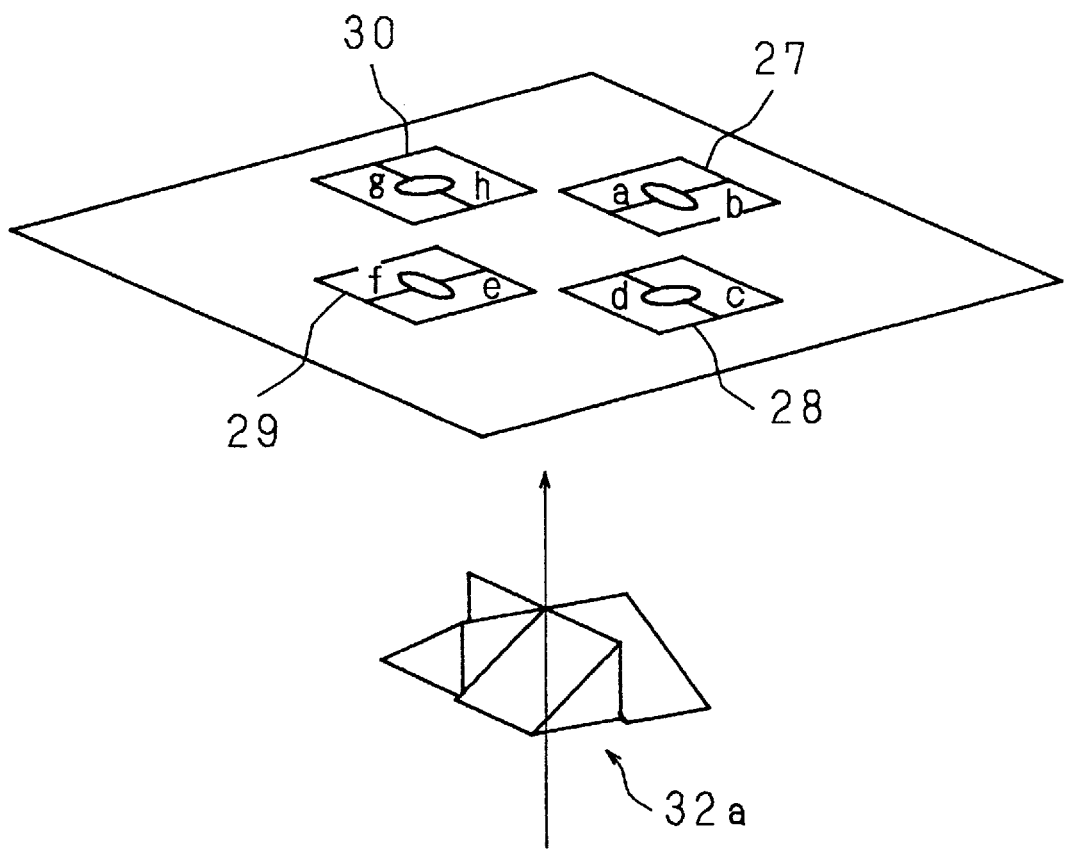
FIG. 16 is a perspective view showing an example of a structure of a pin wheel prism and a photodetecting system.

The square cone prism 32 may be replaced with a pin wheel prism 32a as that shown in FIG. 16. In this case, the positional relationship between the pin wheel prism 32 and the halving photodetectors 27 to 30 is as shown in FIG. 16.

Fourth Embodiment

FIG. 18 is a perspective view showing an example of a structure of an optical system of an optical disk apparatus according to a fourth embodiment of the present invention. In this optical disk apparatus, the square cone prism 32 of the third embodiment is replaced with a hologram optical element 37. The hologram optical element 37 is a flat rectangular solid, and a hologram pattern 37p of the hologram optical element 37 is formed by dividing an optical surface into four by a dividing line which extends in the track direction and a dividing line which is perpendicular to the same, as shown in FIG. 18.

Of reflected light impinging upon the hologram optical element 37 from the disk 21, +1-order light passing through an upper portion of the right-hand side toward the front of the traveling direction of the reflected light is deflected to an upper right-hand side, +1-order light passing through an upper portion of the left-hand side is deflected to an upper left-hand side, +1-order light passing through a lower portion of the right-hand side is deflected to a lower right-hand side, +1-order light passing through a lower portion of the left-hand side is deflected to a lower left-hand side.

The deflected light beams enter halving photodetectors 33 to 36, respectively, of the photodetecting system which are disposed on the same plane which is perpendicular to the optical axis of the signal detecting system. In other words, the +1-order light beam passing through the upper right-hand side portion impinges upon the dividing line of the halving photodetector 33 whose upper right-hand side toward the front of the traveling direction is the detecting portion a, the lower left-hand side is the detecting portion b and whose dividing line is at an angle of 45 degrees with respect to the track direction, in the near field condition. The +1-order light beam passing through the upper left-hand side a portion impinges upon the dividing line of the halving photodetector 34 whose upper left-hand side is the detecting portion c, whose lower right-hand side is the detecting portion d and whose dividing line is at an angle 135 degrees with respect to the track direction, in the near field condition.

The +1-order light beam passing through the lower right-hand side portion impinges upon the dividing line of the halving photodetector 36 whose upper left-hand side is a detecting portion h, whose lower right-hand side to the direction of propagation is a detecting portion g, and whose dividing line is at an angle 135 degrees with respect to the track direction, in the near field condition. The +1-order light beam passing through the lower left-hand side portion impinges upon the dividing line of the halving photodetector 35 whose upper right-hand side toward the front of the traveling direction is a detecting portion f, the lower left-hand side is a detecting portion e and whose dividing line is at an angle of 45 degrees with respect to the track direction, in the near field condition.

The other structure and operations are similar to those of the optical disk apparatus of the third embodiment, and therefore, will not be described.

Fifth Embodiment

Figure 19A:
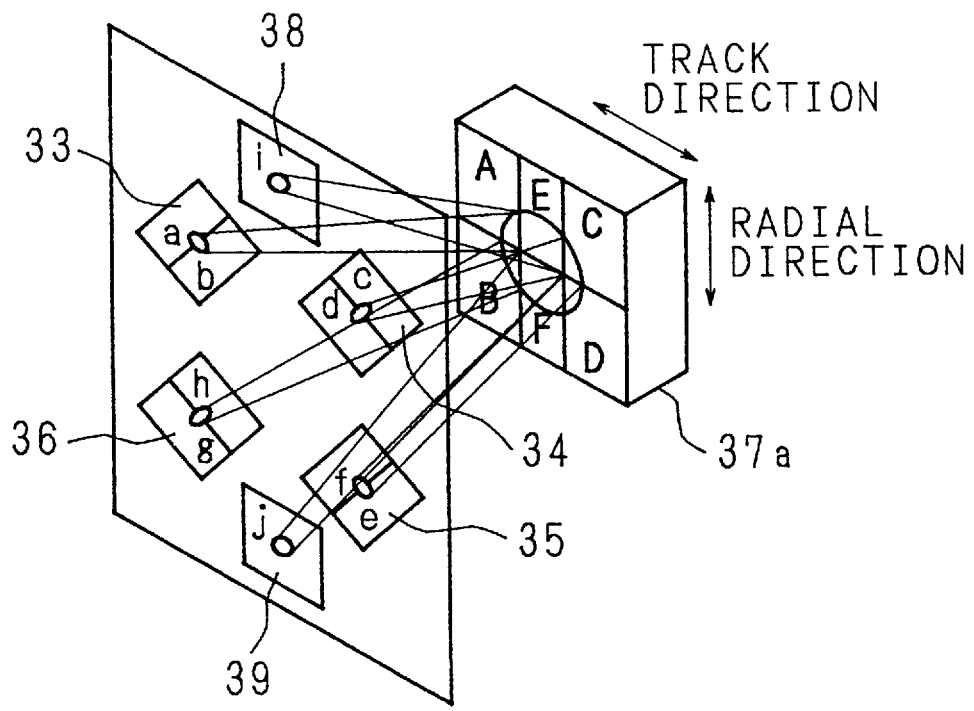
FIG. 19A is a perspective view showing an example of a structure of a hologram optical element and a photodetecting system of an optical disk apparatus according to a fifth embodiment of the present invention.
Figure 19B:
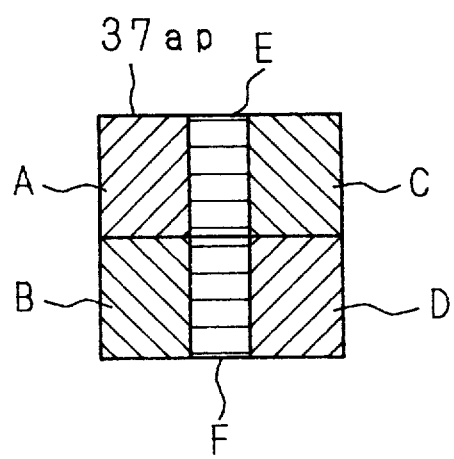
FIG. 19B is a diagram showing a pattern of a hologram optical element of the fifth embodiment.

FIG. 19A is a perspective view showing an example of a structure of a hologram optical element and a photodetecting system of an optical disk apparatus according to a fifth embodiment of the present invention. In this optical disk apparatus, the hologram optical element 37 of the fourth embodiment is replaced with a hologram optical element 37a which is divided into six. The hologram optical element 37a is a flat rectangular solid, and a hologram pattern 37ap is formed by further dividing the hologram optical element 37 into three by two dividing lines which extend perpendicular to the track direction as shown in FIG. 19B.

Of reflected light impinging upon the hologram optical element 37a from the disk 21, +1-order light passing through an upper region A of the right-hand side toward the front of the traveling direction of the reflected light is deflected to an upper right-hand side, +1-order light passing through an upper region C of the left-hand side is deflected to an upper left-hand side, +1-order light passing through a lower region B of the right-hand side is deflected to a lower right-hand side, +1-order light passing through a lower region D of the left-hand side is deflected to a lower left-hand side, +1-order light passing through an upper region E at the center is deflected upward, and +1-order light passing through a lower region F at the center is deflected downward.

The deflected light beams enter halving photodetectors 33 to 36 and photodetectors (pp-photodetectors) 38 and 39, respectively, of the photodetecting system which are disposed on the same plane which is perpendicular to the optical axis of the signal detecting system. In other words, the +1-order light passing through the region A impinges upon the dividing line of the halving photodetector 33 whose upper right-hand side toward the front of the traveling direction is the detecting portion a, the lower left-hand side is the detecting portion b and whose dividing line is at an angle of 45 degrees with respect to the direction of the track, in the near field condition. The +1-order light passing through the region C impinges upon the dividing line of the halving photodetector 34 whose upper left-hand side is the detecting portion c, whose lower right-hand side is the detecting portion d and whose dividing line is at an angle 135 degrees with respect to the track direction, in the near field condition.

The +1-order light passing through the region B impinges upon the dividing line of the halving photodetector 36 whose upper left-hand side is a detecting portion h, whose lower right-hand side toward the front of the traveling direction is a detecting portion g, and whose dividing line is at an angle 135 degrees with respect to the track direction, in the near field condition. The +1-order light beam passing through the region D impinges upon the dividing line of the halving photodetector 35 whose upper right-hand side toward the front of the traveling direction is a detecting portion f, the lower left-hand side is a detecting portion e and whose dividing line is at an angle of 45 degrees with respect to the track direction, in the near field condition. The +1-order light beam passing through the region E impinges upon a detecting portion i of the photodetector 38, in the near field condition. The +1-order light beam passing through the region F impinges upon a detecting portion j of the photodetector 39, in the near field condition.

In the Foucault method for generating a focus error signal, when light beams passing through the regions E and F at the center are not used to detect a focus error, the sensitivity of a focus error signal is enhanced. Hence, as in the fourth embodiment, a focus error signal is detected as FES=(a−b)+(c−d)+(e−f)+(g−h)=(a+c+e+g)−(b+d+f+h).

When the track 21a of the disk 21 includes a successive groove (i.e., when the disk 21 is a re-writable disk, etc.,), by the push-pull method, a tracking error signal is detected as TES=i−j based on outputs (i, j) from the detecting portions i and j of the photodetectors 38 and 39. To prevent a decrease in the light quantity of the tracking error signal TES, the tracking error signal is detected as TES=(a+b+c+d+i)−(e+f+g+h+j).

When the track 21a of the disk 21 is a track of a ROM disk and so on which includes only a row of pits, by the heterodyne method, a tracking error signal is generated by calculating a phase difference between the heterodyne signal HTD=(a+b+e+f)−(cd+g+h+) and the information signal RF=a+b+c+d+e+f+g+h+i+j.

The other structure and operations are similar to those of the optical disk apparatus of the third embodiment, and therefore, will not be illustrated nor described. The directions are not limited to angles of 45 degree and 135 degree.

Sixth Embodiment

Figure 20:
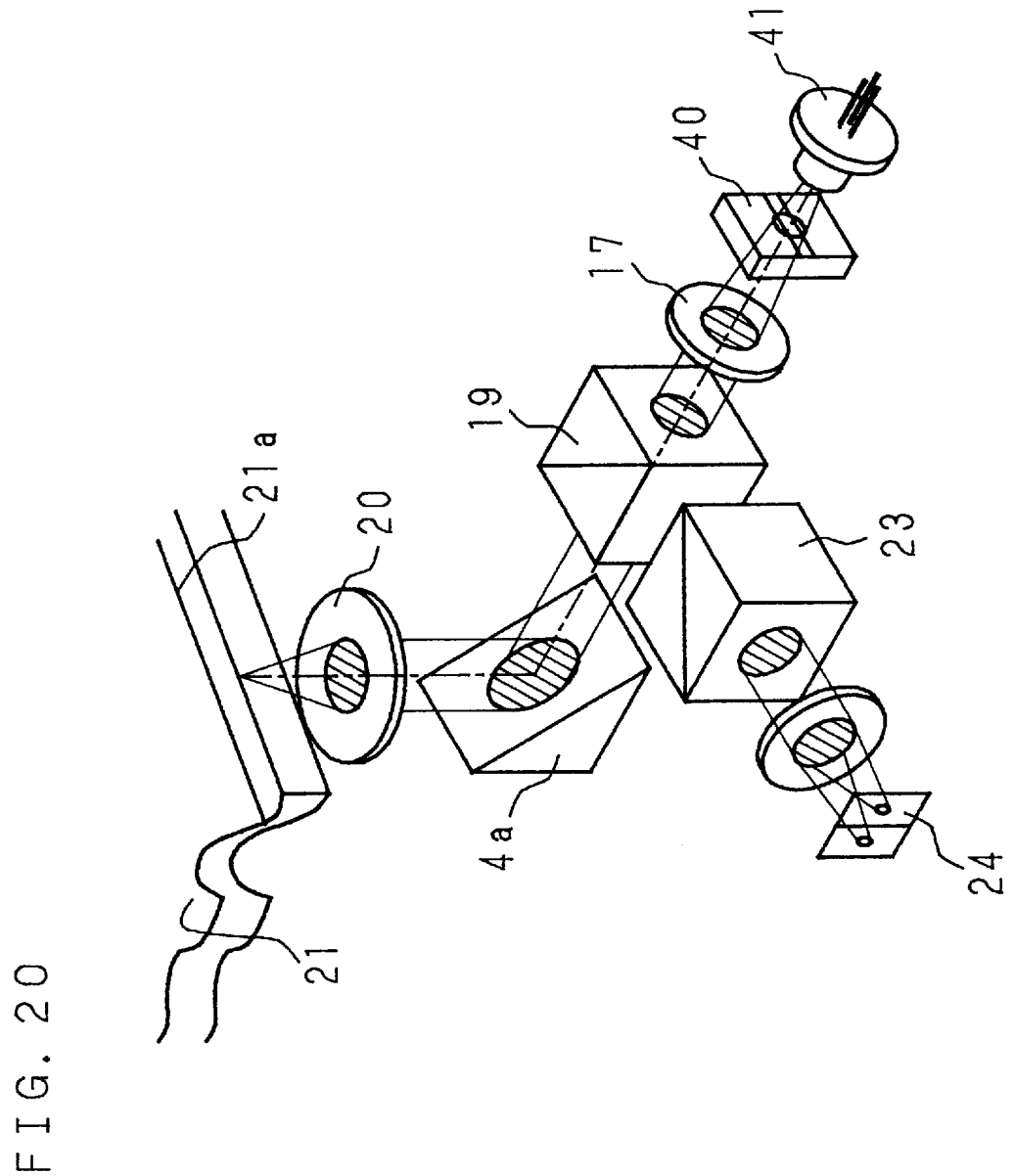
FIG. 20 is a perspective view showing an example of a structure of an optical system of an optical disk apparatus according to a sixth embodiment of the present invention.

FIG. 20 is a perspective view showing an example of a structure of an optical system of an optical disk apparatus according to a sixth embodiment of the present invention. In this optical disk apparatus, a light beam which is emitted in a horizontal direction from an LD/PD (PhotoDiode) unit 41 which is disposed on an optical axis impinges upon a hologram optical element 40 which is disposed on the optical axis so that its optical surface is perpendicular to the optical axis, and 0-order light which is not diffracted by the hologram optical element 40 enters the collimating lens 17 to be converted into parallel light. The light beam converted by the collimating lens 17 into parallel light passes through the beam splitter 19 which is disposed on the optical axis, to be deflected upward to side by 90 degrees by the upward mirror 4a. The objective lens 20 disposed on the optical axis so that its optical surface is perpendicular to the optical axis focuses the 90-degree deflected light beam on the track 21a of the disk 21 which is rotated in the horizontal direction above the objective lens 20.

Reflected light from the disk 21 passes through the objective lens 20 in a reverse direction to that of when converged, to be deflected upward to side by 90 degrees by the upward mirror 4a and to return to the beam splitter 19. Within the beam splitter 19, the reflected light is partially transmitted to impinge upon the signal detecting system. The rest of the reflected light is reflected within the beam splitter 19, to be deflected upward to side by 90 degrees and to enter the MO signal detecting system.

Figure 21:
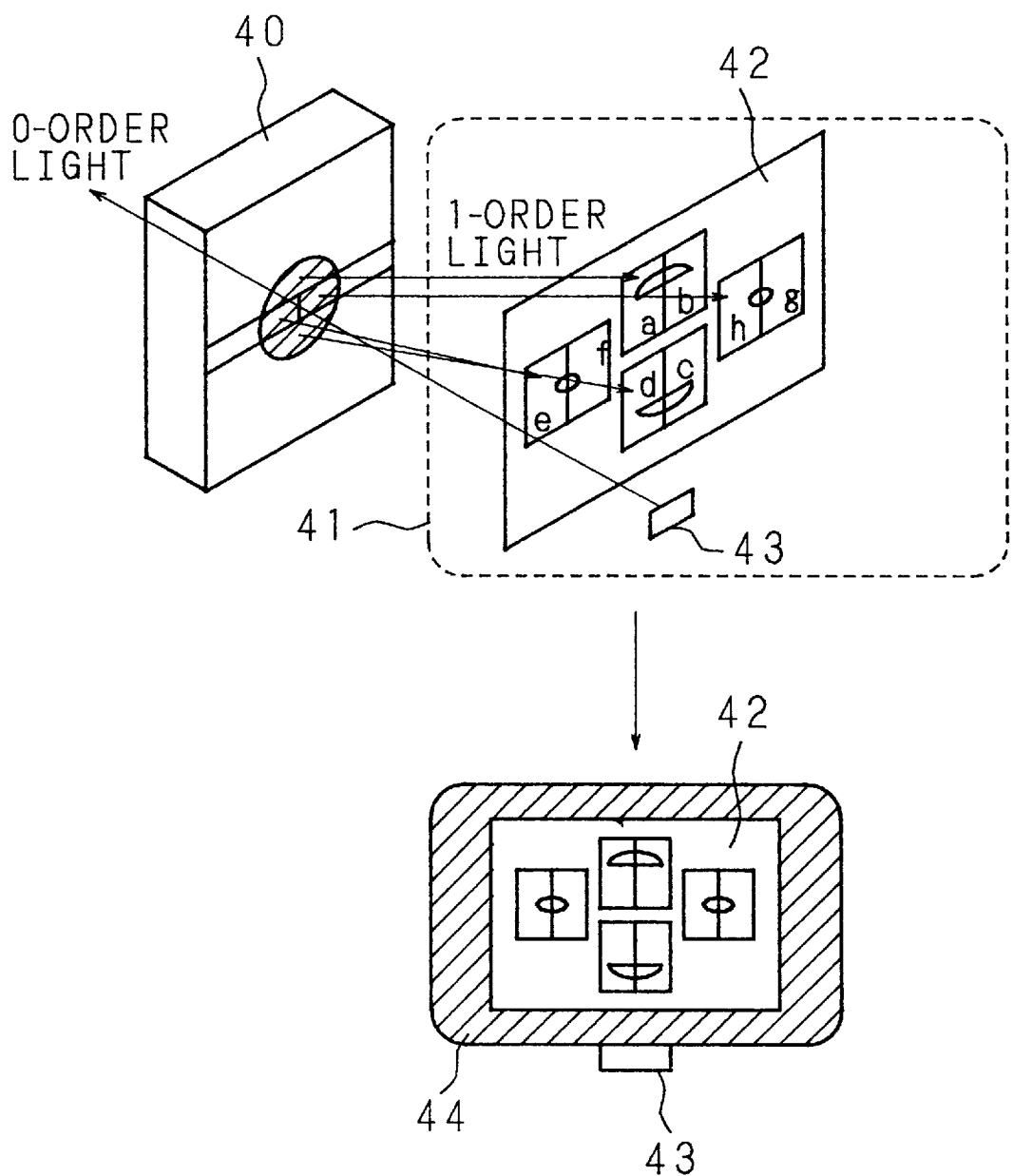
FIG. 21 is a perspective view showing an example of a structure of an LD, a hologram optical element and an photodetecting system in the sixth embodiment.

The rest of the reflected light entering the MO signal detecting system is divided by polarization by the Wollaston prism 23 which is disposed on an optical axis of the MO signal detecting system into two linearly polarized light beams. The halving photodetector 24 detects each of the two linearly polarized light beams. The reflected light entering the signal detecting system impinges upon the hologram optical element 40 through the collimating lens 17, in a reverse direction to that of the 0-order light above. As shown in FIG. 21, the hologram optical element 40 has the same configuration as the hologram optical element 31 of the second embodiment, the direction in which the hologram optical element 40 deflects each divided light beam is also same as that of the hologram optical element 31.

The light beams divided and deflected by the hologram optical element 40 impinge upon a combined photodetector 42 of the photodetecting system which is disposed so that its optical surface is perpendicular to the optical axis. Detecting portions a to h of the combined photodetector 42 are arranged in a similar manner in which the detecting portions a to h of the halving photodetectors 27 to 30 of the second embodiment. As shown in FIG. 21, the combined photodetector 42 held by a PD carrier 44, and an LD 43 fixed to a bottom portion of the PD carrier 44 form the LD/PD unit 41. The position and the condition in which each deflected light beam impinges each of the detecting portions a to h of the combined photodetector 42 are similar to those regarding the detecting portions a to h of the halving photodetectors 27 to 30 of the second embodiment.

The other structure and operations are similar to those of the optical disk apparatus of the second embodiment, and therefore, will not be described.

Seventh Embodiment

Figure 22A:
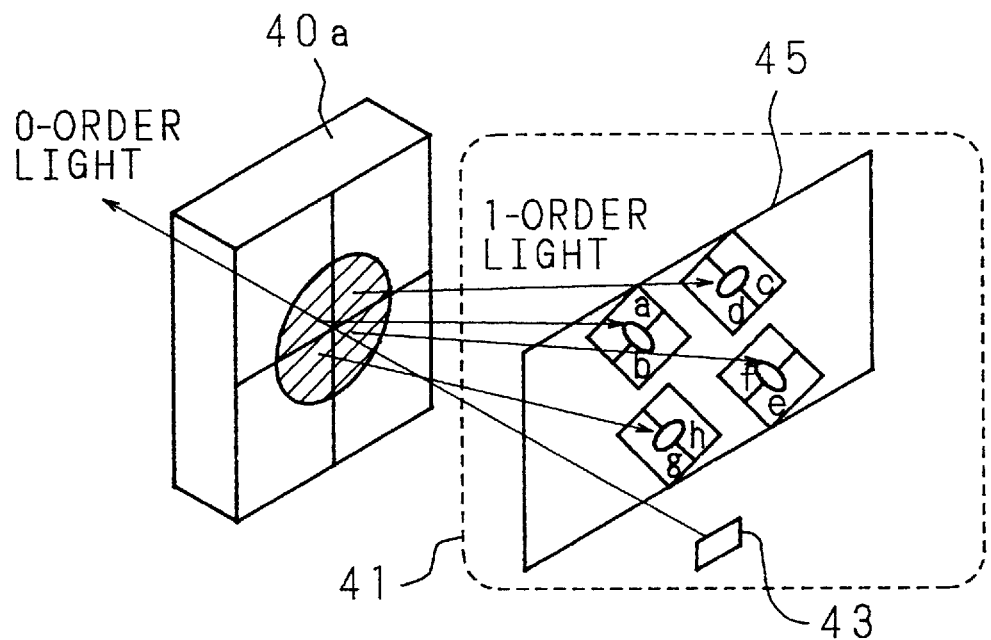
FIG. 22A is a perspective view showing an example of a structure of an LD, a hologram optical element and a photodetecting system of an optical disk apparatus according to a seventh embodiment of the present invention.
Figure 22B:
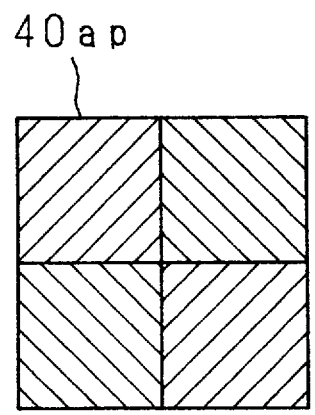
FIG. 22B is a diagram showing a pattern of a hologram optical element of the seventh embodiment.

FIG. 22A is a perspective view showing an example of a structure of an LD, a hologram element and a photodetecting system of an optical disk apparatus according to a seventh embodiment of the present invention. This optical disk apparatus is the same as that of the sixth embodiment as it is modified to replace the hologram optical element 40 with a hologram optical element 40a. The configuration and a hologram pattern 40ap of the hologram optical element 40a are those of the hologram optical element 37 of the fourth embodiment, as shown in FIG. 22B. The direction in which the hologram optical element 40a deflects each divided light beam is also the same as that of the hologram optical element 37.

The light beams divided and deflected by the hologram optical element 40a impinge upon a combined photodetector 45 of the photodetecting system which is disposed so that its optical surface is perpendicular to the optical axis. Detecting portions a to g of the combined photodetector 45 are arranged in a similar manner in which the detecting portions a to g of the halving photodetectors 33 to 36 of the fourth embodiment. As shown in FIG. 22A, the combined photodetector 45 and the LD 43 which is fixed to a bottom portion of the case of the combined photodetector 45 form the LD/PD unit 41. The position and the condition in which each one of the light beams which are deflected by the hologram optical element 40a impinges each of the detecting portions a to g of the combined photodetector 45 are similar to those regarding the detecting portions a to g of the halving photodetectors 33 to 36 of the fourth embodiment.

The other structure and operations are similar to those of the optical disk apparatuses of the sixth embodiment (optical system) and the fourth embodiment (photodetecting system), and therefore, will not be described.

Eighth Embodiment

Figure 23:
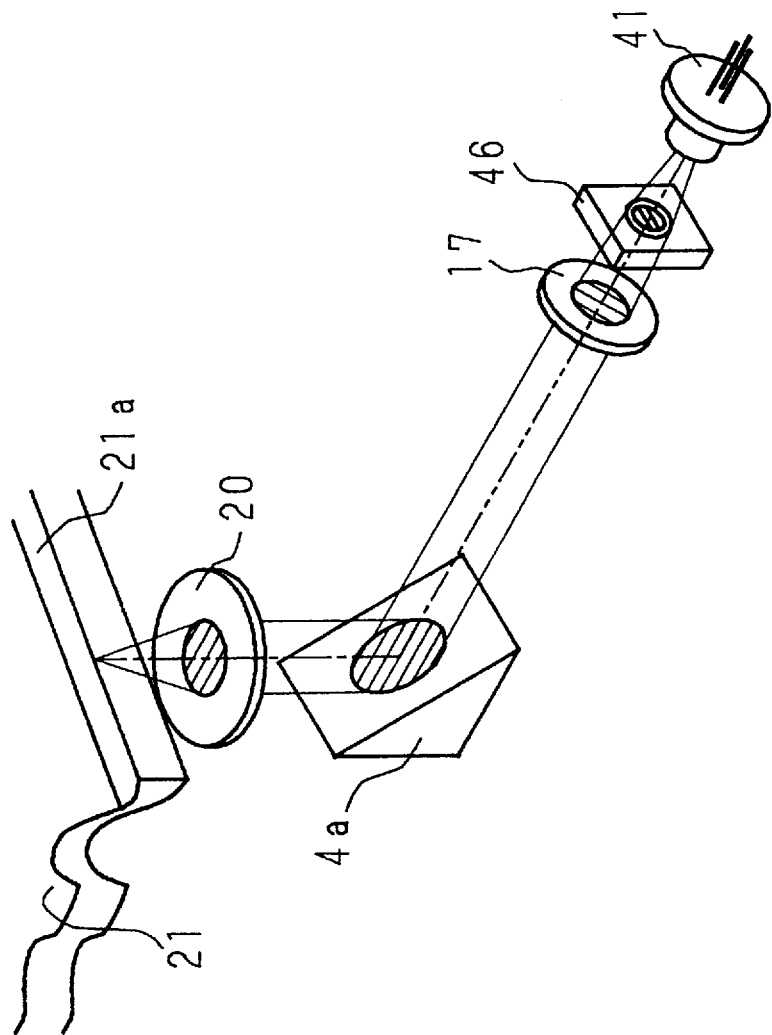
FIG. 23 is a perspective view showing an example of a structure of an optical system of an optical disk apparatus according to an eighth embodiment of the present invention.

FIG. 23 is a perspective view showing an example of a structure of an optical system of an optical disk apparatus according to an eighth embodiment of the present invention. In this optical disk apparatus, a light beam which is emitted in a horizontal direction from the LD/PD unit 41 which is disposed on an optical axis impinges upon a hologram optical element 46 which is disposed on the optical axis so that its optical surface is perpendicular to the optical axis, and 0-order light which is not diffracted from the hologram optical element 46 enters the collimating lens 17 to be converted into parallel light. The light beam converted by the collimating lens 17 into parallel light is deflected upward to side by 90 degrees by the upward mirror 4a. The objective lens 20, which is disposed on the optical axis so that its optical surface is perpendicular to the optical axis, focuses the 90-degree deflected light beam on the track 21a of the disk 21 which is rotated in the horizontal direction above the objective lens 20.

Reflected light from the disk 21 passes through the objective lens 20 in a reverse direction to that of when converged, to be deflected upward to side by 90 degrees by the upward mirror 4a and to enter the signal detecting system. The reflected light entering the signal detecting system impinges upon the hologram optical element 46 through the collimating lens 17, in a reverse direction to that of the 0-order light above. The hologram optical element 46 has the same configuration as the hologram optical element 31 of the second embodiment.

Figure 24A:
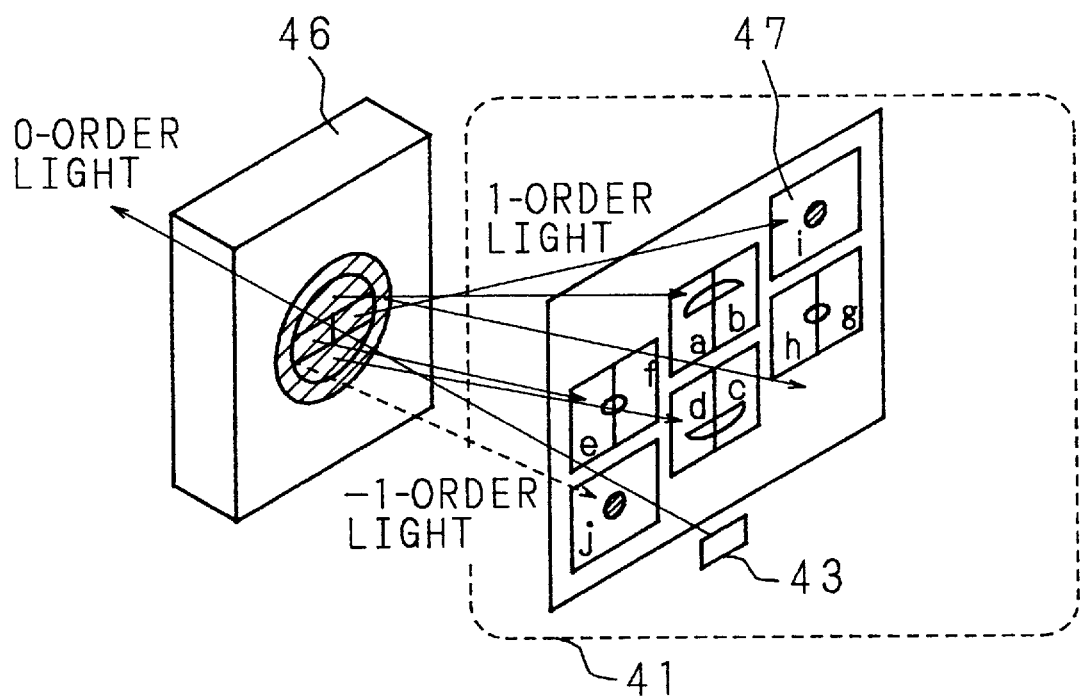
FIG. 24A is a perspective view showing an example of a structure of an LD, a hologram optical element and the photodetecting system in the eighth embodiment.
Figure 24B:
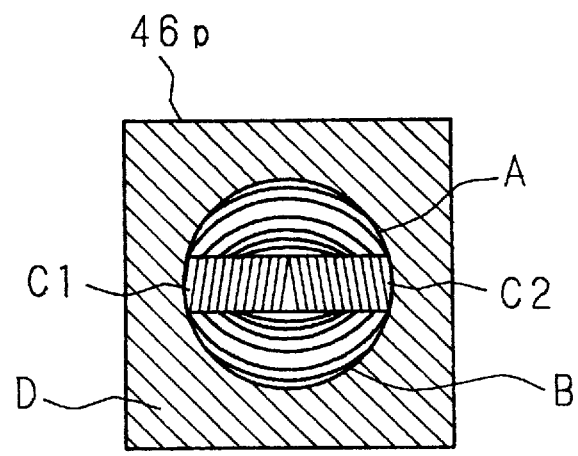
FIG. 24B is a diagram showing a pattern of a hologram optical element of the eighth embodiment.

In a hologram pattern 46p of the hologram optical element 46, the optical surface is partitioned into two regions inside and outside the circle, and regions A, B, C1 and C2 within the circle are similar to the hologram pattern of the hologram optical element 31, as shown in FIG. 24B. The direction in which each divided light beam is deflected is also the same. The region D outside the circle has a fine pitch and exhibits a polarization effect, so that the hologram pattern is at an angle of about 45 degrees with respect to the direction of polarization of light from the LD/PD unit 41. ±1-order light passing through the region D is deflected toward upper left-side and lower right-side toward the front of the traveling direction.

The light beams divided and deflected by the hologram optical element 46 impinge upon a combined photodetector 47 of the photodetecting system which is disposed so that its optical surface is perpendicular to the optical axis. Detecting portions a to h of the combined photodetector 47 are arranged in a similar manner in which the detecting portions a to h of the halving photodetectors 27 to 30 of the second embodiment. As shown in FIG. 24A, the other detecting portions i and j of the combined photodetector 47 are arranged at an upper left-side and a lower right-side of the detecting portions a to h toward the front of the traveling direction of the incident light. The combined photodetector 47 and the LD 43 which is fixed to a bottom portion of the case of the combined photodetector 47 form the LD/PD unit 41.

The position and the condition in which each deflected light beam impinges each of the detecting portions a to h of the combined photodetector 47 are similar to those regarding the detecting portions a to h of the halving photodetectors 27 to 30 of the second embodiment. ±1-order light passing through the region D impinges upon the detecting portions i and j, and an MO signal is obtained based on a difference between signals from the same.

The other structure and operations are similar to those of the optical disk apparatus of the second embodiment, and therefore, will not be described.

Ninth Embodiment

Figure 25A:
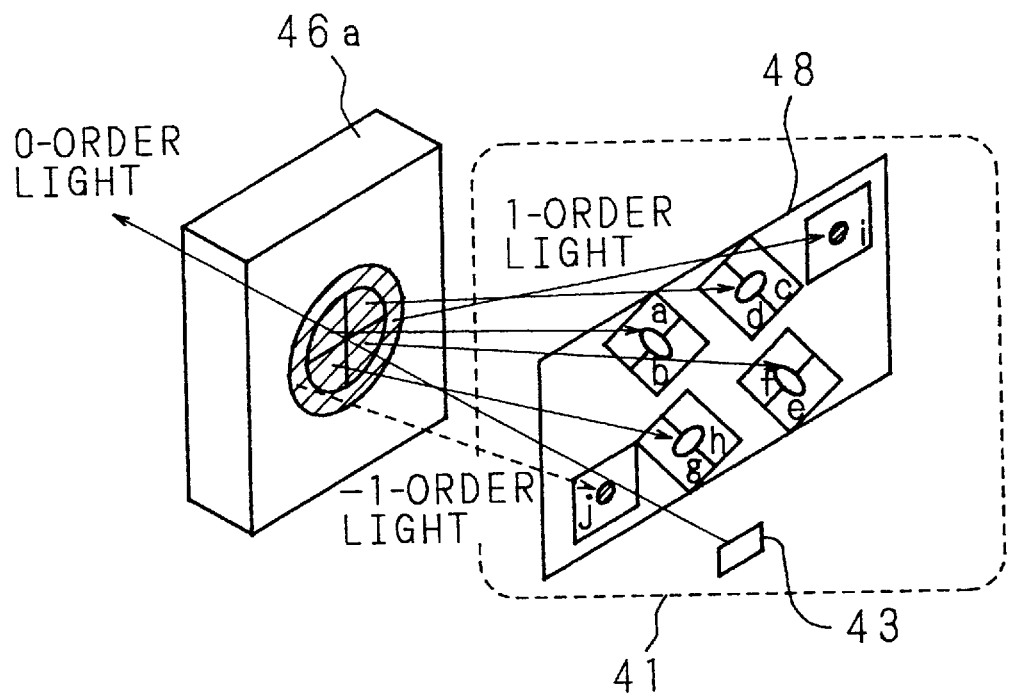
FIG. 25A is a perspective view showing an example of a structure of an LD, a hologram optical element and a photodetecting system in a ninth embodiment of the present invention.

FIG. 25A is a perspective view showing an example of a structure of an LD, a hologram element and a photodetecting system of an optical disk apparatus according to a ninth embodiment of the present invention. This optical disk apparatus is the same as that of the eighth embodiment as it is modified to replace the hologram optical element 46 with a hologram optical element 46a. The configuration and a hologram pattern 46ap of the hologram optical element 46a are those of the hologram optical element 37 of the fourth embodiment.

Figure 25B:
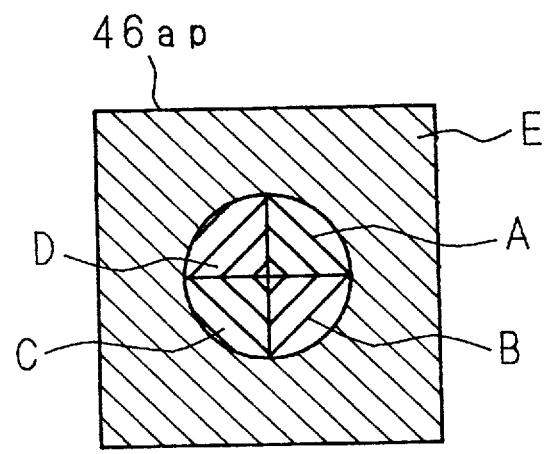
FIG. 25B is a diagram showing a pattern of a hologram optical element of the ninth embodiment.

In a hologram pattern 46ap of the hologram optical element 46a, the optical surface is partitioned into two regions inside and outside the circle, and regions A, B, C and D within the circle are similar to the hologram pattern of the hologram optical element 37, as shown in FIG. 25B. The direction in which each divided light beam is deflected is also the same. The region E outside the circle has a fine pitch and exhibits a polarization effect, so that the hologram pattern is at an angle of about 45 degrees with respect to the direction of polarization of light from the LD/PD unit 41. ±1-order light passing through the region E is deflected toward upper left-side and lower right-side toward the front of the traveling direction.

The light beams divided and deflected by the hologram optical element 46a impinge upon a combined photodetector 48 of the photodetecting system which is disposed so that its optical surface is perpendicular to the optical axis. Detecting portions a to h of the combined photodetector 48 are arranged in a similar manner in which the detecting portions a to h of the halving photodetectors 33 to 36 of the fourth embodiment. As shown in FIG. 25A, the other detecting portions i and j of the combined photodetector 48 are arranged at an upper left-side and a lower right-side of the detecting portions a to h toward the front of the traveling direction of the incident light. The combined photodetector 48 and the LD 43 fixed to a bottom portion of the case of the combined photodetector 48 form the LD/PD unit 41.

The position and the condition in which each deflected light beam impinges each of the detecting portions a to h of the combined photodetector 48 are similar to those regarding the detecting portions a to h of the halving photodetectors 33 to 36 of the fourth embodiment. ±1-order light passing through the region E impinges upon the detecting portions i and j, and an MO signal is obtained based on a difference between signals from the same.

The other structure and operations are similar to those of the optical disk apparatus of the fourth embodiment, and therefore, will not be described.

Tenth Embodiment

Figure 26:
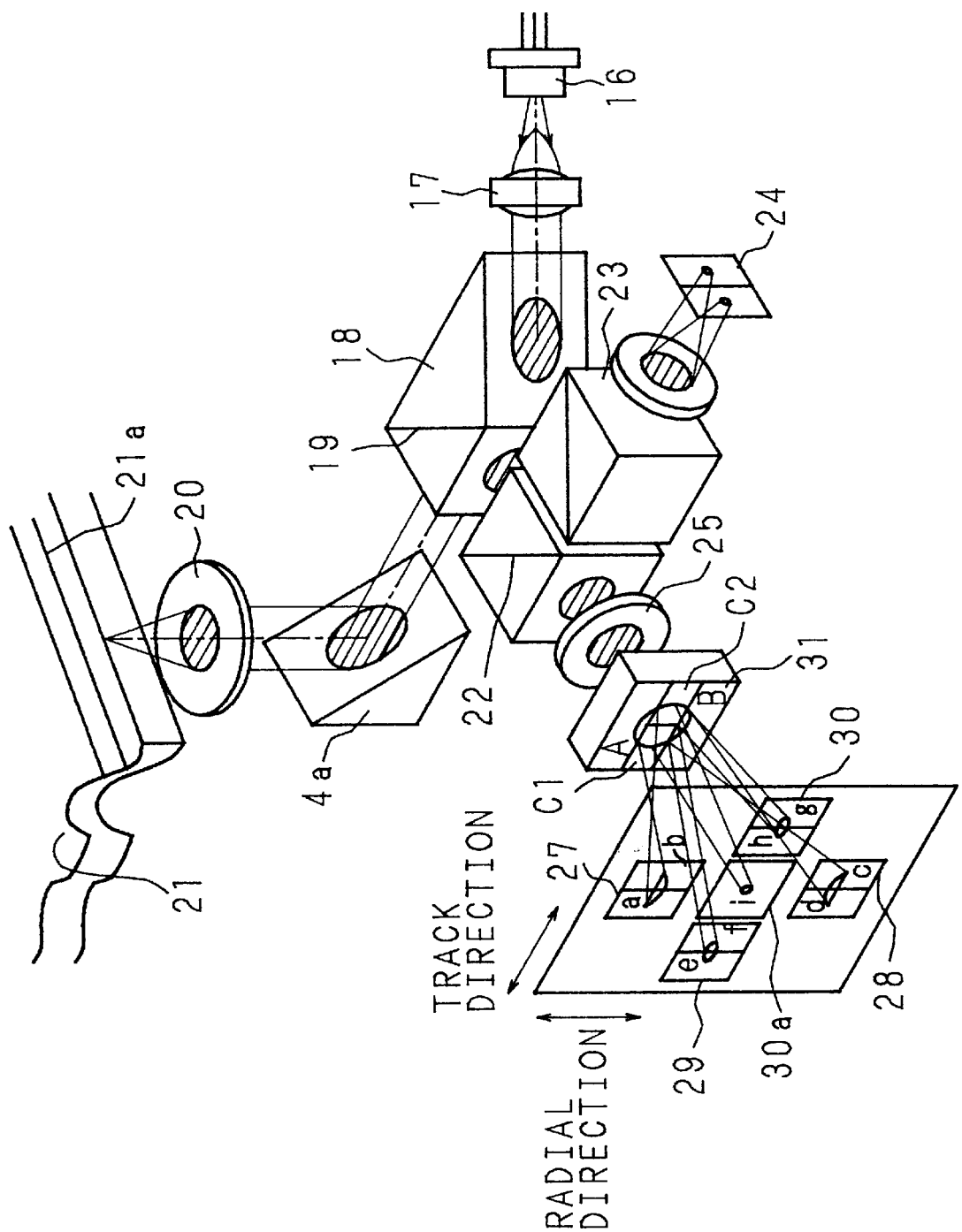
FIG. 26 is a perspective view showing an example of a structure of an optical system of an optical disk apparatus according to a tenth embodiment of the present invention.

FIG. 26 is a perspective view showing an example of a structure of an optical system of an optical disk apparatus according to a tenth embodiment of the present invention. This optical disk apparatus is approximately the same as those of the second embodiment. In this embodiment, of reflected light from the disk 21 impinging upon the hologram optical element 31, 0-order light which is not diffracted from the hologram optical element 31 (i.e., which propagates straight) is converged only because of the converging effect of the servo lens 25, to enter a photodetector 30a which is disposed at the center of the halving photodetectors 27 to 30.

Figure 27:
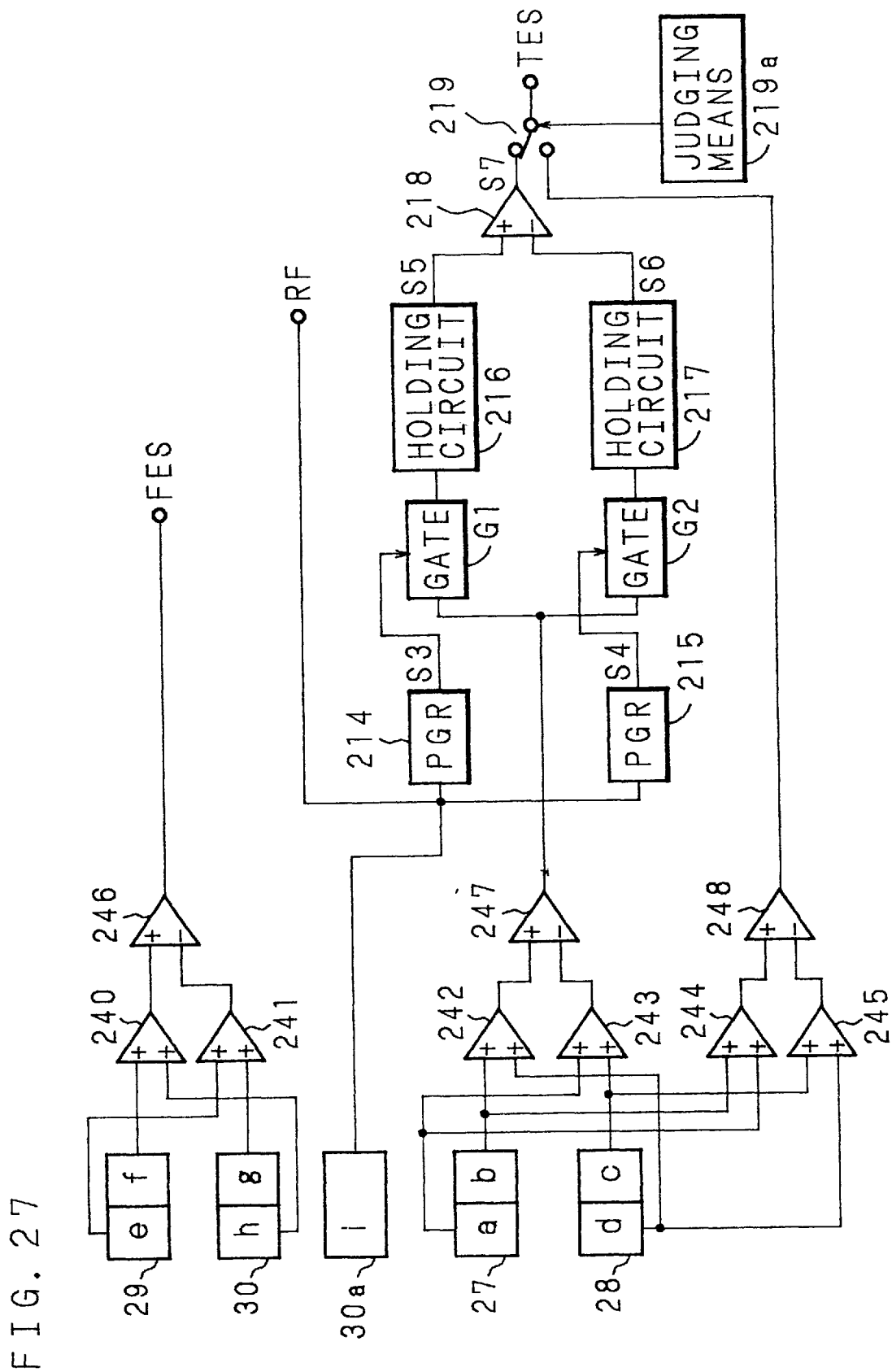
FIG. 27 is a block diagram showing a structure of a calculating unit in the tenth embodiment.

FIG. 27 is a block diagram showing a structure of a calculating unit of the optical disk apparatus according to the tenth embodiment of the present invention. In this calculating unit, an adder 240 adds an output from the detecting portion f and an output from the detecting portion h, while an adder 241 adds an output from the detecting portion e and an output from the detecting portion g. A subtracter 246 calculates a difference between the output from the adder 240 and the output from the adder 241. An output from the subtracter 246 is outputted as a focus error signal FES=(f+h)−(e+g).

An adder 244 adds an output from the detecting portion a and an output from the detecting portion b, while an adder 245 adds an output from the detecting portion c and an output from the detecting portion d. A subtracter 248 calculates a difference between an output from the adder 244 and an output from the adder 245. An output from the subtracter 248 is outputted to the one input terminal of an switch circuit 219, as a tracking error signal TES=(a+b)−(c+d).

An output from the detecting portion i of the photodetector 30a is outputted as the RF signal, and at the same time supplied to pulse generators 214 and 215. The RF signal is a reproduction signal as it is in a case where the disk 21 is a ROM disk or a phase-variable optical disk. An adder 242 adds an output from the detecting portion b and an output from the detecting portion d, while an adder 243 adds an output from the detecting portion a and an output from the detecting portion c. A subtracter 247 calculates a difference between an output from the adder 242 and an output from the adder 243. An output from the subtracter 247 is supplied to gates G1 and G2, as the HTD signal.

When the RF signal transits from a negative level to a positive level, the pulse generator 214 generates a sampling pulse S3 and supplies the same to the gate G1. In response, the gate G1 is opened, whereby the value of the HTD signal at this stage is sampled and held by the holding circuit 216. On the other hand, the pulse generator 215 generates a sampling pulse S4 when the RF signal transits from a positive level to a negative level, and supplies the same to the gate G2. In response, the gate G2 is opened, whereby the value of the HTD signal at this stage is sampled and held by the holding circuit 217.

The subtracter 218 calculates a difference between a holding signal S5 in the holding circuit 216 and a holding signal S6 in the holding circuit 217, to thereby detect a phase difference between the RF signal and the HTD signal. A difference S7 between the holding signal S5 and the holding signal S6 is outputted to the other input terminal of the switch circuit 219, as a tracking error signal. When judging means 219a judges that the track 21a of the disk 21 includes a successive groove, the switch circuit 219 outputs a tracking error signal which is obtained by the push-pull method. When the judging means 219a judges that the track 21a of the disk 21 includes only a row of pits, the switch circuit 219 outputs a tracking error signal which is obtained by the heterodyne method.

Since the photodetector 30a is disposed in the calculating unit to generate the RF signal in this embodiment, it is not necessary to use a low-pass filter which removes a reproduction signal (RF signal) from servo signals (FES, TES), which simplifies the circuitry structure. Further, since the adders and the subtracters do not have to operate at a high frequency, the adders and the subtracters may be cheap adders and subtracters.

The other structure and operations are similar to those of the optical disk apparatus of the first embodiment, and therefore, will not be described.

Eleventh Embodiment

Figure 28:
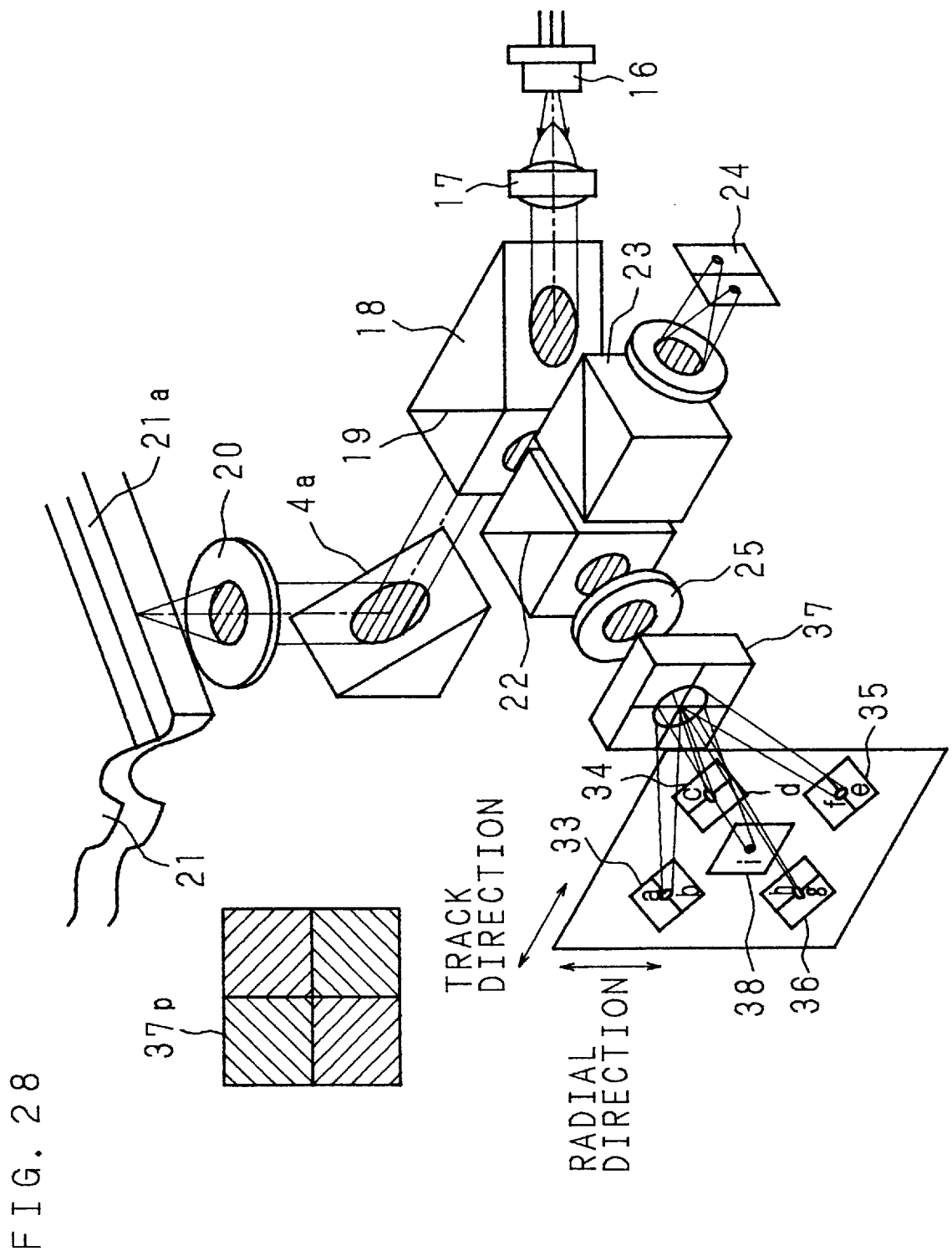
FIG. 28 is a perspective view showing an example of a structure of an optical system of an optical disk apparatus according to an eleventh embodiment of the present invention.

FIG. 28 is a perspective view showing an example of a structure of an optical system of an optical disk apparatus according to an eleventh embodiment of the present invention. The optical system of this optical disk apparatus is approximately the same as those of the fourth embodiment. In this embodiment, of reflected light from the disk 21 impinging upon the hologram optical element 37, 0-order light which is not diffracted from the hologram optical element 37 (i.e., which propagates straight) is converged only because of the converging effect of the servo lens 25, to enter a detecting portion i of a photodetector 38 which is disposed at the center of the halving photodetectors 33 to 36. A signal which is detected at the detecting portion i is used as the RF signal. The RF signal is a reproduction signal as it is in a case where the disk 21 is a ROM disk or a phase-variable optical disk.

When the track 21a of the disk 21 includes only a row of pits, by the heterodyne method, a tracking error signal is generated by calculating a phase difference between the heterodyne signal HTD=(a+b+e+f)−(c+d+g+h) and the information signal RF=i (i.e., an output from the detecting portion i).

Since the photodetector 38 is disposed in the calculating unit to generate the RF signal in this embodiment, it is not necessary to use a low-pass filter which removes a reproduction signal (RF signal) from servo signals (FES, TES), which simplifies the circuitry structure. Further, since the adders and the subtracters do not have to operate at a high frequency, the adders and the subtracters may be cheap adders and subtracters.

The other structure and operations are similar to those of the optical disk apparatus of the fourth embodiment, and therefore, will not be described.

Twelfth Embodiment

Figure 29A:
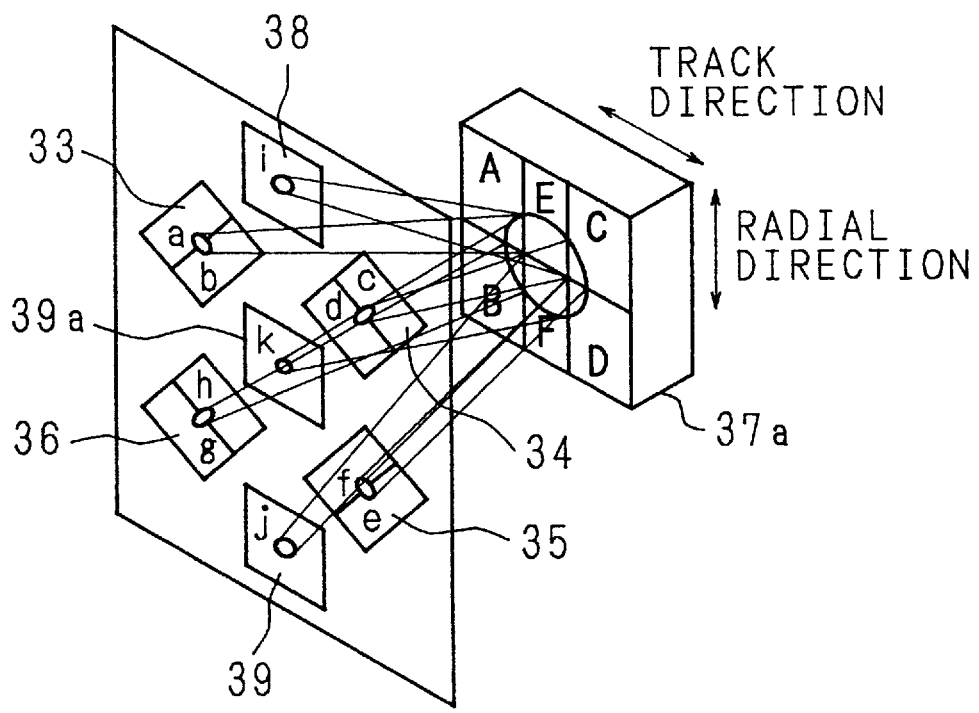
FIG. 29A is a perspective view showing an example of a structure of a hologram optical element and a photodetecting system of an optical disk apparatus according to a twelfth embodiment of the present invention.
Figure 29B:
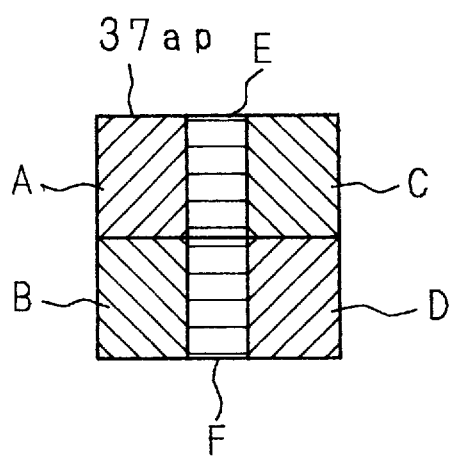
FIG. 29B is a diagram showing a pattern of a hologram optical element of the twelfth embodiment.

FIG. 29A is a perspective view showing an example of a structure of a hologram optical element and a photodetecting system of an optical disk apparatus according to a twelfth embodiment of the present invention, and FIG. 29B is a diagram showing a pattern of an optical element used in the same. The optical system of this optical disk apparatus is approximately the same as those of the fifth embodiment. In this embodiment, of reflected light from the disk 21 impinging upon the hologram optical element 37a, 0-order light which is not diffracted from the hologram optical element 37a (i.e., which propagates straight) is converged only because of the converging effect of the servo lens 25, to enter a detecting portion k of a photodetector 39a which is disposed at the center of the halving photodetectors 33 to 36. A signal which is detected at the detecting portion k is used as the RF signal. The RF signal is a reproduction signal as it is in a case where the disk 21 is a ROM disk or a phase-variable optical disk.

When the track 21a of the disk 21 includes only a row of pits, by the heterodyne method, a tracking error signal is generated by calculating a phase difference between the heterodyne signal HTD=(a+b+e+f)−(c+d+g+h) and the information signal RF=k (i.e., an output from the detecting portion k).

Since the photodetector 39a is disposed in the calculating unit to generate the RF signal in this embodiment, it is not necessary to use a low-pass filter which removes a reproduction signal (RF signal) from servo signals (FES, TES), which simplifies the circuitry structure. Further, since the adders and the subtracters do not have to operate at a high frequency, the adders and the subtracters may be cheap adders and subtracters.

The other structure and operations are similar to those of the optical disk apparatus of the fifth embodiment, and therefore, will not be illustrated nor described.

Thirteenth Embodiment

Figure 30:
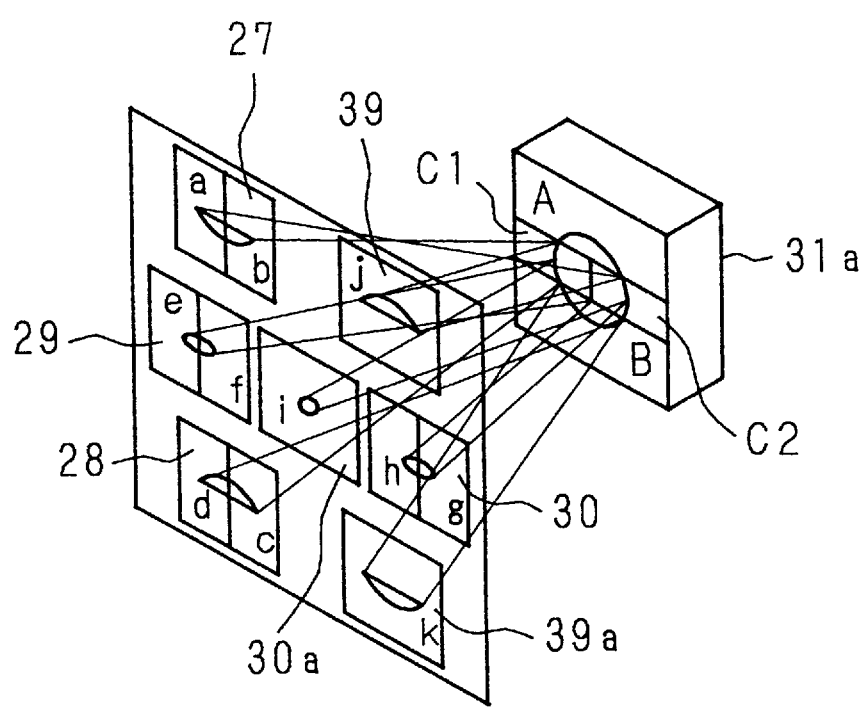
FIG. 30 is a perspective view showing an example of a structure of a hologram optical element and a photodetecting system of an optical disk apparatus according to a thirteenth embodiment of the present invention.

FIG. 30 is a perspective view showing an example of a structure of a hologram optical element and a photodetecting system of an optical disk apparatus according to a thirteenth embodiment of the present invention. The optical system of this optical disk apparatus is approximately the same as those of the tenth embodiment. In this embodiment, of reflected light from the disk 21 impinging upon the hologram optical element 31a, 0-order light which is not diffracted from the hologram optical element 31a (i.e., which propagates straight) is converged only because of the converging effect of the servo lens 25, to enter the photodetector 30a which is disposed at the center of the halving photodetectors 27 to 30.

Light passing through an upper region A of the hologram optical element 31a is divided into 0-order light and ±1-order lights. The 0-order light beam impinges upon the photodetector 30a, the +1-order light beam is deflected toward upper right-side toward the front of a traveling direction of the light beam, the −1-order light beam is deflected toward upper left-side toward the front of the traveling direction of the light beam, for instance. Light passing through a lower region B of the hologram optical element 31a is divided into 0-order light and ±1-order lights. The 0-order light beam impinges upon the photodetector 30a, the +1-order light beam is deflected toward lower right-side toward the front of the traveling direction of the light beam, −1-order light beam is deflected toward lower left-side to the direction of propagation of the light beam, for instance.

The +1-order light passing through the region A impinges upon the halving photodetector 27 which is disposed above the halving photodetector 29, in the far field condition as it is after converged. The −1-order light impinges upon a detecting portion j of a photodetector 39 which is disposed above the halving photodetector 30, in the far field condition. The +1-order light passing through the region B impinges upon the halving photodetector 28 which is disposed below the halving photodetector 29, in the far field condition as it is after converged. The −1-order light impinges upon a detecting portion k of a photodetector 39a which is disposed below the halving photodetector 30, in the far field condition.

Figure 31:
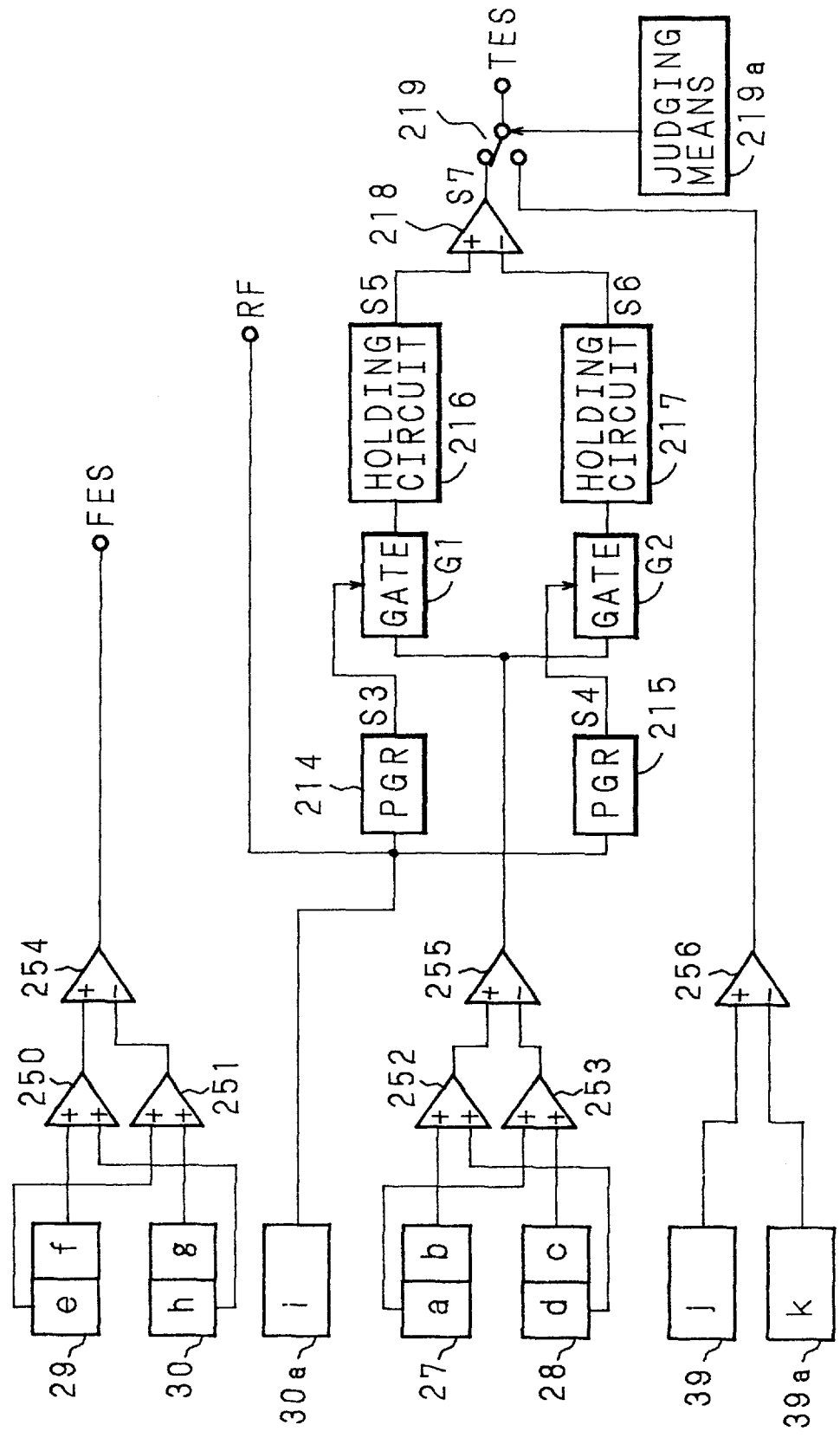
FIG. 31 is a block diagram showing a structure of a calculating unit in the thirteenth embodiment.

FIG. 31 is a block diagram showing a structure of a calculating unit of the optical disk apparatus according to the thirteenth embodiment. In this calculating unit, an adder 250 adds an output from the detecting portion f and an output from the detecting portion h, while an adder 251 an output from the detecting portion e and an output from the detecting portion g. A subtracter 254 calculates a difference between the outputs from the adders 250 and 251, and an output from the subtracter 254 is outputted as a focus error signal FES=(f+h)−(e+g). A subtracter 256 calculates a difference between an output from the detecting portion j of the photodetector 39 and an output from the detecting portion k of the photodetector 39a, and an output from the subtracter 256 is outputted to one input terminal of a switch circuit 219, as a tracking error signal TES=j−k which is calculated by the push-pull method.

An output from the detecting portion i of the photodetector 30a is outputted as the RF signal, and at the same time supplied to pulse generators 214 and 215. The RF signal is a reproduction signal as it is in a case where the disk 21 is a ROM disk or a phase-variable optical disk. An adder 253 adds an output from the detecting portion a and an output from the detecting portion c, while an adder 252 an output from the detecting portion b and an output from the detecting portion d. A subtracter 255 calculates a difference between the outputs from the adders 252 and 253, and an output from the subtracter 255 is supplied to gates G1 and G2, as the HTD signal.

When the RF signal transits from a negative level to a positive level, the pulse generator 214 generates a sampling pulse S3 and supplies the same to the gate G1. In response, the gate G1 is opened, whereby the value of the HTD signal at this stage is sampled and held by a holding circuit 216. On the other hand, the pulse generator 215 generates a sampling pulse S4 when the RF signal transits from a positive level to a negative level, and supplies the same to the gate G2. In response, the gate G2 is opened, whereby the value of the HTD signal at this stage is sampled and held by a holding circuit 217.

The subtracter 218 calculates a difference between a holding signal S5 in the holding circuit 216 and a holding signal S6 in the holding circuit 217, to thereby detect a phase difference between the RF signal and the HTD signal. A difference S7 between the holding signal S5 and the holding signal S6 is outputted to the other input terminal of the switch circuit 219, as a tracking error signal. When judging means 219a judges that the track 21a of the disk 21 includes a successive groove, the switch circuit 219 outputs a tracking error signal which is obtained by the push-pull method. When the judging means 219a judges that the track 21a of the disk 21 includes only a row of pits, the switch circuit 219 outputs a tracking error signal which is obtained by the heterodyne method.

Since the photodetectors 39 and 39a for generating a push-pull signal are different from the photodetectors 27 and 28 for generating the HTD signal in this embodiment, a low-pass filter is not necessary, which simplifies the circuitry structure. Further, since the adders and the subtracters do not have to operate at a high frequency, the adders and the subtracters may be cheap adders and subtracters.

The other structure and operations are similar to those of the optical disk apparatus of the tenth embodiment, and therefore, will not be illustrated nor described.

Fourteenth Embodiment

Figure 32:
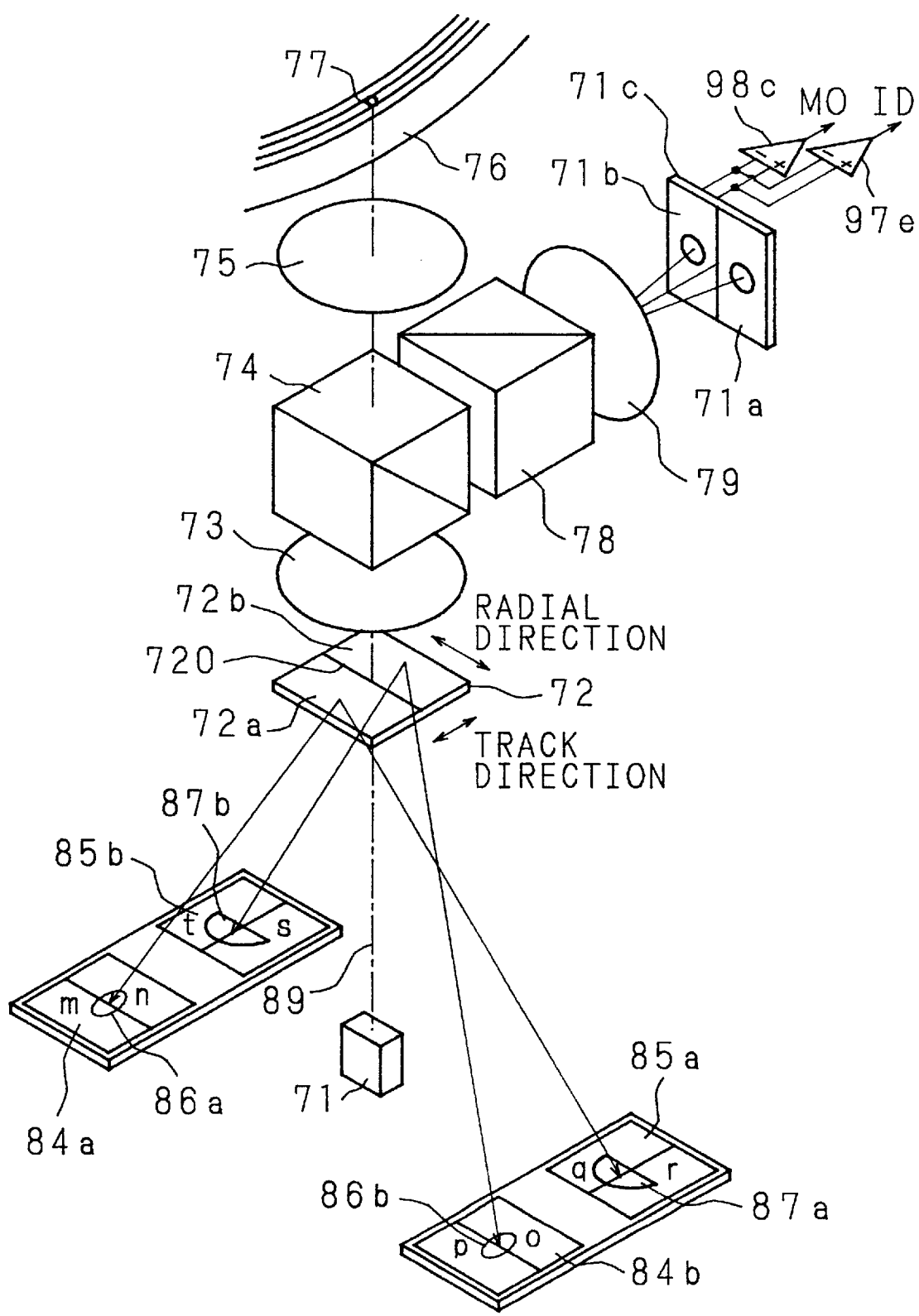
FIG. 32 is a perspective view showing an example of a structure of an optical system of an optical disk apparatus according to a fourteenth embodiment of the present invention.

FIG. 32 is a perspective view showing an example of a structure of an optical system and a photodetecting system of an optical disk apparatus according to a fourteenth embodiment of the present invention. This embodiment is an example where the optical disk apparatus according to this embodiment is applied to a magneto optical disk apparatus or a mini disk apparatus. In this optical disk apparatus, a light beam which is emitted in an upright direction from an LD (semiconductor laser) 71 which is disposed on an optical axis 89 of this optical system impinges upon a hologram optical element 72 which is disposed on the optical axis 89 so that its optical surface is perpendicular to the optical axis 89. The hologram optical element 72 is a flat rectangular solid, and an optical surface of the same is divided into regions 72a and 72b by a dividing line 720 which extends perpendicular to a track 77.

A light beam entering the hologram optical element 72 is separated by diffraction into 0-order light, ±1-order lights and other higher-order lights. Of such lights, the 0-order light propagates along the optical axis 89, enters a collimator lens (collimating lens) 73 which is disposed on the optical axis 89 so that its optical surface is perpendicular to the optical axis 89, and is then converted into parallel light. The light beam converted by the collimator lens 73 into parallel light passes through a beam splitter 74 which is disposed on the optical axis 89, to impinge upon an objective lens 75 which is disposed on the optical axis 89 so that its optical surface is perpendicular to the optical axis 89. This optical system is designed so that all light beams except for 0-order light are reflected. Hence, the objective lens 75 focuses only 0-order light on the track 77 on a disk 76 which is rotated in the horizontal direction above the objective lens 75, as a fine spot. This fine spot is used to erase, write and read an information signal.

Reflected light from the disk 76 passes through the objective lens 75 in a reverse direction to that of when converged, to return to the beam splitter 74. The reflected light is partially reflected within the beam splitter 74 to be deflected to side by 90 degrees and to enter the MO signal detecting system. The reflected light entering the MO signal detecting system is partially divided by polarization by a Wollaston prism 78 which is disposed on an optical axis of the MO signal detecting system into two linearly polarized light beams. A focusing lens 79 converges the two linearly polarized light beams, so that the two linearly polarized light beams impinge upon detecting portions 71a and 71b of a halving photodetector 71c.

Figure 33:
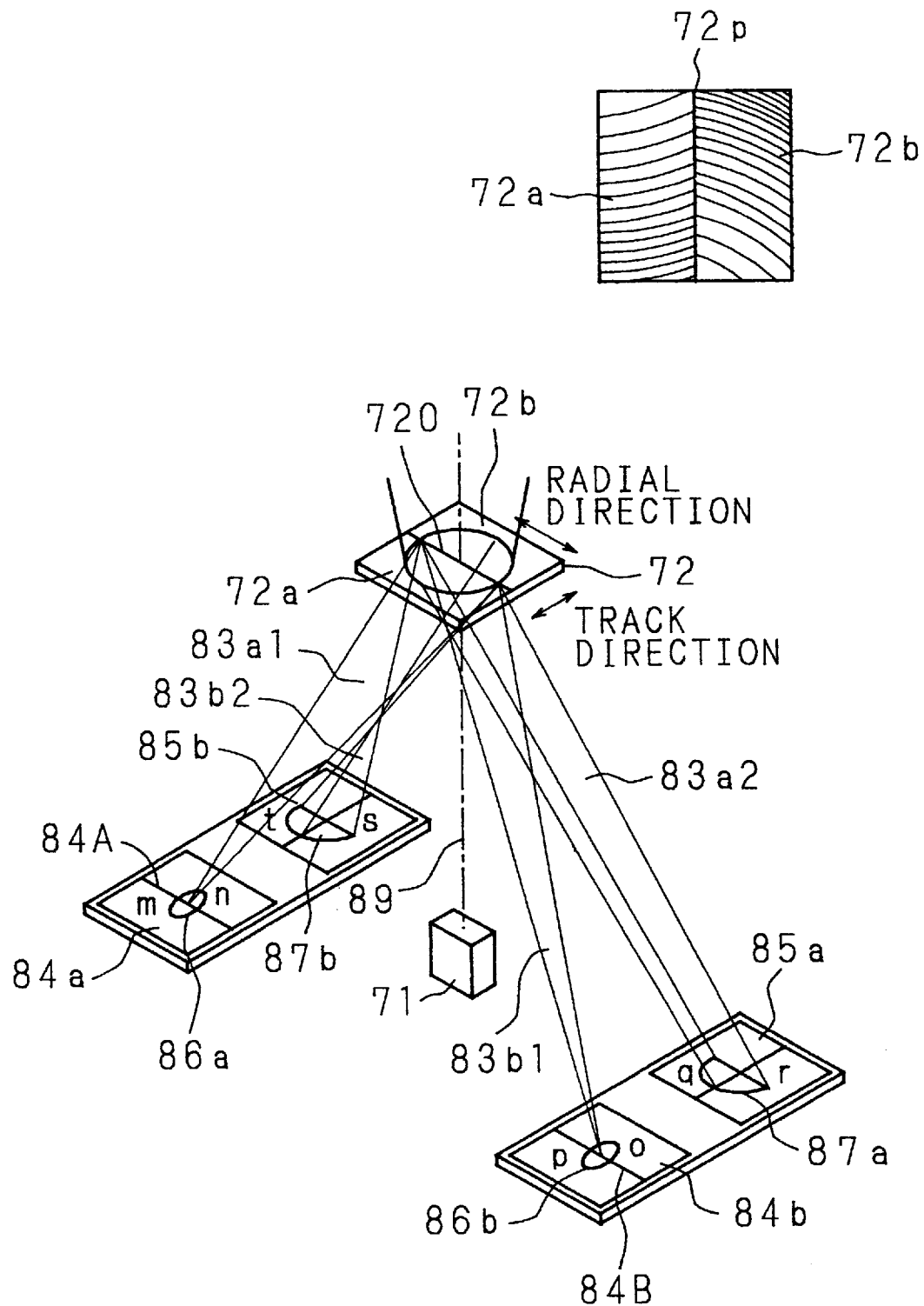
FIG. 33 is a perspective view showing an example of a structure of an LD, a hologram optical element, and the photodetecting system in the fourteenth embodiment.

A portion of the reflected light which was reflected by the disk 76 and passed through the beam splitter 74 is converged by the collimator lens 73, to enter the hologram optical element 72 in a reverse direction to that of the 0-order light. FIG. 33 is a perspective view showing an example of a structure of the hologram optical element 72 the photodetecting system of this embodiment. The hologram optical element 72 has a hologram pattern 72p. Reflected light entering the hologram optical element 72 impinges associated halving photodetector which will be described later, in the near field condition or the far field condition, for each divided light beam, due to refraction created by the collimator lens 73 and the regions 72a and 72b.

Of the reflected light entering the hologram optical element 72, the −1-order light beam 83al passing through the region 72a forms a beam spot 86a of the near field condition on a dividing line on a halving photodetector 84a whose dividing line is parallel to a dividing line 720 of the hologram optical element 72, whose detecting portion m is located on the region 72a side and whose detecting portion n is located on the region 72b side. The +1-order light beam 83a2 passing through the region 72a forms a beam spot 87a of the far field condition as it is before converged, on a dividing line on a halving photodetector 85a whose dividing line is parallel to the track 77, whose detecting portion q is located inside the track 77 and whose detecting portion r is located outside the track 77.

Of the reflected light entering the hologram optical element 72, the −1-order light beam 83b1 passing through the region 72b forms a beam spot 86b of the near field condition on a dividing line on a halving photodetector 84b whose dividing line is parallel to the dividing line 720 of the hologram optical element 72, whose detecting portion p is located on the region 72a side and whose detecting portion o is located on the region 72b side. The +1-order light beam 83b2 passing through the region 72b forms a beam spot 87b of the far field condition as it is after converged, on a dividing line on a halving photodetector 85b whose dividing line is parallel to the track 77, whose detecting portion t is located inside the track 77 and whose detecting portion s is located outside the track 77.

The halving photodetector 84a is located on the region 72a side and inside the track 77. The halving photodetector 84b is located on the region 72a side and outside the track 77. The halving photodetector 85a is located on the region 72b side and outside the track 77. The halving photodetector 77. 85b is located on the region 72b side and inside the track The objective lens 75 is supported by support mechanisms which are movable independently of each other along two axes, i.e., the direction in which the disk 76 wobbles in a plane direction and the direction of the radius of the disk 76. Magnetic circuits for creating force in the directions of the two axis are attached to these support mechanisms. When a control current based on the focus error signal and the tracking error signal which are available from the photodetecting system is supplied to coils of these magnetic circuits, focus servo and track servo are performed.

Now, operation of the optical system of the optical disk apparatus having such a structure as above will be described in the following.

A light beam emitted from the LD 71 impinges upon the hologram optical element 72. The light beam entering the hologram optical element 72 is separated by diffraction into 0-order light, ±1-order lights and other higher-order lights by the regions 72a and 72b. Of such light, the 0-order light propagates along the optical axis 89, enters a collimator lens 73 so as to be converted into parallel light. The light beam converted by the collimator lens 73 into parallel light passes through the beam splitter 74 so as to enter the objective lens 75. The objective lens 75 focuses only the 0-order light on the track 77 on the disk 76, as a fine spot. This fine spot is used to erase, write and read an information signal.

Reflected light from the disk 76 passes through the objective lens 75 in a reverse direction to that of when converged, to return to the beam splitter 74. The reflected light is partially reflected within the beam splitter 74 to be deflected upward to side by 90 degrees and to enter the MO signal detecting system. The reflected light entering the MO signal detecting system is partially divided by polarization by the Wollaston prism 78 into two linearly polarized light beams. The focusing lens 79 converges the two linearly polarized light beams, so that the two linearly polarized light beams impinge upon detecting portions 71a and 71b of a halving photodetector 71c.

A portion of the reflected light which was reflected by the disk 76 and passed through the beam splitter 74 is converged by the collimator lens 73, to enter the hologram optical element 72 in a reverse direction to that of the 0-order light. Of the reflected light entering the hologram optical element 72, the −1-order light beam 83a1 passing through the region 72a forms the beam spot 86a of the near field condition on the dividing line on the halving photodetector 84a. The +1-order light beam 83a2 passing through the region 72a forms the beam spot 87a of the far field condition, on the dividing line on the halving photodetector 85a.

Of the reflected light entering the hologram optical element 72, the −1-order light beam 83b1 passing through the region 72b forms the beam spot 86b of the near field condition, on the dividing line on the halving photodetector 84b. The +1-order light beam 83b2 passing through the region 72b forms the beam spot 87b of the far field condition as it is after converged, on the dividing line on the halving photodetector 85b.

Figure 34:
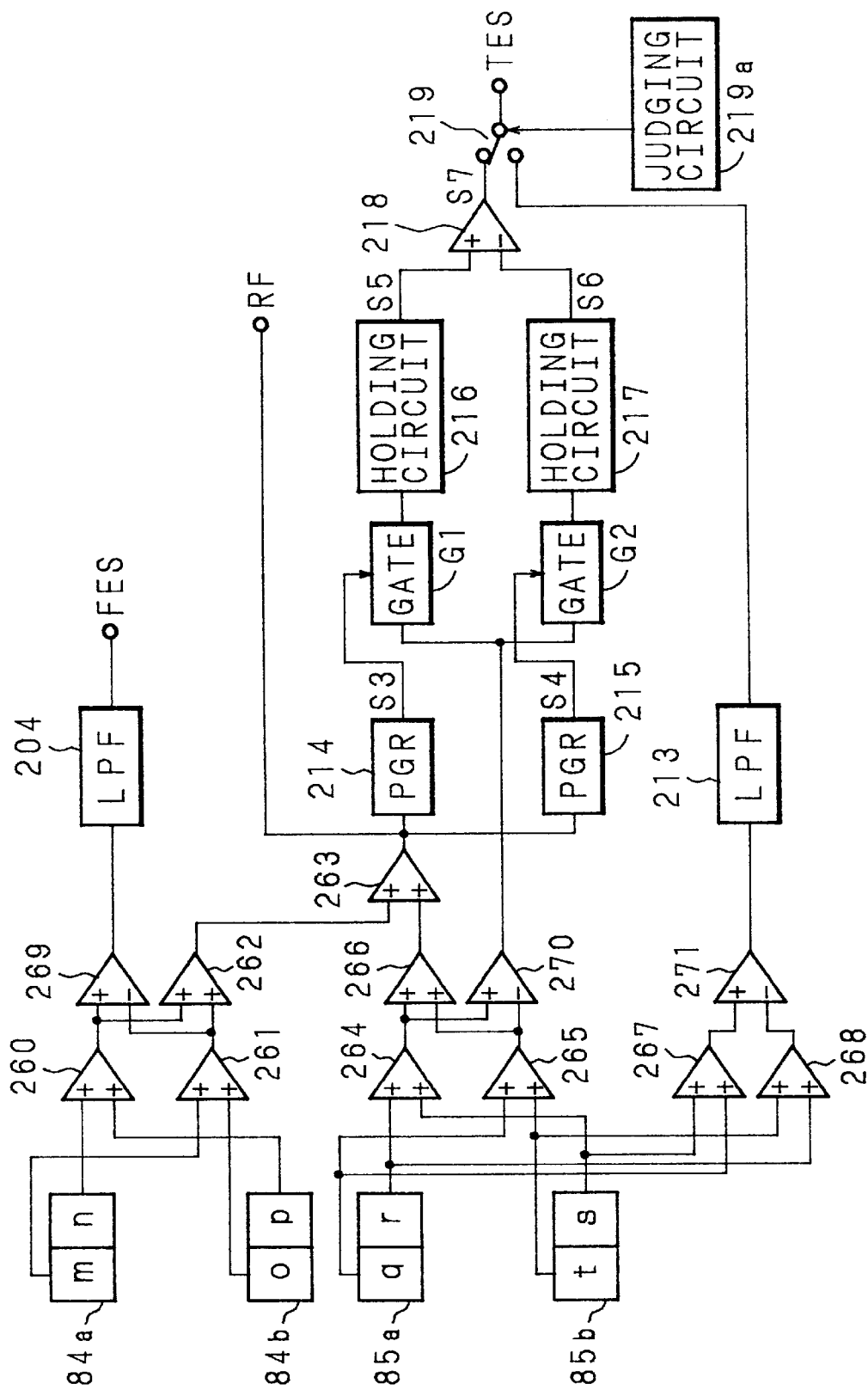
FIG. 34 is a block diagram showing a structure of a calculating unit in the fourteenth embodiment.

FIG. 34 is a block diagram showing a structure of a calculating unit of the optical disk apparatus according to the fourteenth embodiment. In this calculating unit, an adder 261 adds an output from the detecting portion m and an output from the detecting portion o, while an adder 260 adds an output from the detecting portion n and an output from the detecting portion p. A subtracter 269 calculates a difference between the outputs from the adders 260 and 261. After a high frequency component is removed from an output from the subtracter 269 by a low-pass filter 204, the output from the subtracter 269 is outputted as a focus error signal FES=(n+p)−(m+o).

An adder 267 adds an output from the detecting portion q and an output from the detecting portion s, while an adder 268 adds an output from the detecting portion t and an output from the detecting portion r. A subtracter 271 calculates a difference between the outputs from the adders 267 and 268. After a high frequency component is removed from an output from the subtracter 267 by a low-pass filter 213, the output from the low-pass filter 213 is outputted to the one input terminal of a switch circuit 219, as a tracking error signal TES=(q+s)−(r+t).

An adder 265 adds an output from the detecting portion q and an output from the detecting portion t, while an adder 264 an output from the detecting portion r and an output from the detecting portion s. An adder 266 calculates the sum of an output from the adder 264 and an output from the adder 265, while an adder 262 calculates the sum of an output from the adder 260 and an output from the adder 261. An adder 263 calculates the sum of an output from the adder 262 and an output from the adder 266. An output from the adder 263 is outputted as the RF signal, and at the same time supplied to pulse generators 214 and 215. A subtracter 270 calculates a difference between the outputs from the adders 264 and 265, and an output from the subtracter 270 is supplied to gates G1 and G2, as the HTD signal.

When the RF signal transits from a negative level to a positive level, the pulse generator 214 generates a sampling pulse S3 and supplies the same to the gate G1. In response, the gate G1 is opened, whereby the value of the HTD signal at this stage is sampled and held by a holding circuit 216. On the other hand, the pulse generator 215 generates a sampling pulse S4 when the RF signal transits from a positive level to a negative level, and supplies the same to the gate G2. In response, the gate G2 is opened, whereby the value of the HTD signal at this stage is sampled and held by a holding circuit The subtracter 218 calculates a difference between a holding signal S5 in the holding circuit 216 and a holding signal S6 in the holding circuit 217, to thereby detect a phase difference between the RF signal and the HTD signal. A difference S7 between the holding signal S5 and the holding signal S6 is outputted to the other input terminal of the switch circuit 219, as a tracking error signal TES which is calculated by the heterodyne method. When judging means 219a judges that the track 21a of the disk 21 includes a successive groove, the switch circuit 219 outputs a tracking error signal TES which is obtained by the push-pull method. When the judging means 219a judges that the track 21a of the disk 21 includes only a row of pits, the switch circuit 219 outputs a tracking error signal TES which is obtained by the heterodyne method.

Calculation performed at the calculating unit will be described.

By the Foucault method, the calculating unit calculates and outputs a focus error signal FES=(n+p)−(m+o) based on outputs (m to p) from detecting portions m to p of the halving photodetectors 84a and 84b.

Figure 35B:
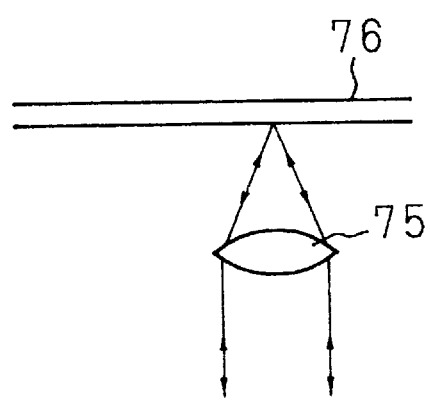
FIG. 35B is an explanatory diagram for describing a case where a disk is at the focal point of an objective lens.
Figure 36A:
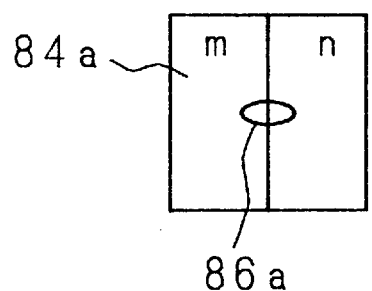
FIG. 36A is a view showing spots on halving photodetectors in a case where a disk is closer than the focal point of an objective lens in the fourteenth embodiment.
Figure 36B:
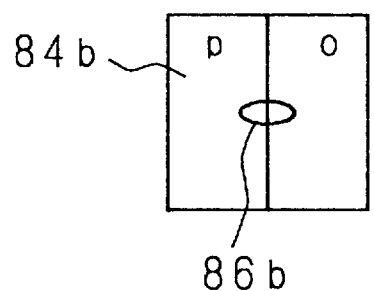
FIG. 36B is a view showing spots on halving photodetectors in a case where a disk is closer than the focal point of an objective lens in the fourteenth embodiment.

The Foucault method will be described in the following. A light beam which is reflected by the disk 76 is divided into two, and the two beams are each guided onto dividing lines extending in the same direction of the detecting portions of a quarter dividing photodetector (or two halving photodetectors; the halving photodetectors 84a and 84b in this embodiment). Here, if a light spot is accurately focused on the disk 76 as shown in FIG. 35B, each one of the two divided light beams forms a spot of the near field condition on the dividing line on the quarter dividing photodetector (i.e., on the detecting portions m to p of the halving photodetectors 84a and 84b in this embodiment), as shown in FIGS. 36A and 36B.

Figure 35A:
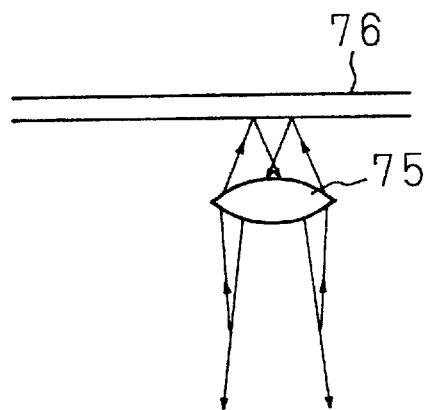
FIG. 35A is an explanatory diagram for describing a case where a disk is closer than the focal point of an objective lens.
Figure 35C:
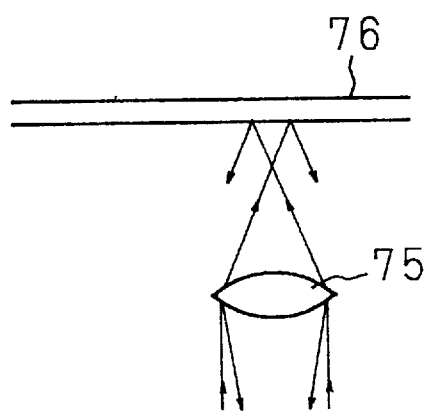
FIG. 35C is an explanatory diagram for describing a case where a disk is farther than the focal point of an objective lens.
Figure 36C:
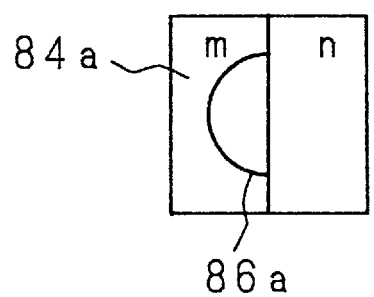
FIG. 36C is a view showing spots on halving photodetectors in a case where a disk is at the focal point of an objective lens in the fourteenth embodiment.
Figure 36D:
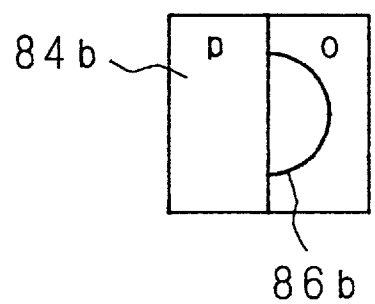
FIG. 36D is a view showing spots on halving photodetectors in a case where a disk is at the focal point of an objective lens in the fourteenth embodiment.
Figure 36E:
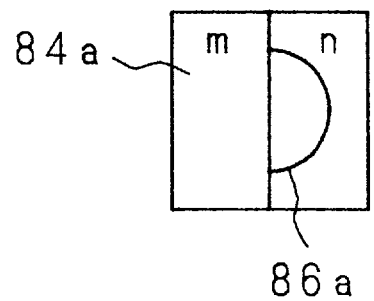
FIG. 36E is a view showing spots on halving photodetectors in a case where a disk is farther than the focal point of an objective lens in the fourteenth embodiment.
Figure 36F:
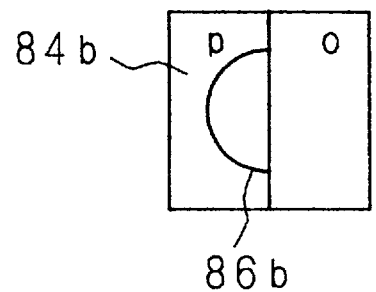
FIG. 36F is a view showing spots on halving photodetectors in a case where a disk is farther than the focal point of an objective lens in the fourteenth embodiment.

If the disk 76 is closer than the focal point of the objective lens 75 as shown in FIG. 35A, each one of the two divided light beams forms a spot of the far field condition at the outer two detecting portions m and o of the detecting portions which correspond to positions which are identified by dividing a spot on a track into four in the same direction (FIGS. 36C and 36D). If the disk 76 is farther from the focal point of the objective lens 75 as shown in FIG. 35C, each one of the two divided light beams forms a spot of the far field condition at the inner two detecting portions n and p (FIGS. 36E and 36F).

Figure 37:
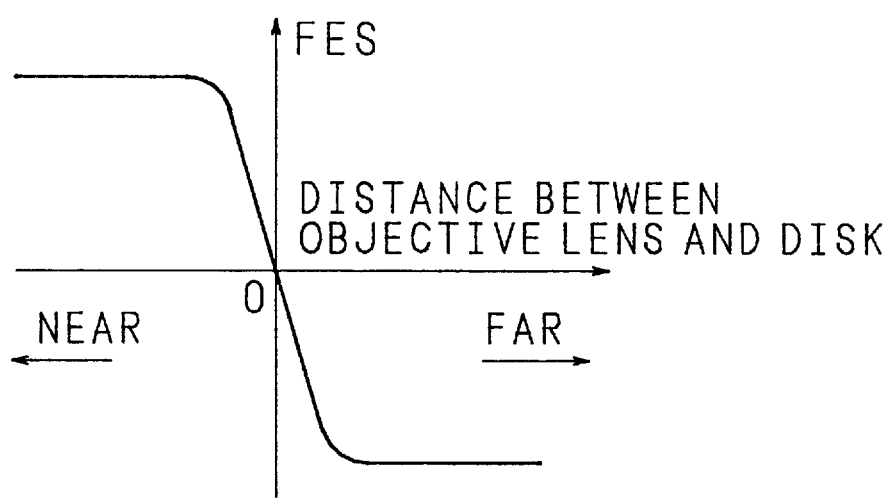
FIG. 37 is a diagram showing a characteristic showing a focus error signal which is generated by an FES generating circuit.

Hence, a light beam on the quarter dividing photodetector becomes bright or dark depending on whether the optical disk is farther than or closer than the focal point of the objective lens. Therefore, the adders 260 and 261 each calculate the sum of outputs from the diagonally-opposed two detecting portions of the quartering photodetector (the outer two detecting portions and the inner two detecting portions; the detecting portions m, o and the detecting portions n, p in this embodiment), and the subtracter 269 calculates a difference between the calculated results. Through the low-pass filter 204, a focus error signal FES as that shown in FIG. 37 is obtained.

When the track 77 of the disk 76 includes a successive groove (i.e., when the disk 21 is a re-writable disk, etc.,), by the push-pull method, the tracking error signal TES=(q+s)−(r+t) is calculated and outputted based on outputs (q to t) from detecting portions q to t of the halving photodetectors 85a and 85b.

When the track 77 of the disk 76 is a track of a ROM disk which includes only a row of pits, by the heterodyne method, a tracking error signal is generated by calculating a phase difference between the heterodyne signal HTD=(r+s)−(q+t) and the information signal RF=m+n+o+p+q+r+s+t.

Since the push-pull method and the heterodyne method are the same as those in the first embodiment, a description thereon will be omitted.

Distinction between a disk which includes the successive groove and a ROM disk are recorded as information in regions other than user regions in the disks, so that the judging means 219a reads this information and distinguishes. Alternatively, a hole for distinction may be formed in a cartridge of a disk or a reflection label may be pasted, for the purpose of distinguishing. A result of distinguishing performed by the judging means 219a is supplied to the switch circuit 219, so that the switch circuit 219 switches the tracking error signals. Instead of using the judging means 219a, an operator may perform such switching based his own judgment.

The support mechanisms for the objective lens 75 perform focus servo and track servo, in accordance with the focus error signal FES and the tracking error signal TES.

While the structure of the optical system makes recording and reproducing on a magneto optical disk possible in the present embodiment, when a phase-variable optical disk is mounted as a disk which includes the successive groove, the RF signal is the information signal as in the case of a ROM disk.

Fifteenth Embodiment

Figure 38:
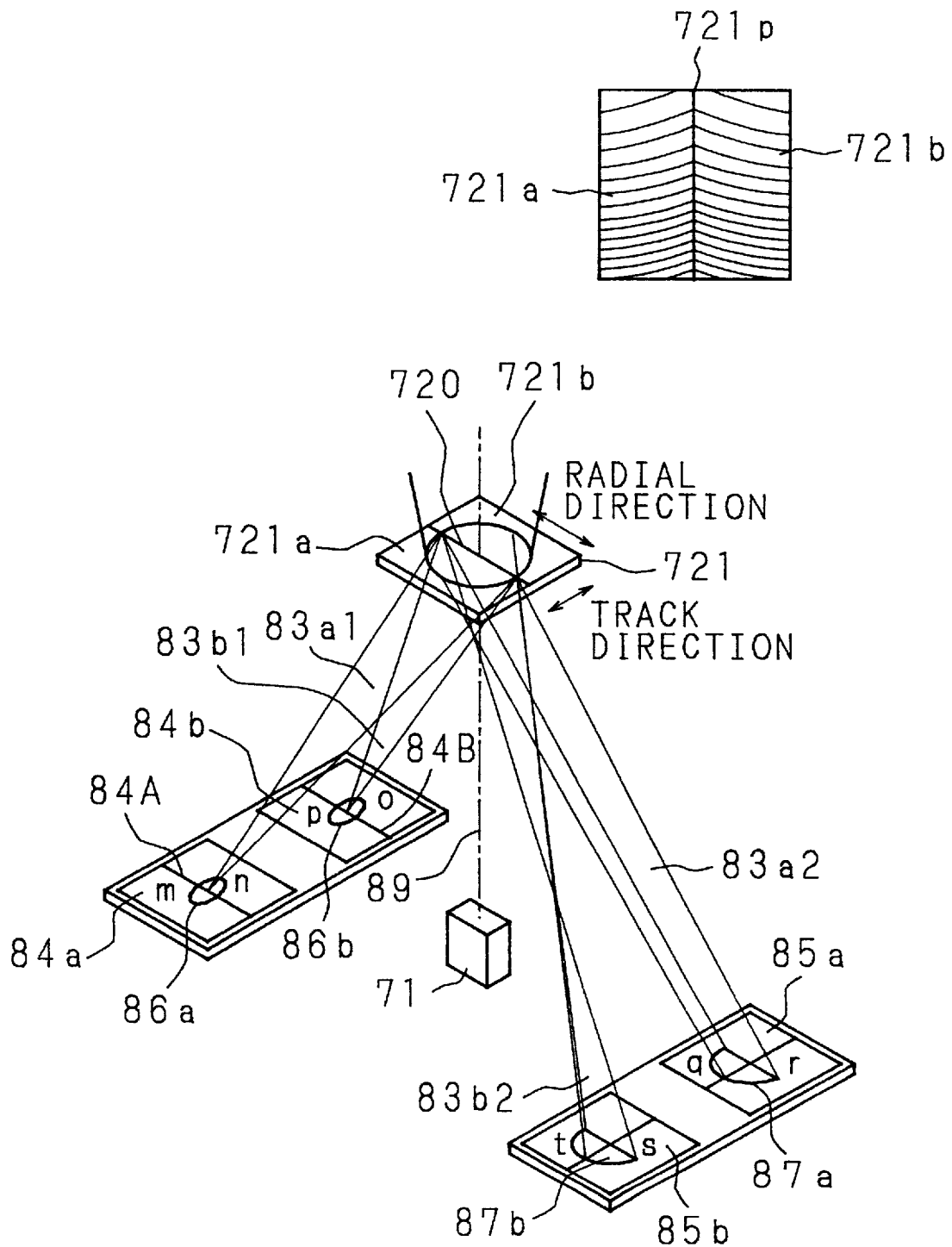
FIG. 38 is a perspective view showing an example of a structure of an LD, a hologram optical element and a photodetecting system of an optical disk apparatus according to a fifteenth embodiment of the present invention.

FIG. 38 is a perspective view showing an example of a structure of a light source, an optical element of an optical disk apparatus according to a fifteenth embodiment of the present invention. The optical system of this optical disk apparatus is approximately the same as those of the fourteenth embodiment. Similar to the hologram optical element 72, a hologram optical element 721 is divided by a dividing line 720 into two regions 721a and 721b and has a hologram pattern 721p. The halving photodetector 84a is located inside the track 77 (FIG. 32) and on the region 721a side, while the halving photodetector 84b is located inside the track 77 and on the region 721b side.

The halving photodetector 85a is located outside the track 77 and on the region 721b side, while the halving photodetector 84b is located outside the track 77 and on the region 721a side. The hologram optical element 721 diffracts the light beams 83a1, 83b1, 83a2 and 83b2 so that these beams impinge upon the halving photodetectors 84a, 84b, 85a and 85b, respectively. The directions of the dividing lines of the halving photodetectors 84a, 84b, 85a and 85b are as same as those in the fourteenth embodiment.

In this embodiment, when the position of the hologram optical element 721 is rotated about the optical axis 89 for positional adjustment in such a manner that the beam spots 86a and 86b are formed on the dividing lines 84A and 84B of the halving photodetectors 84a and 84b, larger rotating action is necessary than in the fourteenth embodiment. Hence, in this embodiment, the accuracy of performing positional adjustment of the halving photodetectors 84a, 84b, 85a and 85b is better in the fourteenth embodiment.

On the other hand, when the quantities of relative displacements between the beam spots 86a and 86b and the dividing lines 84A and 84B are adjusted, the larger quantities of rotation of the halving photodetectors 84a, 84b, 85a and 85b are necessary than in the fourteenth embodiment. Hence, the arrangement according to the fourteenth embodiment or the arrangement according to the present embodiment may be adopted, depending on whether to respect positional adjustment of the halving photodetectors 84a, 84b, 85a and 85b or to respect a smaller quantity of rotating the halving photodetectors 84a, 84b, 85a and 85b.

The other structure and operations are similar to those of the optical disk apparatus of the fourteenth embodiment, and therefore, will not be described.

Sixteenth Embodiment

Figure 39:
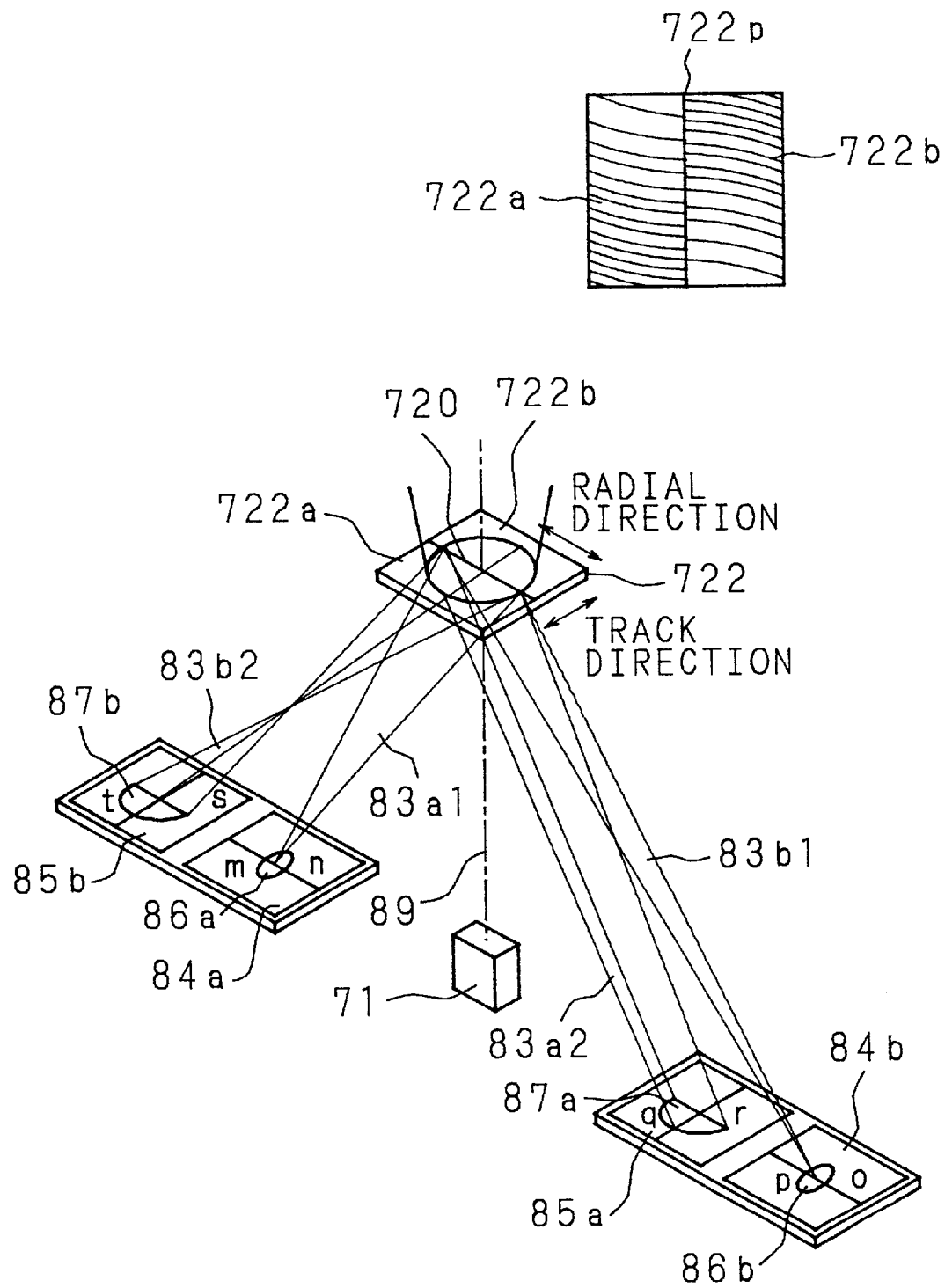
FIG. 39 is a perspective view showing an example of a structure of an LD, a hologram optical element and a photodetecting system of an optical disk apparatus according to a sixteenth embodiment of the present invention.

FIG. 39 is a perspective view showing an example of a structure of a light source, a hologram optical element and a photodetecting system of an optical disk apparatus according to a sixteenth embodiment of the present invention. The optical system of this optical disk apparatus is approximately the same as that of the fourteenth embodiment. Similar to the hologram optical element 72, a hologram optical element 722 is divided by a dividing line 720 into two regions 722a and 722b and has a hologram pattern 722p. The halving photodetectors 85b, 84a, 85a and 84b are arranged in this order from the inner side toward the outer side of the track 77 (FIG. 32) in the direction of the radius of the track 77.

The hologram optical element 722 diffracts the light beams 83a1, 83b1, 83a2 and 83b2 so that these beams impinge upon the halving photodetectors 84a, 84b, 85a and 85b, respectively. The directions of the dividing lines of the halving photodetectors 84a, 84b, 85a and 85b are as same as those in the fourteenth embodiment. The other structure and operations are similar to those of the optical disk apparatus of the fourteenth embodiment, and therefore, will not be described.

The present embodiment as well creates a similar effect to that of the fourteenth embodiment.

Seventeenth Embodiment

Figure 40:
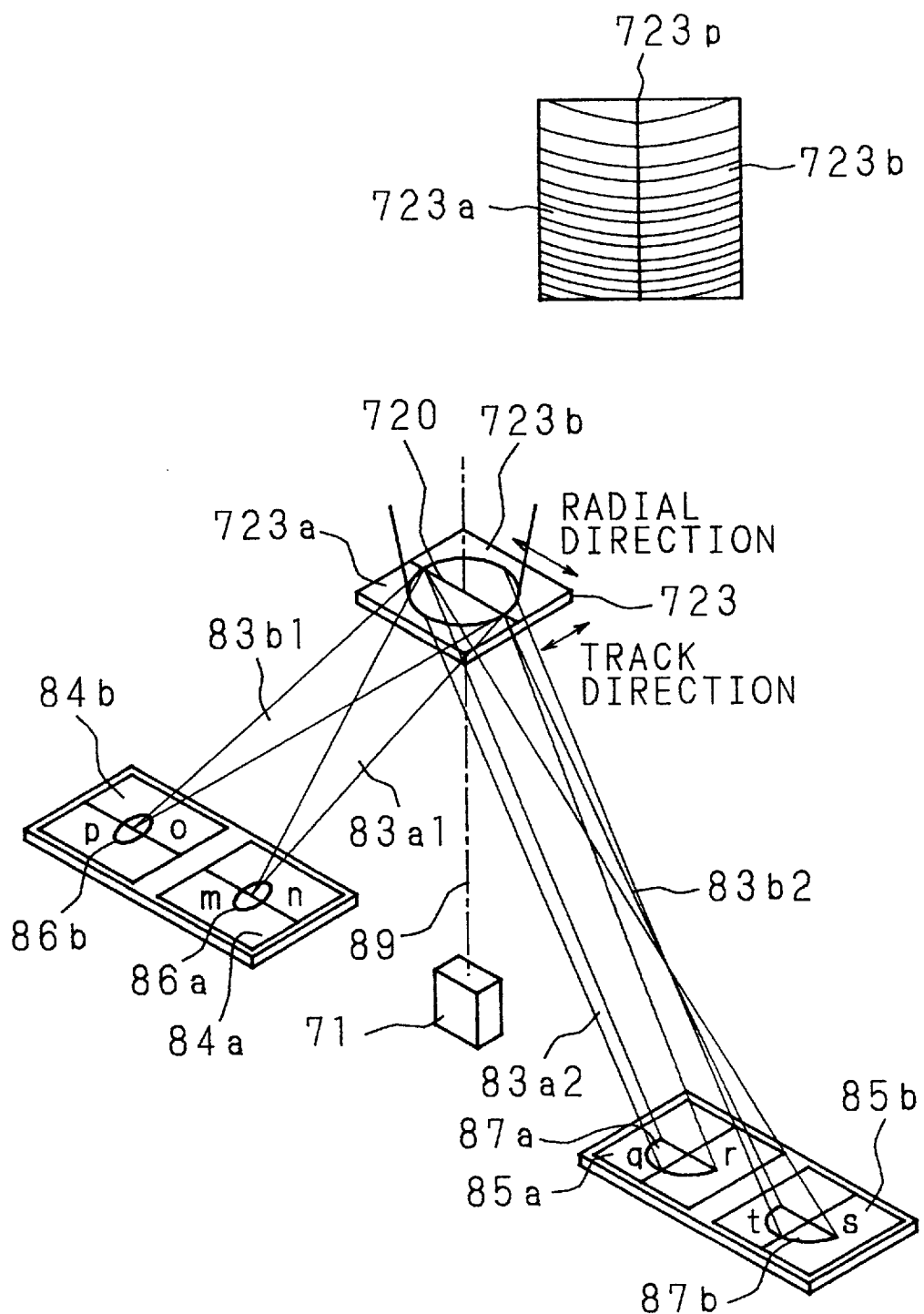
FIG. 40 is a perspective view showing an example of a structure of an LD, a hologram optical element and a photodetecting system of an optical disk apparatus according to a seventeenth embodiment of the present invention.

FIG. 40 is a perspective view showing an example of a structure of a light source, an optical element and a photodetecting system of an optical disk apparatus according to a seventeenth embodiment of the present invention. The optical system of this optical disk apparatus is approximately the same as that of the fourteenth embodiment. Similar to the hologram optical element 72, a hologram optical element 723 is divided by a dividing line 720 into two regions 723a and 723b and has a hologram pattern 723p. The halving photodetectors 84b, 84a, 85a and 85b are arranged in this order from the inner side toward the outer side of the track 77 (FIG. 32) in the direction of the radius of the track 77.

The hologram optical element 723 diffracts the light beams 83a1, 83b1, 83a2 and 83b2 so that these beams impinge upon the halving photodetectors 84a, 84b, 85a and 85b, respectively. The directions of the dividing lines of the halving photodetectors 84a, 84b, 85a and 85b are as same as those in the fourteenth embodiment. The other structure and operations are similar to those of the optical disk apparatus of the fourteenth embodiment, and therefore, will not be illustrated nor described.

The present embodiment as well creates a similar effect to that of the fourteenth embodiment.

Eighteenth Embodiment

Figure 41:
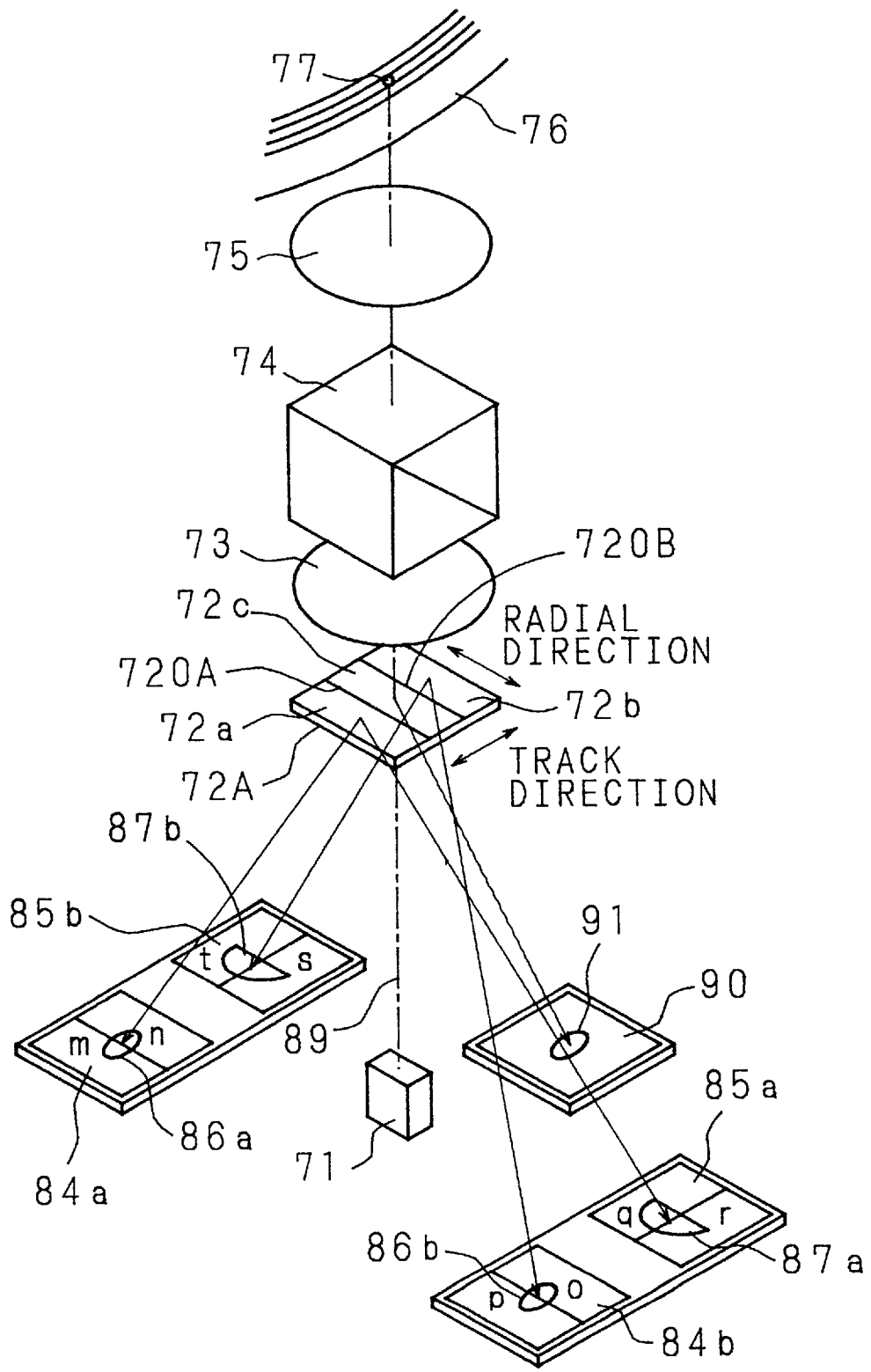
FIG. 41 is a perspective view showing an example of a structure of an optical system of an optical disk apparatus according to an eighteenth embodiment of the present invention.

FIG. 41 is a perspective view showing an example of a structure of an optical system of an optical disk apparatus according to an eighteenth embodiment of the present invention. The present embodiment is a case where the optical disk apparatus according to this embodiment is applied to a compact disk, a CD-ROM, a phase-variable optical disk apparatus. The optical system of this optical disk apparatus is approximately the same as that of the fourteenth embodiment. A hologram optical element 72A is divided by two dividing lines 720A and 720B each extending perpendicular to the track 77 into three regions 72a, 72b and 72c. Light beams passing through the regions 72a and 72b impinge upon halving photodetectors, as in the fourteenth embodiment. A light beam passing through the region 72c is converged as a beam spot 91 on a photodetector 90, and is used to detect the RF signal.

Reproduction of the RF signal may be performed based on output signals from the halving photodetectors 84a, 84b, 85a and 85b. In this case, the sum of the quantities of received light increases to increase signal components. However, since the sum of the light receiving areas of the photodetectors increases, a junction capacitance is increased to thereby increase a noise component. Further, when both the servo signals and the RF signal are to be generated by the same photodetector, it is necessary to additionally dispose a circuit which separate these signals. Hence, when an increase in a noise component apparently dominates an increase in the signal components, it is preferable to reproduce the RF signal based on only an output signal from the photodetector 90.

When the fourteenth to the seventeenth embodiments described above are to be applied to an apparatus for detecting the RF signal based on the intensity of reflected light from an optical disk, such a compact disk apparatus and a phase-variable optical disk apparatus, it is necessary to detect the RF signal from a portion or the sum of output signals from the halving photodetectors 84a, 84b, 85a and 85b. Therefore, it is necessary to additionally dispose a circuit which separate the servo signals from the RF signal. In contrast, since the present embodiment allows to reproduce the RF signal based on only an output signal from the photodetector 90, such a circuit for separation is not necessary.

Nineteenth Embodiment

Figure 42:
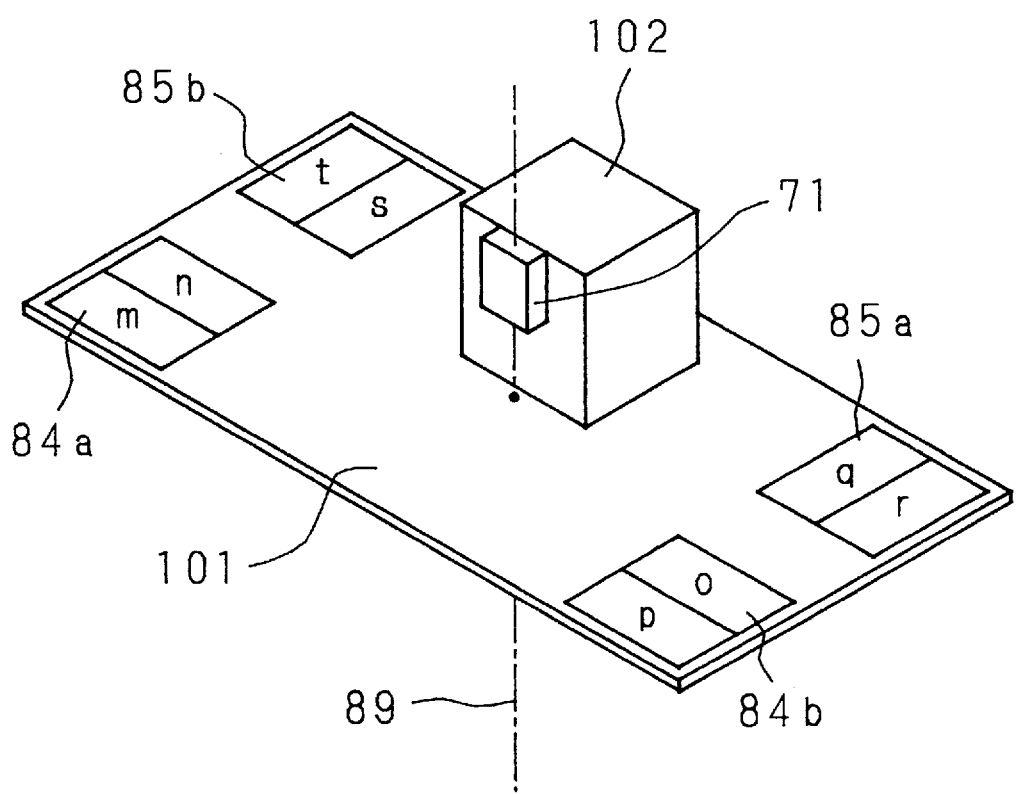
FIG. 42 is a perspective view showing an example of a structure of an LD and a photodetecting system of an optical disk apparatus according to a nineteenth embodiment of the present invention.

FIG. 42 is a perspective view showing an example of a structure of a light source, an optical element and a photodetecting system of an optical disk apparatus according to a nineteenth embodiment of the present invention. The halving photodetectors 84a, 84b, 85a and 85b are formed directly at the four corners of one substrate 101 which is made of silicon, etc. The halving photodetectors 84a and 85a are disposed at symmetrical positions with respect to the optical axis 89, on the substrate 101. Meanwhile, the halving photodetectors 85b and 84b are disposed at symmetrical positions with respect to the optical axis 89, on the substrate 101.

A support member 102 seating the LD 71 is disposed on the substrate 101, in such a manner that the optical axis of the LD 71 passes through the center of the substrate 101. The support member 102 is made of a material, such as copper, for example, which has a high coefficient of thermal conductivity, to support the LD 71 and efficiently discharge heat which is developed by the LD 71. The other structure and operations are similar to those of the optical disk apparatus of the fourteenth embodiment, and therefore, will not be described.

According to the present embodiment, since the LD 71 and the halving photodetectors 84a, 84b, 85a and 85b are formed on the same substrate 101, it is easy to adjust the positions of these elements relative to each other. When the halving photodetectors 84a, 84b, 85a and 85b are formed directly on the same substrate 101, in particular, it is possible to set and fix the positional relationships between the halving photodetectors 84a, 84b, 85a and 85b relative to each other, in an easy manner.

Further, it is possible to reduce the number of parts forming the optical disk apparatus and to reduce costs. Still further, since heat which is developed by the LD 71 is efficiently discharged through the support member 102, heat-induced destruction of the LD 71 will not occur nor no adverse effect will be created over the other parts such as the halving photodetectors 84a, 84b, 85a and 85b.

Twentieth Embodiment

Figure 43:
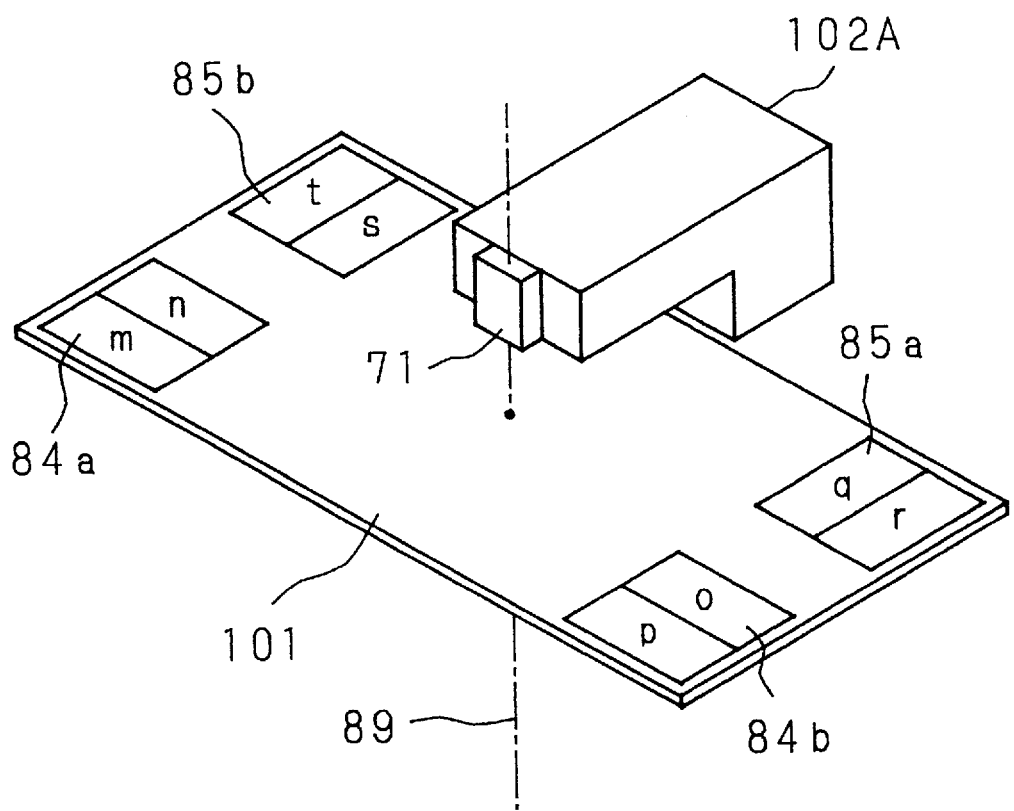
FIG. 43 is a perspective view showing an example of a structure of an LD and a photodetecting system of an optical disk apparatus according to a twentieth embodiment of the present invention.

FIG. 43 is a perspective view showing an example of a structure of a light source and a photodetecting system of an optical disk apparatus according to a twentieth embodiment of the present invention. The halving photodetectors 84a, 84b, 85a and 85b are formed directly at the four corners of one substrate 101 which is made of silicon, etc. The halving photodetectors 84a and 85a are disposed at symmetrical positions with respect to the optical axis 89, on the substrate 101. Meanwhile, the halving photodetectors 85b and 84b are disposed at symmetrical positions with respect to the optical axis 89, on the substrate 101.

An L-shaped support member 102A seating the LD 71 at its tip portion is fixed to a housing which at least partially houses the optical system, in such a manner that the optical axis of the LD 71 passes through the center of the substrate 101. The support member 102A is made of a material, such as copper, for example, which has a high coefficient of thermal conductivity, to support the LD 71 and efficiently discharge heat which is developed by the LD 71. The other structure and operations are similar to those of the optical disk apparatus of the fourteenth embodiment, not therefore, will not be described.

In this manner, when the housing is made of a material which has a high coefficient of thermal conductivity, heat which is developed by the LD 71 is further efficiently discharged through the support member 102A and the housing.

Twenty-First Embodiment

Figure 44:
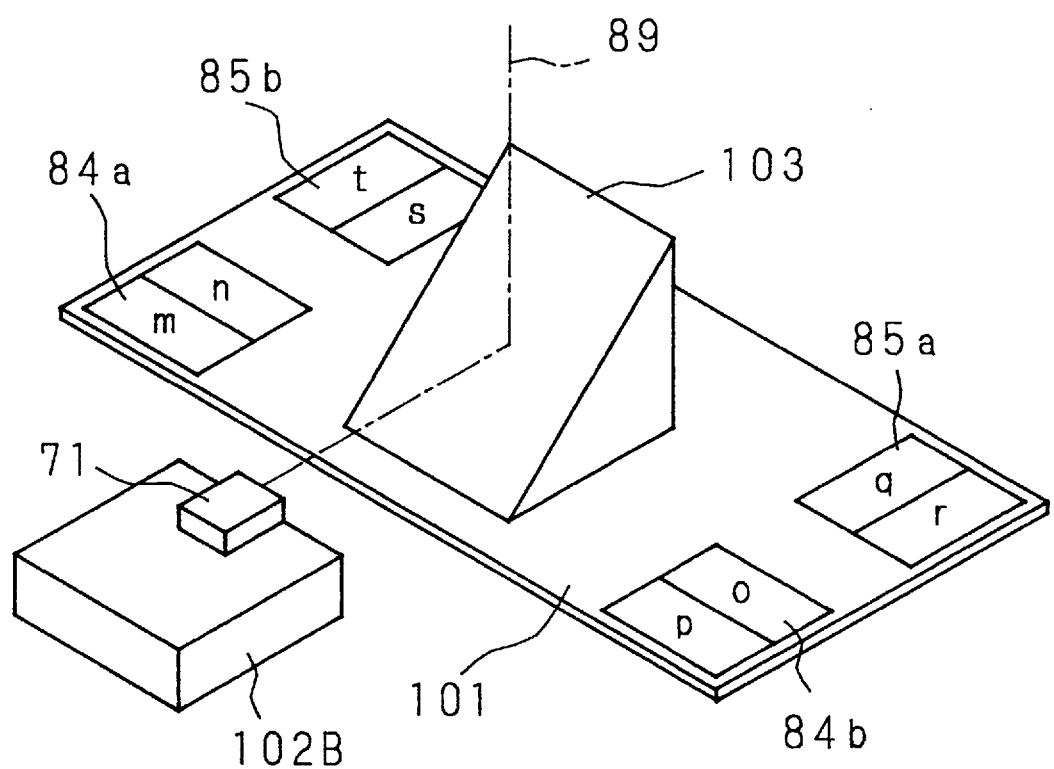
FIG. 44 is a perspective view showing an example of a structure of an LD, a mirror and a photodetecting system of an optical disk apparatus according to a twenty-first embodiment of the present invention.

FIG. 44 is a perspective view showing an example of a structure of a light source, an optical element and a photodetecting system of an optical disk apparatus according to a twenty-first embodiment of the present invention. The halving photodetectors 84a, 84b, 85a and 85b are formed directly at the four corners of one substrate 101 which is made of silicon, etc. The halving photodetectors 84a and 85a are disposed at symmetrical positions with respect to the optical axis 89, on the substrate 101. Meanwhile, the halving photodetectors 85b and 84b are disposed at symmetrical positions with respect to the optical axis 89, on the substrate 101.

A support member of rectangular solid 102B seating the LD 71 is fixed to a housing which at least partially houses the optical system. The LD 71 emits a light beam in the horizontal direction, so that this light beam is reflected by a mirror 103 which is fixed to the center of the substrate 101 and deflected to an upright direction. The deflected light beam impinges upon the collimator lens 73 (FIG. 32).

The support member 102B is made of a material, such as copper, for example, which has a high coefficient of thermal conductivity, to support the LD 71 and efficiently discharge heat which is developed by the LD 71. The other structure and operations are similar to those of the optical disk apparatus of the fourteenth embodiment, and therefore, will not be described.

In this manner, when the housing is made of a material which has a high coefficient of thermal conductivity, heat which is developed by the LD 71 is further efficiently discharged through the support member 102B and the housing. The present embodiment is desirable to a case where the LD 71, in particular, should not be preferably disposed on the substrate 101.

Twenty-Second Embodiment

Figure 45:
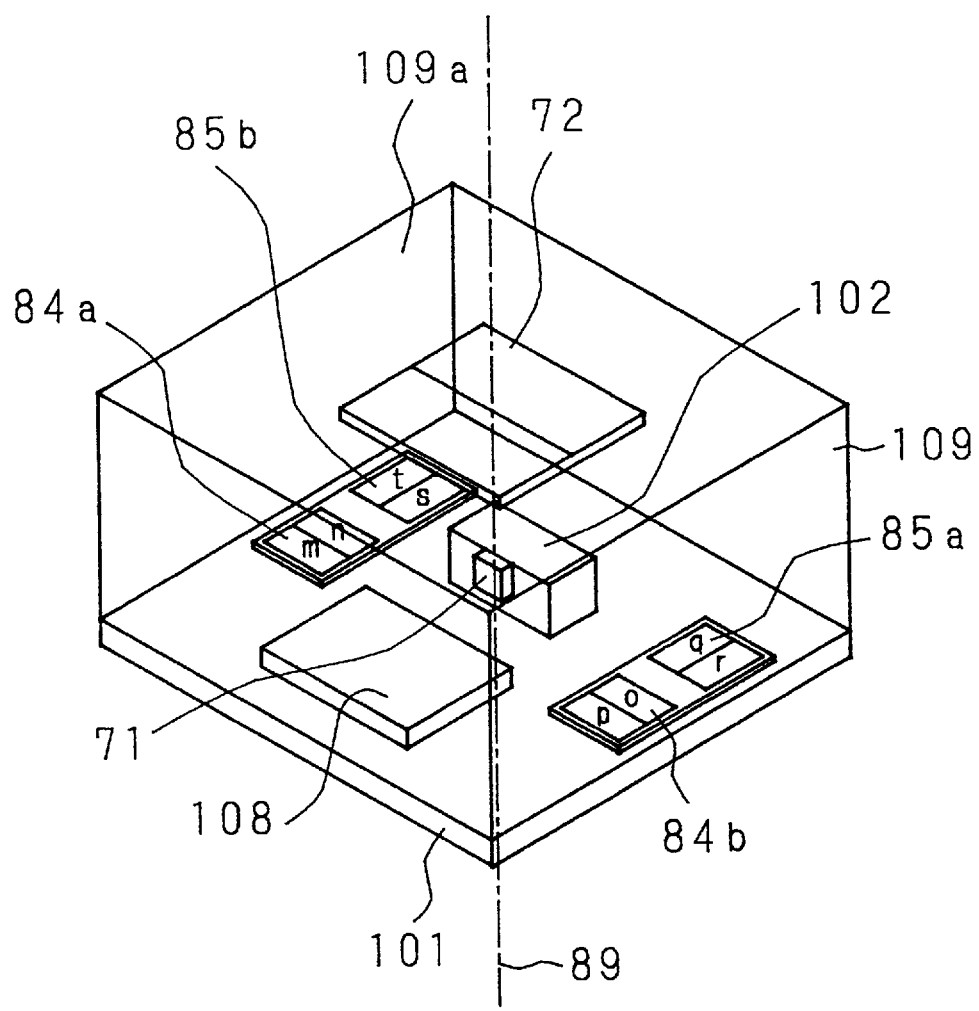
FIG. 45 is a perspective view showing an example of a structure of a hologram optical element, an LD, a photodetecting system and a calculating unit of an optical disk apparatus according to a twenty-second embodiment of the present invention.

FIG. 45 is a perspective view showing an example of a structure of a light source, an optical element and a photodetecting system of an optical disk apparatus according to a twenty-second embodiment of the present invention. The halving photodetectors 84a, 84b, 85a and 85b are disposed on one substrate 101 which is made of silicon, etc. The halving photodetectors 84a and 85a are disposed at symmetrical positions with respect to the optical axis 89, on the substrate 101. Meanwhile, the halving photodetectors 85b and 84b are disposed at symmetrical positions with respect to the optical axis 89, on the substrate 101.

The support member of rectangular solid 102 seating the LD 71 and a semiconductor integrated circuit 108 including a calculating unit are disposed on the substrate 101. The halving photodetectors 84a, 84b, 85a and 85b and the semiconductor integrated circuit 108 may be separately manufactured and mounted, or alternatively, at least one of these components may be directly formed on the same substrate 101. A housing of rectangular solid 109 which entirely covers the substrate 101 is disposed on the substrate 101. The hologram optical element 72 is fixed to an upper plate 109a of the housing 109. The position at which the hologram optical element 72 is fixed is set so that components of the reflected light beams from the disk 76 each impinge upon the photodetectors which correspond to the halving photodetectors 84a, 84b, 85a and 85b. The other structure and operations are similar to those of the optical disk apparatus of the fourteenth embodiment, and therefore, will not be described.

The halving photodetectors 84a, 84b, 85a and 85b and the LD 71 are disposed on the substrate 101 and the hologram optical element 72 is disposed on the housing 109, and therefore, it is easy to set the positional relationships between these components relative to each other, and attaching and adjustment of these components are easy. In other words, where such a structure is used, in the housing 109, the halving photodetectors 84a, 84b, 85a and 85b, the LD 71, the hologram optical element 72 and the semiconductor integrated circuit 108 are disposed as one unit, so that it is possible to treat the housing 109 an optical device in which the positional relationships between these elements relative to each other are already set.

The configurations of the substrate 101 and the housing 109 are not limited to those shown in FIG. 45. Rather, the substrate 101 may be round and the housing 109 may be cylindrical to deal with this.

Further, in the embodiments described above, the focus error signal FES may be generated from −1-order light while the tracking error signal TES may be generated from +1-order light.

Still further, although the embodiments described above require to generate a tracking error signal from +1-order light or −1-order light which is detected as it is in the far field condition both before and after converged, the +1-order light and the −1-order light may be detected only as it is in the far field condition only before or after converged.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An optical disk apparatus comprising:
    an irradiating means for irradiating a light beam upon an optical disk having a track including at least a successive groove or a row of pits;
    an information signal photodetector for detecting an information signal from a light reflected by the optical disk;
    an optical element for dividing the reflected light into a plurality of light beams for generating a tracking error signal and a focus error signal, the light beams being deflected into different directions from each other;
    said optical element dividing the reflected light into two first divided light beams located at the sides of a track line corresponding to a central line of the track on a cross section of the reflected light, and two second divided light beams for generating the focus error signal,
    photodetecting means for detecting each one of these light beams said photodetecting means including:
        two first halving photodetectors located in far fields of said first divided light beams; and
        two second halving photodetectors which are located at focal points of said second divided light beams, and each of which has two detecting portions for each detecting an inner portion and an outer portion of the reflected light,
    a first calculating means for calculating the focus error signal on the basis of outputs from said photodetecting means; and
    a second calculating means for calculating the tracking error signal on the basis of the outputs from said photodetecting means when said successive groove or said row of pits are detected;
    wherein said first calculating means calculates the focus error signal by a Foucault method from the outputs of said photodetecting means, and
    said second calculating means includes
        a first tracking error signal generating unit for generating the tracking error signal by a push-pull method;
        a second tracking error signal generating unit for generating the tracking error signal by a heterodyne method;
        a judging means for judging whether the track has a successive groove or only a row of pits; and
        a selecting unit for selecting a signal from said first tracking error signal generating unit when the track includes a successive groove, and selecting a signal from said second tracking error signal generating unit when the track includes only a row of pits, on the basis of a judgment signal from said judging means.

2. An optical disk apparatus according to claim 1, wherein said first calculating means calculates a difference between a sum of signals from the detecting portions for detecting the outer portions of the reflected light and a sum of signals from the detecting portions for detecting the inner portions of the reflected light, of said second halving photodetectors,
    said first tracking error signal generating unit calculates a difference between a sum of signals from the detecting portions of one first halving photodetector and a sum of signals from the detecting portions of the other first halving photodetector, and
    said second tracking error signal generating unit includes:
        a first calculating section for calculating a sum of signals from all detecting portions of said first and second halving photodetectors;
        a second calculating section for calculating a difference between sums of signals from the detecting portions for detecting the divided light beams located in diagonal positions on a cross section of the reflected light, of said two first halving photodetectors; and
        a third calculating section for calculating a phase difference between a signal from said first calculating section and a signal from said second calculating section.

3. An optical disk apparatus according to claim 1, wherein said optical element causes a focal distance of said first divided light beam to be different from a focal distance of said second divided light beam.

4. An optical disk apparatus according to claim 2, wherein said optical element is disposed at such a position which transmits the light beam for irradiating the optical disk into a reverse direction to that of the reflected light from the optical disk as 0-order light.

5. An optical disk apparatus according to claim 4, further comprising means for dividing the reflected light in accordance with the polarized state, wherein said information signal photodetectors receives the polarized and divided light beams.

6. An optical disk apparatus according to claim 1, wherein a hologram optical element is used as the optical element.

7. An optical disk apparatus comprising:

an irradiating means for irradiating a light beam upon an optical disk having a track including at least a successive groove or a row of pits;

an information signal photodetector for detecting an information signal from a light reflected by the optical disk;

an optical element for dividing the reflected light into a plurality of light beams for generating a tracking error signal and a focus error signal, and said light beams being deflected into different directions from each other;

said optical element dividing the reflected light into four light beams on a cross section of the reflected light by a track line corresponding to a central line of the track and a line perpendicular to the track line;

photodetecting means for detecting each one of these light beams said photodetecting means including four halving photodetectors which are located in focal points of the four divided light beams, and each of which has two detecting portions for each detecting an inner portion and an outer portion of the reflected light, a first calculating means for calculating the focus error signal on the basis of outputs from said photodetecting means; and a second calculating means for calculating a tracking error signal on the basis of the outputs from said photodetecting means when said successive groove or said row of pits are detected;

wherein said first calculating means calculates the focus error signal by a Foucault method from the outputs of said photodetecting means, and said second calculating means includes a first tracking error signal generating unit for generating a tracking error signal by a push-pull method;

a second tracking error signal generating unit for generating a tracking error signal by a heterodyne method;

a judging means for judging whether the track has a successive groove or only a row of pits; and a selecting unit for selecting a signal from said first tracking error signal generating unit when the track includes a successive groove, and selecting a signal from said second tracking error signal generating unit when the track includes only a row of pits, on the basis of a judgment signal from said judging means.

8. An optical disk apparatus according to claim 7, wherein said first calculating means calculates a sum of two or four differences between a signal from the detecting portions for detecting the inner portion and a signal from the detecting portions for detecting the outer portion of the reflected light, of each of said halving photodetectors, said first tracking error signal generating unit calculates a difference between sums of signals from the detecting portions of respective halving photodetectors for light beams located in the same side of the track line, and said second tracking error signal generating unit includes:

a fourth calculating section for calculating a sum of signals from all detecting portions of said halving photodetectors;

a fifth calculating section for calculating a difference between sums of signals from said halving photodetectors for detecting the divided light beams located in diagonal positions on a cross section of the reflected light, of the four light beams; and a sixth calculating section for calculating a phase difference between a signal from said fourth calculating section and a signal from said fifth calculating section.

9. An optical disk apparatus according to claim 7, wherein said halving photodetectors have the dividing lines of the same direction.

10. An optical disk apparatus according to claim 7, wherein said optical element is disposed at such a position which transmits the light beam for irradiating the optical disk into a reverse direction to that of the reflected light from the optical disk as 0-order light.

11. An optical disk apparatus according to claim 10, further comprising means for dividing the reflected light in accordance with the polarized state, wherein said information signal photodetectors receives the polarized and divided light beams.

12. An optical disk apparatus according to claim 7, wherein a hologram optical element is used as the optical element.

13. An optical disk apparatus comprising:

an irradiating means for irradiating a light beam upon an optical disk having a track including at least a successive groove or a row of pits;

an information signal photodetector for detecting an information signal from a light reflected by the optical disk;

an optical element for dividing the reflected light into a plurality of light beams for generating a tracking error signal and a focus error signal, said light beams being deflected into different directions from each other;

said optical element dividing the reflected light into three light beams on a cross section of the reflected light in a track line direction corresponding to a direction line of the track, further dividing the three light beams into two in a direction perpendicular to the track line direction, and deflecting the six divided light beams into different directions from each other, photodetecting means for detecting each one of said light beams, said photodetecting means including:

pp-photodetectors located in focal points of the two divided light beams in the center position of the track line direction of the six divided light beams; and halving photodetectors located at focal points of the other four light beams, a first calculating means for calculating the focus error signal on the basis of outputs from said photodetecting means; and a second calculating means for calculating a tracking error signal on the basis of the outputs from said photodetecting means when said successive groove or said row of pits are detected, wherein said first calculating means calculates the focus error signal by a Foucault method from the outputs of said photodetecting means, and said second calculating means includes
- a first tracking error signal generating unit for generating a tracking error signal by a push-pull method;
- a second tracking error signal generating unit for generating a tracking error signal by a heterodyne method;
- a judging means for judging whether the track has a successive groove or only a row of pits; and
- a selecting unit for selecting a signal from said first tracking error signal generating unit when the track includes a successive groove, and selecting a signal from said second tracking error signal generating unit when the track includes only a row of pits, on the basis of a judgment signal from said judging means.

14. An optical disk apparatus according to claim 13, wherein
said first calculating means calculates a sum of two or four differences between signals from the detecting portions of each of said halving photodetectors,
said first tracking error signal generating unit calculates a difference between signals from said pp-photodetectors, and said second tracking error signal generating unit includes:
- a seventh calculating section for calculating a sum of signals from all pp-photodetectors and halving photodetectors;
- an eighth calculating section for calculating a difference between sums of signals from said halving photodetectors for detecting the divided light beams located in diagonal positions on a cross section of the reflected light, of the four light beams; and
- a ninth calculating section for calculating a phase difference between a signal from said seventh calculating section and a signal from said eighth calculating section.

15. An optical disk apparatus according to claim 13, wherein said first tracking error signal generating unit calculates a difference between a sum of signals from said pp-photodetector and said halving photodetectors for detecting the light beams located in one side of the track line and a sum of signals from said pp-photodetector and said halving photodetectors for detecting the light beams located in the other side of the track line.

16. An optical disk apparatus according to claim 13, wherein a hologram optical element is used as the optical element.

17. An optical disk apparatus comprising:
- an irradiating means for irradiating a light beam upon an optical disk having a track including at least a successive groove or a row of pits;
- an information signal photodetector for detecting an information signal from a light reflected by the optical disk;
- an optical element for dividing the reflected light into a plurality of light beams for generating a tracking error signal and a focus error signal, and deflecting these light beams into different directions from each other;
- said optical element dividing the reflected light into two first divided light beams located at the sides of a track line corresponding to a central line of the track on a cross section of the reflected light, and two second divided light beams for generating the focus error signal, the divided light beams being deflected into different directions from each other, the reflected light being partially transmitted as 0-order light;
- photodetecting means for detecting each one of said light beams, said photodetecting means including:
  - two first halving photodetectors located in far fields of said first divided light beams; and
  - two second halving photodetectors which are located at focal points of said second divided light beams, and each of which has two detecting portions for each detecting an inner portion and an outer portion of the reflected light, and
- said information signal photodetector receiving the 0-order light,
- a first calculating means for calculating the focus error signal on the basis of outputs from said photodetecting means; and
- a second calculating means for calculating a tracking error signal on the basis of the outputs from said photodetecting means when said successive groove or said row of pits are detected;
- wherein said first calculating means calculates the focus error signal by a Foucault method from the outputs of said photodetecting means, and
- said second calculating means includes
  - a first tracking error signal generating unit for generating a tracking error signal by a push-pull method;
  - a second tracking error signal generating unit for generating a tracking error signal by a heterodyne method;
  - a judging means for judging whether the track has a successive groove or only a row of pits; and
  - a selecting unit for selecting a signal from said first tracking error signal generating unit when the track includes a successive groove, and selecting a signal from said second tracking error signal generating unit when the track includes only a row of pits, on the basis of a judgment signal from said judging means.

18. An optical disk apparatus according to claim 17, wherein
said first calculating means calculates a difference between a sum of signals from the detecting portions for detecting the outer portions of the reflected light and a sum of signals from the detecting portions for detecting the inner portions of the reflected light, of said second halving photodetectors,
said first tracking error signal generating unit calculates a difference between a sum of signals from the detecting portions of one first halving photodetector and a sum of signals from the detecting portions of the other first halving photodetector, and
said second tracking error signal generating unit includes:
- a second calculating section for calculating a difference between sums of signals from the detecting portions for detecting the divided light beams located in diagonal positions on a cross section of the reflected light, of said two first halving photodetectors; and
- a tenth calculating section for calculating a phase difference between a signal from said information signal photodetector and a signal from said second calculating section.

19. An optical disk apparatus according to claim 17, wherein a hologram optical element is used as the optical element.

20. An optical disk apparatus comprising:
- an irradiating means for irradiating a light beam upon an optical disk having a track including at least a successive groove or a row of pits;

an information signal photodetector for detecting an information signal from a light reflected by the optical disk;

an optical element for dividing the reflected light into a plurality of light beams for generating a tracking error signal and a focus error signal, and deflecting these light beams into different directions from each other;

said optical element dividing the reflected light into four light beams on a cross section of the reflected light by a track line corresponding to a central line of the track and a line perpendicular to the track line, deflecting the divided light beams into different directions from each other, and partially transmitting the reflected light as 0-order light, said information signal photodetector receiving the 0-order light;

photodetecting means for detecting each one of said light beams, said photodetecting means including:

four halving photodetectors which are located in focal points of the four divided light beams, each of which has two detecting portions for each detecting an inner portion and an outer portion of the reflected light;

a first calculating means for calculating the focus error signal on the basis of outputs from said photodetecting means; and a second calculating means for calculating a tracking error signal on the basis of the outputs from said photodetecting means when said successive groove or said row of pits are detected;

wherein said first calculating means calculates the focus error signal by a Foucault method from the outputs of said photodetecting means; and said second calculating means includes a first tracking error signal generating unit for generating a tracking error signal by a push-pull method;

a second tracking error signal generating unit for generating a tracking error signal by a heterodyne method;

a judging means for judging whether the track has a successive groove or only a row of pits; and a selecting unit for selecting a signal from said first tracking error signal generating unit when the track includes a successive groove, and selecting a signal from said second tracking error signal generating unit when the track includes only a row of pits, on the basis of a judgment signal from said judging means.

21. An optical disk apparatus according to claim 20, wherein said first calculating means calculates a sum of two or four differences between a signal from the detecting portions for detecting the inner portion and a signal from the detecting portions for detecting the outer portion of the reflected light, of each of said halving photodetectors, said first tracking error signal generating unit calculates a difference between sums of signals from the detecting portions of respective halving photodetectors for light beams located in the same side of the track line, and said second tracking error signal generating unit includes:

a fifth calculating section for calculating a difference between sums of signals from said halving photodetectors for detecting the divided light beams located in diagonal positions on a cross section of the reflected light, of the four light beams; and an eleventh calculating section for calculating a phase difference between a signal from said information signal photodetector and a signal from said fifth calculating section.

22. An optical disk apparatus according to claim 20, wherein a hologram optical element is used as the optical element.

23. An optical disk apparatus comprising:

an irradiating means for irradiating a light beam upon an optical disk having a track including at least a successive groove or a row of pits;

an information signal photodetector for detecting an information signal from a light reflected by the optical disk;

an optical element for dividing the reflected light into a plurality of light beams for generating a tracking error signal and a focus error signal, and deflecting these light beams into different directions from each other;

said optical element dividing the reflected light into three light beams on a cross section of the reflected light in a track line direction corresponding to a direction line of the track and the three light beams to be divided into two in a direction perpendicular to the track line direction, deflecting the six divided light beams into different directions from each other, and partially transmitting the reflected light as 0-order light, said information signal photodetector receiving the 0-order light;

photodetecting means for detecting each one of these light beams, said photodetecting means including:

pp-photodetectors located in focal points of the two divided light beams in the center position of the track line direction, of the six divided light beams; and halving photodetectors located at focal points of the rest four light beams;

a first calculating means for calculating the focus error signal on the basis of outputs from said photodetecting means; and a second calculating means for calculating a tracking error signal on the basis of the outputs from said photodetecting means when said successive groove or said row of pits are detected;

wherein said first calculating means calculates the focus error signal by a Foucault method from the outputs of said photodetecting means; and said second calculating means includes a first tracking error signal generating unit for generating a tracking error signal by a push-pull method;

a second tracking error signal generating unit for generating a tracking error signal by a heterodyne method;

a judging means for judging whether the track has a successive groove or only a row of pits; and a selecting unit for selecting a signal from said first tracking error signal generating unit when the track includes a successive groove, and selecting a signal from said second tracking error signal generating unit when the track includes only a row of pits, on the basis of a judgment signal from said judging means.

24. An optical disk apparatus according to claim 23, wherein said first calculating means calculates a sum of two or four differences between signals from the detecting portions of each of said halving photodetectors, said first tracking error signal generating unit calculates a difference between signals from said pp-photodetectors, and said second tracking error signal generating unit includes:

an eighth calculating section for calculating a difference between sums of signals from said halving photodetectors for detecting the divided light beams located in diagonal positions on a cross section of the reflected light, of the four light beams; and a ninth calculating section for calculating a phase difference between a signal from said information signal photodetector and a signal from said eighth calculating section.

25. An optical disk apparatus according to claim 23, wherein a hologram optical element is used as the optical element.

26. An optical disk apparatus comprising:

an irradiating means for irradiating a light beam upon an optical disk having a track including at least a successive groove or a row of pits;

an information signal photodetector for detecting an information signal from a light reflected by the optical disk;

a prism for dividing the reflected light into a plurality of four light beams for generating a tracking error signal and a focus error signal, and deflecting these light beams into different directions from each other;

photodetecting means for detecting each one of these light beams;

a first calculating means for calculating the focus error signal on the basis of outputs from said photodetecting means; and a second calculating means for calculating a tracking error signal on the basis of the outputs from said photodetecting means when said successive groove or said row of pits are detected;

wherein said first calculating means calculates the focus error signal by a Foucault method from the outputs of said photodetecting means, and said second calculating means includes a first tracking error signal generating unit for generating a tracking error signal by a push-pull method;

a second tracking error signal generating unit for generating a tracking error signal by a heterodyne method;

a judging means for judging whether the track has a successive groove or only a row of pits; and a selecting unit for selecting a signal from said first tracking error signal generating unit when the track includes a successive groove, and selecting a signal from said second tracking error signal generating unit when the track includes only a row of pits, on the basis of a judgment signal from said judging means.

* * * * *

UNITED STATES PATENT AND TRADEMARK OFFICE
CERTIFICATE OF CORRECTION

PATENT NO. : 5,859,819
DATED : January 12, 1999
INVENTOR(S) : Miyabe et al.

It is certified that error appears in the above-identified patent and that said Letters Patent is hereby corrected as shown below:

Column 3, line 65, delete "the," and insert

--the-- therefor

Column 15, line 55, delete "HID" and insert

--HTD-- therefor

Column 23, line 5, delete "IC" and insert

--IIC-- therefor

Column 29, line 42, delete "cd" and insert

--c+d-- therefor

Column 38, line 14, delete "77."

Column 38, line 14, after "track" and insert

--77.--

UNITED STATES PATENT AND TRADEMARK OFFICE
CERTIFICATE OF CORRECTION

PATENT NO. : 5,859,819
DATED : January 12, 1999
INVENTOR(S) : Miyabe et al.

It is certified that error appears in the above-identified patent and that said Letters Patent is hereby corrected as shown below:

Column 44, line 13, delete "not" and insert

--and-- therefor

Column 47, line 1, delete " claim 2" and insert --claim 3-- therefor

Signed and Sealed this

Twenty-third Day of November, 1999

Attest:

Q. TODD DICKINSON

*Attesting Officer*  *Acting Commissioner of Patents and Trademarks*